(12) United States Patent
Wu

(10) Patent No.: US 10,430,903 B2
(45) Date of Patent: Oct. 1, 2019

(54) METHOD FOR IMPROVING DOCUMENT REVIEW PERFORMANCE

(71) Applicant: Jianqing Wu, Beltsville, MD (US)

(72) Inventor: Jianqing Wu, Beltsville, MD (US)

(*) Notice: Subject to any disclaimer, the term of this patent is extended or adjusted under 35 U.S.C. 154(b) by 1846 days.

(21) Appl. No.: 13/868,058

(22) Filed: Apr. 22, 2013

(65) Prior Publication Data
US 2014/0317147 A1 Oct. 23, 2014

(51) Int. Cl.
| | |
|---|---|
| *G06F 7/00* | (2006.01) |
| *G06F 17/30* | (2006.01) |
| *G06Q 50/18* | (2012.01) |
| *G06F 16/35* | (2019.01) |
| *G06Q 10/06* | (2012.01) |
| *G06F 16/93* | (2019.01) |
| *G06F 17/00* | (2019.01) |

(52) U.S. Cl.
CPC .............. *G06Q 50/18* (2013.01); *G06F 16/35* (2019.01); *G06F 16/353* (2019.01); *G06F 16/93* (2019.01); *G06Q 10/063* (2013.01)

(58) Field of Classification Search
CPC ......... G06F 17/30705; G06F 17/30707; G06F 16/35; G06F 16/353; G06F 16/93; G08Q 50/18
See application file for complete search history.

(56) References Cited

U.S. PATENT DOCUMENTS

| | | |
|---|---|---|
| 8,548,997 B1 | 10/2013 | Wu |
| 8,972,845 B2 | 3/2015 | Wu |
| 9,342,505 B2 | 5/2016 | Wu |
| 9,361,464 B2 | 6/2016 | Wu |
| 2009/0157759 A1* | 6/2009 | Kunisaki ........... G06F 17/30011 |

* cited by examiner

*Primary Examiner* — Kannan Shanmugasundaram
(74) *Attorney, Agent, or Firm* — Jianging Wu

(57) ABSTRACT

The present invention is a method and process for accurately and efficiently coding documents in electronic discovery. The method, if used by highly experienced and motivated document reviewers in a collegial and harmonic environment, has the potential to increase adjusted review consistency, reduce coding errors, eliminate duplicate efforts, increase review speed, decrease the risks of exposure, and dramatically improve review performance. The method will also result in useful case history files, which are useful in every phrase of litigation, including motion argument, merit trial, appeal, and future litigation.

21 Claims, 17 Drawing Sheets

Typical Prior Art

Name Search | Full Screen | Email | Set up Project | Set up Tables | Log out

Coding Assistance

551 → Global Search

550 → Date: 4/3/2009
Manager: Manager Lastname

| Notes | Transaction | Attorneys | Acronym | Table1 | Table2 | Discussion | Pad | Instructions |
|---|---|---|---|---|---|---|---|---|
| | | Validated Table | Combined Table | Tentative Table | Edit table | Reference table | | |

552 ↗   553 ↗

Attorney Name Table

554 →

| | No. | Email | First Name | MI | Last Name | Company | Date | Type | Comments | Entry date | Confirm date | App | Initials |
|---|---|---|---|---|---|---|---|---|---|---|---|---|---|
| ☐ | 1222 | test9999@test.com | Jack | | Smith | New Law Firm, LLP | 01/20/20081 | | This is for test. | 04/03/2009 12:10:25 | 04/03/2009 12:32:07 | VOTE | TST |
| ☐ | 1223 | test99991@test.com | Lisa | | Cars | Law House, LLP | 01/20/20080 | | This is another test,OK | 04/03/2009 12:15:10 | 04/03/2009 12:32:07 | VOTE-R | TST |

Current Votes: 3

| User ID | Initials | Vote Date |
|---|---|---|
| 6 | TSF | 04-03-2009 12:32:07 |
| 5 | TST2 | 04-03-2009 12:29:18 |
| 4 | TST1 | 04-03-2009 12:21:05 |

| | 12 | | Scott | | Foster | Large & Small PC | 11/01/20082 | | Test | 03/03/2009 08:44:52 | 03/03/2009 10:29:50 | MG | null |
| ☐ | 12 | | | | | Large & Small PC | 11/01/20082 | | Test | 03/03/2009 08:44:52 | 03/03/2009 10:29:50 | MG | null |
| ☐ | 1218 | test1218@test.com | | | | Large & Small PC | 11/01/20082 | | Test | 03/03/2009 08:44:52 | 03/03/2009 10:29:50 | MG | null |

555 ↗   557 ↗

[ Enter ]  [ Delete ]  [ Edit ]

556 ↗

Page 1 of 2 | Go to Page: [ 1 ] [ Go ] | Records Per Page: [ 5 ] ▼ Next Last

Add Records To Database Table

Server Response: Record 12 was entered at 05/10/2009 11:27:05
........................................................................
Date format: MM-DD-YYYY ← 618

- Table: Coding ▼
- Scope Effect: Amended ▼
- Coding as: NR ▼
- Key (<80): Test data
- Date: _____ (default is system time)
- Comment (<300): Sales data in commission computation file should be coded as non-responsive. See CN-11223490

[Interactive search] ← 619    [Submit]    [Close]

FIG. 11

Add Records To Database Table

Server Response: Record 13 was entered at 05/10/2009 10:35:06
........................................................................
Date format: MM-DD-YYYY ← 618

- Table: Names ▼
- Scope Effect: Original ▼
- Sub-Type: Client ▼
- Key (<80): Trible, John
- Date: _____ (default is system time)
- Comment (<300): Attorney of Black and While LLP for the client in an early merger case.

619 → [Interactive search]    [Submit]    [Close]

| | | | | |
|---|---|---|---|---|
| | | Index Table: Change Histories | | |
| | Filters | All Tables ▼ ◀— 630 | | |
| Date | Keys | Coding Effect /Sub-type | Scope Effect | Comments |
| 05/12/09 3:12:01 | Sales Data | NR | Original | NR, if in commission report |
| 05/12/09 4:11:21 | Sales Data | NR | Amend | NR, if in commission report unless it discusses M series |
| 05/11/09 6:11:21 | Smith, Ted | Attorney | Original | Attorney for Green Bay. Also, known as STS |
| 05/01/09 4:01:01 | P series | NR | Amend | Read Request 16 to exclude P series machines |

[Close]

FIG. 15

Search Document (Using Private Key Arrays)

| | | | | | |
|---|---|---|---|---|---|
| commission, gift, money, payment...... | | Current Search ◀— 641 | | Hidden 640 | |
| Group | Key Description | Key Array Location | Search Machine | | — 642 |
| A | Target Product List | Cookie | Client | Setup | [Search] |
| B | Name List | Cookie | Client | Setup | [Search] |
| C | Special Keys | Server | Server | Setup | [Search] |
| D | Hot Issue List | Cookie | Server | Setup | [Search] |

Setup for Group A

Provide a name or description for the search:

Target Product List

Provide keys:

112211,112222,112233, 112299, Redboat, silveflight....

○ Saved as Cookie          ○ Saved on Server
○ Search on Client         ○ Search on Server

[Save]    [Cancel]

FIG. 17

Setup  Search Document  Close commission, gift, money  [GO]
A  Product List  Cookie  Client  [GO]
B  Name List    Cookie  Client  [GO]
C  Special...   Server  Server [GO]
D  Hot Issue..  Server  Server [GO]

FIG. 18

Set up Reference Table

| Virtual Tables | Selection Criterion (as default filter) |
|---|---|
| Names | Client attorney ▼ |
| Terms | Special term ▼ |
| Products | Flagged ▼ |
| Branches | All ▼ |
| Coding rules | Amended ▼ |

655 → (Virtual Tables)
656 → (Selection Criterion)

[ Save ]  [ Discard ]

FIG. 23

Set Up Default Reference Tables

| Tables | Filter (type field) | Sorted By |
|---|---|---|
| Names | Attorney ▼ | Last Name ▼ |
| Projects | All ▼ | Type ▼ |
| Products | Dispute ▼ | Product ID ▼ |
| Terms | Special ▼ | Terms ▼ |
| Coding | All ▼ | Amendment ▼ |

655 → (Tables)
656 → (Filter)
657 → (Sorted By)

Total display No. per page: [ 50 ]  —658

[ Save ]  [ Discard ]

FIG. 24

Set Up Full Feature for Reference Table for: Products

1. Set Filter and Values

| Name | contains ▼ | Any | ← 660 |
| Product ID | From 112233 | TO 223344 | ← 661 |
| Type | Dispute ▼ | | ← 662 |
| Date | From 01/01/09 | TO 01/31/10 | ← 663 |
| Comment | Not contain ▼ | TIC | ← 664 |

2. Set Sorting Order

- Type ▼  ← 665
- Last Name ▼
- Product ID ▼
- Terms ▼
- Comment ▼

3. Set display page size

[30] Per page  ← 666

4. Select menu style:

Compact ▼  ← 667

← 668

[Save]  [Discard]

FIG. 25

METHOD FOR IMPROVING DOCUMENT REVIEW PERFORMANCE

CROSS-REFERENCE TO RELATED APPLICATIONS

This is a continuation application of co-pending U.S. patent application Ser. No. 13/527,581 filed Jun. 19, 2012 (which does NOT claim priority from any provisional application).

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to document review method, and in particular, to the method for improving document review performance.

BACKGROUND OF THE INVENTION

Discovery is a process by which two parties in a legal proceeding exchange information, exhibits and documents according to specific rules of procedure. In a typical legal proceeding, a party ("requesting party") may, pursuant to procedural rules, send a document request to another party ("responding party") to compel the responding party to produce documents that contain any of the many categories of subject matters. The responding party reviews potential documents, identifies documents containing any of the enumerated categories of subject matters, and produces them for the requesting party. Historically, the responding party reviewed paper documents, copied responsive documents, and produced them for the requesting party. Information technologies have caused companies to have a large volume of electronic documents, and thus it is necessary to use an Internet review platform for the review of documents. In a typical document review, the representing law firm or the client retains a data company for providing data hosting service and retains contract attorneys ("the reviewers") from employment agency to review documents on terminal computers ("client computers"). The reviewers can access the server of the review platform and download documents one by one for review.

A. Needs for Conducting Document Review

The need for document review may arise from all kinds of causes such as civil violations, securities law violations, patent infringement, copyright infringement, product injuries, merger acquisition, violation of regulatory laws, statutory violations (e.g., Foreign Corrupt Practice Act and Export Control Statute), and crimes. Document review may also be conducted for internal due diligence. Different legal procedures and substantive laws require the responding party to produce different types of documents. As a result, there is no universal procedure for processing documents. Each review project requires unique tasks for the project manager and the reviewers. Each type of cases may require a unique discovery process.

The documents sought depend upon the nature of claims and thus vary considerably. When a corporation acquires another corporation, the acquisition transaction may be subject to the approval by the Department of Justice. This type of review is very unique in that the government only looks for possible antitrust violations. In nearly all cases, the government focuses on products defined by three relevancies: relevant product, relevant market, and relevant time. The reviewers need to pay attention to any documents, which could raise antitrust concerns. In class actions, discovery is the most contentious. The disputed issues may revolve around looting, fraud, and failure to disclose important information. In patent infringement cases, the issues may be patent validity, patent misuse, and inequitable conduct. This kind of cases requires the reviewers to identify infringing products and services.

In the cases arising from government investigation, the government may issue subpoena to compel a corporation or person to produce certain documents. Document requests vary from case to case although documents sought in same type of cases often include certain similar types. Some of the examples may arise from the law regulating communications, stockbrokers, and investment advisers. Some investigation may be focused on specific issues. Thus, document production will be revolving around those issues. Some may require broader investigation. For example, if an investigation is focused on the accuracy of a submitted declaration, the focus of discovery will be on the declaration. If an investigation is directed at a specific kind of advertisements such as using fax, web mail, or bulk email, the discovery would focus on those materials. Some investigation cases arise under the Foreign Corrupt Practices Act, which prohibits corporations from giving anything of value to the officials of foreign governments. When a company is under investigation for violating this federal statute, the review is focused on how money or gifts are used.

Internal due diligence review may be conducted to find internal misconduct such as looting, embezzlement, and steeling. For example, when a bank discovers that someone may have stolen or embezzled money, the bank may conduct an internal investigation. While such discovery does not always work, it is a proper measure for finding an answer. Due diligence review is conducted for various other purposes. When a company is to acquire a business or a substantial amount of assets, the acquiring company may have to conduct necessary investigation of the acquired company so that it can make an informed decision. The investigation is conducted to ascertain potential liabilities, outstanding debts, assets, revenues, cash flow, and intellectual properties.

Objectives of document production vary, depending upon the nature of cases and other factors. Regardless of the complexity of legal issues, the final objective for each document production project is to produce enough documents to meet the requirements of the document request or subpoena and identify the documents that support the claims or defenses. However, due to the dynamics of litigation, the parties may consider additional objectives, which include producing a document database that is capable of scaling up and down and which will be useful in a later stage of litigation. Yes, another common objective is to produce documents at the lowest costs possible.

B. Complex and Unique Document Compositions

Client companies make different products and sell different services. Thus their documents contain completely different substances. Despite their differences, their documents contain (1) information on a large number of projects, services, and processes, (2) strange codes or causal names of products, services, and materials, (3) a large number of players such as employees, customers, attorneys and consultants, and other parties, (4) technical subjects of varying complexity, (5) jargon, abbreviations, and acronyms, (6) assumptions only understood by those who were involved in the underlying transaction, (7) incomplete person names, place names, and discussion topics that can be understood only by those in the discussion group, (8) protected compressed and zipped files, (9) trade secrets protected by passwords, and (10) substance in one or more foreign languages. Due to any and all of the reasons, document review is not an easy task.

Corporate documents contain a large number of duplicates. A large number of duplicate documents arise from document distribution practice, archiving, file backups, drive backup, media backup, and server backup. A document may be distributed to several, tens, and hundreds of employees. The some documents may be amended and again sent to a large number of employees. Each of the documents in an individual employee possession may be again backed up in many ways. Certain documents may have thousands of copies while others may have only tens to hundreds of copies. The large number of documents is primarily responsible for the high review cost.

Due to the large number of software applications for creating documents and complex file histories, some documents cannot be properly processed for review. Documents cannot be opened due to (1) lack of a supporting application, (2) association with a wrong application, (3) missing necessary components, (4) being linked to an unavailable file, (5) incorrect encode in the texts of foreign languages, (6) corrupted file structure, (7) infection by virus, and (8) lost information or damaged file structure. It is easy to name potential causes, but often difficult to ascertain whether a document has a real technical problem. When a great number of documents cannot be opened, it is a disaster. The only possible solution is to find original documents. Documents incorrectly marked as having a technical problem may be routed back to reviewers for another round of review. Two or three rounds of attempts can incur a great deal of costs.

Encoding problems in foreign language documents add another layer of complication. Many large corporations are doing business worldwide. Their corporate documents are written in different languages, depending upon the geographic region where the documents are created and what are the intended readers. Some documents are written in foreign languages, others contain foreign languages between lines, and yet others contain English translation. Some documents may be written in more than one language with internal cross-references. It would be very difficult to have those documents reviewed. Reviewers go through several rounds of reviews. For the reason obvious, this can kind of documents cannot be properly reviewed in several rounds, one for each of the languages. If such documents are important, they are translated to English.

Password protection of documents adds further complications. Passwords protected documents often appear in the document pools of software companies and technology companies. This class of documents can significantly reduce review speed. It is often difficult or even impossible to find right passwords. In many times, the reviewers treat such documents as trash or technical documents. The parties in civil litigation may reach an agreement on how to treat those documents. Now companies use zip files to send documents by email. A zip file may contain tens to hundreds of files. Some zip files contain database dump files, large number of forms and templates, all files for a complete project, and routine spreadsheets. An attempt to deal with the password problem can consume a great deal of time. An operation from file selection, downloading, to unzipping the file can waste as much as 10 minutes per document. If a reviewer is still unable to open a document, the reviewer waits for help or repeatedly tries the same operations. The time wasted from this is much difficult to assess. Documents routed to a wrong destination will be routed back and forth without final resolution.

C. Litigation Dynamics

Document production is further complicated by unpredictable but routine changes inherently in litigation. All current review models lack the ability to deal with changes. For a small case handled by a single lawyer, any change to any aspect of a review production is already a headache problem. In a massive document review project, any change means a huge costs and a great deal of delay.

Constant and routine changes in litigation are in a head-on clash with the constraints of the review model. In many times, even if the client can pay for a huge cost, it is simply has no time to make required changes. Litigation in the adversary system by nature is a contesting game, and the need for making changes is to increase the chance of win and reduce the chance of loss. However, everything else in the document production model is against any change. One biggest impeding factor is the large number of documents. Naturally, all law firms have the needs to change review instructions concerning review standards, request definitions (specification definitions), coding rules, and methods of handling of documents. In reality, discovery is a trail and error process that is characterized by changes, adjustments, fixes, quality checks, corrective reviews, and special reviews. In situations where any change cannot be applied to portion of the documents due to practical difficulty, the review team has to review all documents. This requires a great deal of review time. In other situations, any change may affect a sub set of documents in the pool.

One of the many complicating factors is the number of players. For any review, the players may include client employees, litigation attorneys, project managers, document processors, staffing agency, document reviewers, and technical consultants. One single misunderstanding by any of the player may result in an error that might require a massive corrective review. Another complicating factor is the huge amount of case information. When a change is proposed, it is impossible to foresee how the proposed change will affect documents through its direct effects or its unforeseen interactions with one or more case facts. Finally, many changes, even though they are purely litigation decisions, cannot be successfully implemented without the support of review platforms. When a proposed task is to find and review a set of priority documents in order to meet a deadline, one question is whether the review platform can competently identify the set of documents. By the extension of the same reasoning, one can imagine that platform search capability and algorithm types, file formats, file types, file conditions, files processing histories, and the way of organizing information in the files affect the chance of success. Even the work habits of the reviewers may be a differential factor. Some reviewers may be able to successfully make a change while others may give up. Although experience may be the most valuable thing to predict the chance of success, no one can guarantee any type of outcome in a system with too many variables. A very sound change plan may be easily defeated by a surprising factor. If all factors can be considered independently, the problem may be not frightening. In many times, a change may be impeded by a battery of main factors such as review software characters, internet connection characters, review computer characters, server characters, file characters, file processing histories, reviewer's working habits, and the size of affected documents. Each main factor may comprise tens to hundreds of sub-level factors and they may be intertwined with each other. This explains how a law firm can actually spend tens of millions of review fees on a typical review project.

D. Current Document Review Models

In a classic document review model, documents are collected to form a review pool, and they are reviewed to identify those documents, which contain substances falling in one or more categories of the requests. The definitions of categories are provided in the document request. One of the document requests in a patent infringement case may be "any and all documents that discuss, mention, and relate to the patent in suit." A typical document request may contain several to hundred individual requests. The reviewers review all potential documents and find relevant documents. Responsive documents then are further reviewed to determine if they are privileged and thus withheld from being produced.

The review platform has a review tag database table for storing coding decisions such as responsive or non-responsive, privilege or not privileged. If a reviewer determines that a document is responsive, the reviewer checks the responsive tag for this document and checks all other applicable tags for the document. In addition, the reviewers may determine if a document is hot (Hot documents are those that are very important to the case) and code it accordingly. All responsive and non-privileged documents are produced, optionally, with a production log identifying each of the produced documents. The production log may contain only limited information.

Information technologies have caused companies and businesses to produce extremely large document pools, which can comprise more than a million documents. Thus, reviewing and producing documents by the conventional manual method are no longer practicable. It is necessary to use an Internet review platform for the review of documents. Thus, an e-discovery industry has emerged as a big industry where a large number of companies are involved. The main services in the industry include data collection, data processing, document hosting, software development, employee staffing, training and consulting, and document review.

Since the deployment of Concordance, more than two dozens review systems have entered into the market. Each platform comprises a server, a server application and plural terminal computers connected to the server. Well-known review platforms include Concordance, Applied Discovery, Iconect, Stratify, Ringtail, Introspect, Attenex, Summation, and Case Central. Each review platform comprises at least one server for loading and processing data and for sending documents through the Internet to a plurality of client computers for review. Regardless of the discovery platforms, the basic concept is the same. First, the documents from one or more custodians of the responding party are collected and stored on a server. Hard copies of documents are scanned and saved as suitable image files. Electronic documents are converted into image files such as Tiff, PDF, and PNG. Certain electronic documents may be converted into text files by optical character recognizing software, while their native formats and text formats are also available for download during review. All documents are loaded onto the server. They deliver electronic documents to review terminals in text, html, TIFF, PDF, or native files.

The files are indexed according to certain scheme, which is mainly for the convenience of assigning documents to a plurality of reviewers and of tracking review statuses. Individual document ranges (which may be referred to as folders) may be created by conducting search using certain search keys or by using other assignment methods. On some platforms, documents may be displayed as files in one parent folder on the browser. Documents can be assigned to reviewers by virtual folders, document numbers, or assignment ranges. On other platforms, documents may be assigned to plural reviewers by assigning start and end bates numbers. They may be presented to the reviewers in the order consistent with their consecutive bates numbers.

Plural reviewers review documents from client computers connected to the server. Usually, each of the viewers logs in a personal review account, and opens the assigned folder or document range to review the documents. If the platform allows plural reviewers to review documents by ranges, each of the reviewers goes to the start document number of his assigned document range. As shown in FIG. 1, the user interface of a typical review platform has at least two panes: a document pane 120 for viewing the document and a coding pane 100 for marking tags for the document. The coding pane is also known as "tagging tree." It generally also has a document list pane 110 for showing all documents in the list and many other utility panes.

In reviewing documents, the reviewer opens a document on the document pane 120, reads the document, and conducts required analysis. Upon finishing reading the document, the reviewer clicks all applicable check boxes on the coding pane 100 according to review instructions. Each of the check boxes, also known as "tags," is associated with one of the review categories or definitions. The tagging tree on the tagging pane may contain the following checking boxes and definitions: [ ] None-responsive, [ ] Responsive, [ ] Hot document, and [ ] Privileged document. Some of the tags may have many associated sub tags. The numbers and natures of definitions used in each case are unique and may be completely different from what are used in other cases. Thus, the server allows the project manager to set up and modify the tagging tree for each project. The reviewer may write a note for a document in an annotation field in the coding pane. After the reviewer finishes the document, the reviewer clicks a submission button or advance button 130. This action causes the server to write the values of the selected tags into the coding database for the document, and causes the server to load next document. The reviewer then repeats the same process in reviewing the next document. The top area of the document pane may be placed with review tools for changing view size and document orientation, conducting text searches, and highlighting or redacting text.

A second review may be conducted for the responsive documents to insure that they are properly coded. Responsive documents are also reviewed for significance in the first review. A separate review of significant documents may be conducted in contentious cases. Non-responsive documents are not always reviewed in the quality control phase. Privileged documents are subject to further reviews by a privilege team for the final determination of their privilege statuses. When a document is determined as privileged, it is removed from the responsive pool and placed in the privileged document pool. A log is created, showing document creator, addressee, other recipients, creation date, privilege basis, and brief description of its subject. Privilege review may be conducted twice.

A typical production project may comprise two responsiveness reviews, one or two privilege reviews, one optional hot document review, creation of privilege log, and creation of a hot document log. The total number of reviews can be more than those. The reviewers may conduct corrective review for documents that contain detected errors and inconsistencies or contain potentially useful substance. Other tasks include proofreading a document log, proofreading a privilege log, removing documents from a privilege log, reviewing documents produced by adverse parties, searching specific information in the documents produced by the adverse party, tabulating information from the documents produced by the adverse party, searching public records, constructing database using events, acts, and conducts, constructing attorney name table, analyzing their substances. This list is not exhaustive, and the nature of tasks can only be defined by the need of litigation.

In addition to the broad spectrum of tasks mentioned above, the unpredictable nature of litigation makes the review project even more difficult. A change in the document request, a negotiated settlement on discovery disputes, a change in client's objective, filing of new claims and new defenses, change of parties in the case, court's ruling on motion, and settlement of claims can change review plan, scopes of specifications, total custodian number, coding tree structures, coding rules, and the method for handling documents.

Review of corporate documents is a difficult task because the subject matters in corporate documents may be about anything under the Sun. They may be written at any technical levels. Documents may contain a large number of special acronyms, terms and expressions, unfamiliar product numbers, short product names, people's names, unfamiliar transactions, incomplete place names, and unstated or implied assumptions. Accordingly, documents are not readily understandable to anyone who is outside of the discussion cycle. Reviewers constantly struggle to understand the terms. If the task of e-discovery is to review old documents for a corporation whose staff has been changed completely, the current staff can do little to help reviewers.

E. Reasons for High Review Costs

The review time is the major cost of e-discovery. The costs for reviewing and processing documents is anywhere from $1 to $15. If a client has one million documents to be reviewed and processed, the total production cost would be from $1 to $15 millions. For a large review project involving one hundred reviewers who work 10 hours a day at the billing rate of $150 per hour, the total fee would be $150,000 a day. If each of the documents needs 2 minutes on average, billed at $150 per hour, the total costs for this component alone could be $5 million. A document review for merger may cost several millions and a due diligence investigation can cost tens of millions of dollars. Certain time-intensive tasks could cost considerable more. Those tasks include writing summaries for documents, translating foreign language documents, and creating a production log, and producing a privilege log and a hot document log. A considerable amount of time is consumed in identifying review problems, conducting corrective reviews, and conducting additional review required by litigation needs.

The total costs for a review project is the sum of the costs for reviewing each document. The cost for reviewing each document directly depends upon the time used for each document. The time for reviewing each document comprises (1) the time for loading the document, (2) the time for reading the document, and (3) time for analyzing the document, and (4) the time for coding the document and saving document. If the time for loading document is 1 second per document on average, the total cost could be 150*(1*1,000,000)/3600=$41,700 per million, assuming that reviewers are billed at the rate of $150 per hour. Thus, when a law firm uses a network speed at 1 minute per document, the bottom line price would be $3.3 million. This time component depends upon the design features of the review systems, maturity of review software, the availability of the supporting applications, and sustained bandwidth for the internet connection. Feeding illegible documents to a review platform alone can double or triple review cost. The second time component has a lot to do with the experience of reviewers and familiarity with the case. A reviewer with considerable experience in the field and knows the language context need less time to read the document. In contrast, a new reviewer needs more time to read the document. The third time component depends upon reviewer experience, the amount of case information, the nature of legal matter, and the complexity of legal issues. The last time component depends upon system design of tagging pane, coding logic, the client computer, and network speed. Impossible, confusing, and conflicting coding logic will cause reviewers to struggle. Other factors, which can make this problem worse, include slow network speed, limited bandwidth, and the layout and design of various web panes.

Documents may be reviewed for different purposes in one to many rounds. The total cost is approximately proportional to the rounds of reviews. Anything that affects individual's review time and the number of reviews affects the total cost. A great number of parameters affect the total cost of a given project. Any problem can substantially increase final production costs. For example, a bad review platform may lack the tools for performing tasks productively; inexperienced reviewers need more time to review documents; poor network condition takes longer time to download documents; a bad review plan may require more review passes to perform same tasks; and bad management may be responsible for more corrective reviews, and sudden changes in litigation needs may require corrective review.

Another reason for high costs is the time needed for conducting corrective review and fixes. Many large production projects have more than a million of documents. While the review platform allows project mangers to track document review statuses, but it is not always possible in all the situations. Documents are reviewed and processed, various logs are constructed, and corrective reviews are conducted for various purposes. A quality control review at any stage may reveal review problems such as errors and omissions, but it is not easy to correct all problems. The mistakes and inaccuracies may find their ways to the document coding database, production log, privilege pool, privilege log, and hot document log. Certain mistakes such as omitted documents can be fixed. Other problems such as using incorrect definitions, using wrong tagging conventions, omission of required tasks, and use of a wrong analysis method are more difficult to correct. After a project has started for weeks and months, correction of any problems is never easy. The nature of this task can be as tedious as picking up a few sands from a bowl of cooked rice. The costs can be very high if the only solution is to conduct a corrective review for all involved documents. Many times, corrective review is conduced for all affected work products, all logs, and other memorandum. Any small mistake is equivalent to waste of hundreds of thousands of dollars. Document production is an extremely time-consuming, extremely difficult, and extremely expensive task.

The large amount of case information, commingled foreign languages, a large number of file types and prevalent technical problems are responsible for unmanageable discovery costs. Many additional factors such as poor review plans, reviewers skills and experiences, confusing review instructions, missed applications in review computers, poor definitions in the coding pane, bad structures of coding tree, and unavailable passwords are among other factors contributing to the high costs.

Great effort has been made in the industry to reduce discovery costs. Review costs and review accuracy are intertwined. Highest accuracy can be achieved by spending unlimited time to review and analyze documents. Lowest costs can be achieved by letting a computer code documents. A reasonable objective is to achieve good accuracy at reasonable costs in reasonable time. One way to reduce review costs is to reduce the number of documents in the review pool. A well-designed search method may identify the most-probably-relevant documents to be included in the review pool. Each of the documents is then subject to several rounds of reviews by the reviewers. Some computer search methods can be used to reduce the review pool by as much as 80% of documents. The deduced size of the document pool directly reduces the final costs of production.

To further reduce the costs, some platform vendors have developed computer algorithms for automatically coding documents. A small number of sample documents are taken and reviewed to identify suitable search keys and search key matrix which are used to search documents. Based upon whether certain search keys and key combinations are found in documents, the server codes the documents accordingly. Such computer algorithms may save a great deal of review costs but cannot be used to code documents in contentious cases. Other algorithms may imitate the coding done by human reviewers for similar or related documents.

F. Review Experience and Learning Process

In a typical review, reviewers start learning basic case information. The learning process for experienced reviewers is different from that for inexperienced reviewers. All reviewers have to learn basic case facts, review instructions, and review software. Experienced reviewers can go through this process faster because they do not need to learn everything. They only need to learn case facts and the unique or different aspects of review procedure, background law, substantive instructions, review platform, tags structure, and coding conventions. In a second request review, experienced reviewers might have known most of the two dozens requests. They only need to learn those unique and distinctive requests, and they are familiar with most of concepts such as market shares, sale prices, costs of saving, cost and benefit analysis, and antitrust sensitive issues. They also know the basics for conducting responsiveness and privilege review, and thus do not need to spend time to learn everything and develop new skills for applying requests to documents. They may know short cuts for conducting relevancy analysis and privilege analysis. It is far less likely for them to make fatal errors under reasonable review speeds. In comparison, new reviewers have too many new things to learn. New things include case facts, review procedure, background law, review instructions, review platform features, tags structures, coding conventions, analytical methods, and handling platform problems. They need to develop basic skills for conducting legal analysis, applying document definitions to documents, and performing complex analysis. They may make a coding error as a result of using a wrong approach in conducting legal analysis or failing to realize important facts.

All reviewers cannot reach their full potential in all reviews. One reason is that they cannot master everything. Their workflow may be interrupted because they have to address less frequently encountered facts, terms, expressions, things, people, and places. If a company has used two thousand attorneys, a reviewer can remember one hundred names, which appear frequently. The reviewer is unable to remember the remaining one thousand nine hundred attorney names. Whenever the reviewer encounters those unfamiliar attorney names, the reviewer needs to check them against the names list. In addition, they have to sporadically deal with issues such as illegible documents, handwritten notes, foreign languages, compressed files, missing passwords, large spreadsheets, database files, and troublesome web pages. This explains why their performance curves level off.

Experienced reviewers have their own peculiar "liabilities." Due to insufficient review guidelines, experienced reviewers may import the meanings of special terms such as responsive, significance, privilege, and technical issues into the current project. Importation of different interpretation rules can directly compromise review objective. Tagging logic and coding conventions are different from sites to sites, and written review manuals seldom provide any details to alert the reviewers to their uniqueness features. Review manuals may contain many interpreting gaps. Experienced reviewers may fill the gaps with what they know. They might port into the current case prior procedures, substantive definitions, and interpretation rules, coding rules, and tag configurations. As a result, they might code documents contrary to site requirements.

On review projects run by new associates, quality control data often reveals that experienced reviewers perform worse than new reviewers. There are several reasons for this noted "poor performance."

The first reason is their differences in interpretation philosophy. Experienced reviewers tend to read requests more narrowly and pay more attention to substance. Thus, they exclude more documents in a document production for an opposing party. New reviewers and new associates tend to read definitions more broadly and pay more attention to the requests' literal meanings than its substance. Experienced reviewers, especially those with best litigation background, may exclude documents that merely mention buzzwords without real substances. They might exclude hundreds of types of documents. By reading requests literally, the requests can squarely read on those documents. However, the documents are not the kinds of documents the request drafters would need. If one of the documents were coded as privileged, the substance in the document would be insufficient to fill a defensible log entry. By using this literal relevancy standard, the manager would regard many coding decisions as errors.

Over-inclusion of non-responsive documents is a prevalent problem under the current review models. The Department of Justice returned documents on the ground that the production contained too many irrelevant documents. An incidence like this clearly suggests that relevancy should be determined based upon document substance at least in some cases. By using different interpreting philosophies, new reviewers can achieve better consistency but experienced reviewers may achieve low consistencies. This also explains why high school students can achieve high consistencies when they are asked to code documents according to a list of definitions in a few simple steps. High school students can perform better in performing simple three-step manual tasks. When quality control staff also takes the literal approach, experienced reviewers will be the minority.

The second reason for devaluing review experience is that the current review model is unable to utilize the reviewer's experience and knowledge. For a corporate client conducting business in multiple industries, its manufacturing products touch many fields, and so do its technologies. Therefore, corporate documents may include executive's elegant speeches, counsel's sophisticated legal analysis, sales staff's routine reports, all kinds of complex secured transaction files, personal informal email, various legal instruments, hard-to-understand financial records, R&D experiment reports, and quality control test data. As diverse as corporate documents are the backgrounds of document reviewers. The reviewers may have majored in literature, history, business administration, secured transactions, accounting, life sciences, physical sciences, chemical engineering, mechanical engineering, software and information technology, electrical engineering, and medicines. By using the current assignment methods, documents are processed by custodians. Same or similar documents are assigned to many reviewers randomly, just like lottery balls to be blown out of a drawing vent to land in review folders or ranges. Most documents that they review are not relevant to their experience and knowledge. In addition, they review documents out of context and thus cannot understand special, implied, omitted, and misspelled terms in abundance. Naturally, every reviewer codes documents by best guess. What they are actually doing is to classify documents based upon what they can understand from the documents. In conducting this kind of cursory review, experience may be a waste.

G. Review Performance Requirements

All cases can be classified into three types on the basis of their requirements for review accuracy: (1) low or no requirement, (2) moderate requirement, (3) very high requirement. In certain matters, document productions may be a formality matter. In some merger cases where the final combined market share is still way below 50%, a document review may be a matter of process unless there are real antitrust issues. If the documents do not contain other risky subjects, high school students and even computer algorithms could do the job. A majority of cases do require reasonable accuracy. In those cases, final disposition depends upon their documentary evidence. The parties win with evidence but lose for evidence. When both sides do not have solid evidence to back up their claims and defenses, they go by the usual route: to settle their cases. The final settlement price most probably depends upon the relative strengths of documentary evidence. The third class of cases requires very high review accuracy. In this class of cases, the stake may be millions to billions dollars of punitive damages, triple civil damages, twenty years jail time for the executives, and even company's right to exist. Those cases include securities class action, product liability action, high-profile patent infringement action, and violation of sensitive statutes such as Foreign Corruption Practice and Export Control Law. The method of present invention is primarily intended for the last two classes of cases.

Some review sites reveal the need to train reviewers to improve review speed and review quality. On some review sites, helpful information is posted on a blackboard or clipboard for sharing. This effort is intended to identify coding problems and prevent coding errors. Discussion meetings may be conducted on a daily or weekly basis. This method is, however, ineffective and inconvenient. Oral communication is ineffective to discuss subtle coding issues, and cannot be used to share complex facts between reviewers. Some review sites provide a questions-and-answers forum, where the reviewers provide questions and project managers provide answers one or several days later. Sharing information by using Windows share drive has also been used as early as the birth of the window operation system itself. However, this method presents several problems. First, such arrangement does not allow plural reviewers to write information to the same source and Windows operating system may lock up the file when one reviewer opens the file. To avoid this problem, each of the reviewers is allocated a time slot to enter questions. It can waste a great deal of administrative time. Second, such a method cannot be standardized to implement many functions. Different cases may require totally different ways of organizing and sharing case information. Thus, this method can be implemented only for questions and answers. Finally, there is no suitable way to ensure that all information posted on the Excel is accurate and reliable. Posting a piece of wrong information for sharing may cause other reviewers to make a wrong coding decision. As a result, only project managers and litigation attorneys can answer such questions. The law firms do not want to use such method to share elementary facts that may control coding decisions in many related documents. The question-and-answer method could be conducted by email, email attachments, web pages, or web page attachments. However, the method is seldom used for similar reasons. It cannot be used to share elementary facts in real time, and there is no proper way to ensure data accuracy.

The whole review process of any review is a learning process for learning a mass amount of case information. Each case presents an overwhelming number of elementary facts and undefined or unfamiliar terms. This learning process will not end until the review project is finished.

H. Prior Art Search and Highlight Methods

Most of the document review platforms used a method for highlighting potentially relevant key words by the server. A data processing vendor requests a list of key words from litigation attorneys, and uses the key words as search keys. Each time, when a document is culled for review, the server uses the keys to conduct a search in the document. If it finds a search key, the server adds a marking or required code in the document, it continues to search the document, finds the same word in another location, and marks it up. It then goes through the outer loop and searches the document using a second key, finds all found words, and marks them up. It goes through all keys in turn and marks all found words. The process of adding highlight code may be done in the initial loading or even long before the review. It can be done in any time.

The code added in the document is responsible for the displayed color of the found word. After the document is rendered, the reviewer may see one or more keys highlighted, and if any key is found at multiple locations, all of the found words are highlighted up. If search keys are "good," "bad," and "average" and if the document contains "good" and "bad," those two words are marked in designated colors.

The program for highlighting found words may go through the document in a single trip, and for each word, the program compares the word against each of the search keys, and marks each found word. There are all kinds of known algorithms and methods for searching using many search keys, marking found words in one or more colors, constructing a web page, and delivering the web page to the review computer. This search algorithms are considered matured art and have been used to search text files, TIFF files, PDF files, etc.

The same highlighting method has been used to highlight privilege terms that generally include attorney names and a large number of privileged terms. The current method has several issues. The search terms are formulated in advance. It is often the case that a large number of non-relevant terms are highlighted while the important terms are not lit up. Second, it is difficult to update the keys. It often takes days to collect information before an update to the search keys can be done. Due to the roles of expendable and over-inclusive search keys, trusted staff generally selects and formulates search keys. Selecting improper search keys would make this feature useless. Finally, this highlighting feature does not provide meanings of highlighted words. Instead, the reviewers are provided with binders that may contain the information and are expected to find the meanings there.

All review platforms also provide one web-page search tool that allows the reviewer to enter one single string to search the current document. When it finds the term, it highlights it. The reviewer can move the highlight color to next hit by clicking a button. This function is similar to the "Find" function in a word processor.

SUMMARY OF THE INVENTION

The present invention is a process for facilitating collaborative work by all entities and players in a document review project. It allows all players including litigation attorneys, document processors, project managers, and review attorneys to write down their real time instructions so that others players will know all respective instructions and thus avoid misunderstanding.

The present invention is a process for sharing work products during the entire review process. By this process, the reviewers can share their work products, reuse elementary work pieces, and avoid conducting duplicate research, analysis, and fact-finding. As a result, the reviewers can avoid working on duplicate tasks and use the time to hunt for important information.

The present invention is a process that allows the managing staff to instantaneously change their review standards, construction rules, coding rules, methods of treating documents, and elementary facts. By using this process, the whole review team can reduce the amount of time for fixes, reworks, and corrective review to the minimum theoretically.

The present invention is a process by which conflicting instructions between litigation attorneys can be minimized and avoided; different interpretations of same rules, instructions and guidelines by different reviewers can be minimized; conflicting and inconsistent treatments of documents can be minimized; coding errors caused by different understandings of the same rules and instructions as a result of reviewers' different experience can be minimized.

The present invention is a process by which each of the involved players can get instantaneous feedback concerning the review project. Experienced litigation attorneys such as partners, associates and staff attorneys can know document composition, potential scope of responses, technical issues, hot issues, significant facts, files types, and the potential problems in the document requests. The real time feedback gives the litigation attorneys the earliest opportunities to make earliest adjustments to review protocol, review guidelines, request definitions, and coding rules.

By using the process, the litigation attorneys can make real time changes to any of the review aspects in any time and anywhere. They can change the scope of review, reviewing guidelines, request definitions, coding rules, hot document definitions, significant issues, important players, attorney list, and the treatments of special documents. Therefore, the process helps the attorneys meet the unexpected and surprising needs inherent in the dynamics of litigation.

The present invention is a process by which all parties can control data integrity. No individual reviewer can enter factually wrong information to harm the whole project. Any facts, work products, analysis, and person names that are important to the case are subject to a rigid verification. After a basic fact is settled, the entire review team can trust it, share it, and use it. Yet, each of the reviewers can see only the information that the reviewers have a need to know and enter information the reviewer has a need to enter.

The present invention is a process that provides objective performance rating standard so that the performance of reviewers can be rated objectively. Under the existing review system, the reviewers would be rated by subjective standards of less competent reviewers. Moreover, the performance of the reviewers can be judged in light of the changes in review guidelines, document requests, coding rules, and special instructions. This can improve the objectivity and fairness of performance evaluations.

The present invention is a process by which the review will be concluded with detailed changing histories concerning all aspects of the review. It may include document requests, review protocol, important terms, people names, transaction names, substantive rules, coding rules, and the reasons for the changes. Therefore, the history data created in the process will ensure the case to succeed down the road. The history data can facilitate the process of changing law firms, litigation attorneys, document processors, and review reviewers. The history data will help the law firms meet unexpected needs more easily during motion hearing, merit trials, and appeals. The history data may also be used in the discovery of related cases of the client.

The invention is also a process that provides a most convenient forum for the cooperative discovery efforts between different litigation attorneys, between law firms, and between different reviewers. Thus, a review can be conducted in two or more sites in different cities and different countries. They can share details as if they worked at the same site.

The invention is also a process, which reduces complicated coding rules, document requests, and the data records concerning elementary facts into invisible data pieces dynamically. The transformation from a large number of coding rules, document requests, and elementary facts data records into data pieces is done before the review starts, but continues throughout the review process in real time. As a result of the transformation, reviewers have no need to remember all details. Yet, when a reviewer needs to know a specific coding rule and elementary fact, the reviewer can get it instantly.

The invention is a process for providing an improved search tool that allows each of the reviewers to swap between a plurality of personal or private key arrays and can dramatically reduce the number of searches in accurate document review.

The invention is a process for generating configurable intelligent and swappable reference tables, each of which shows definitions for at least some of the highlighted terms in the document. This reference table next to the document can help the reviewer quickly know the meanings of the highlighted primarily special terms in the document.

The invention is also a process for assigning tentative issue code for any documents by using an assign-and-publish method so that each of the reviewers can use the tentative issue code for the same or similar documents, but avoid using the same code for different documents.

BRIEF DESCRIPTION OF DRAWINGS

FIG. 8 shows the web user interface of a discovery information management system (also "review-assisting system").

FIG. 11 shows a data entry form for adding a coding rule to the coding table.

FIG. 12 shows a data entry form for adding a data record concerning a person to the database table.

FIG. 13 shows the web page for adding a data record for an acronym to the database table.

FIG. 14 shows the search result page after the user types in a key and clicks the global search button.

FIG. 15 shows the web index table showing all cumulative changes and latest changes.

FIG. 16 shows the full search page (with setup links) for conducting searches using a plurality of personal or private search key arrays.

FIG. 17 shows the setup page for a user to set up the search tool using multiple personal or private search key arrays.

FIG. 18 shows a compact search page for conducting searches using a plurality of personal or private search key arrays.

FIG. 23 shows a setup page for setting up reference tables for all virtual tables for a system using one single shared database table.

FIG. 24 shows a simplified setup page for setting up reference tables for a plurality of individual database tables.

FIG. 25 shows a full setup page for setting up one reference table for the product table.

DETAILED DESCRIPTION OF THE INVENTION

Figure 1:
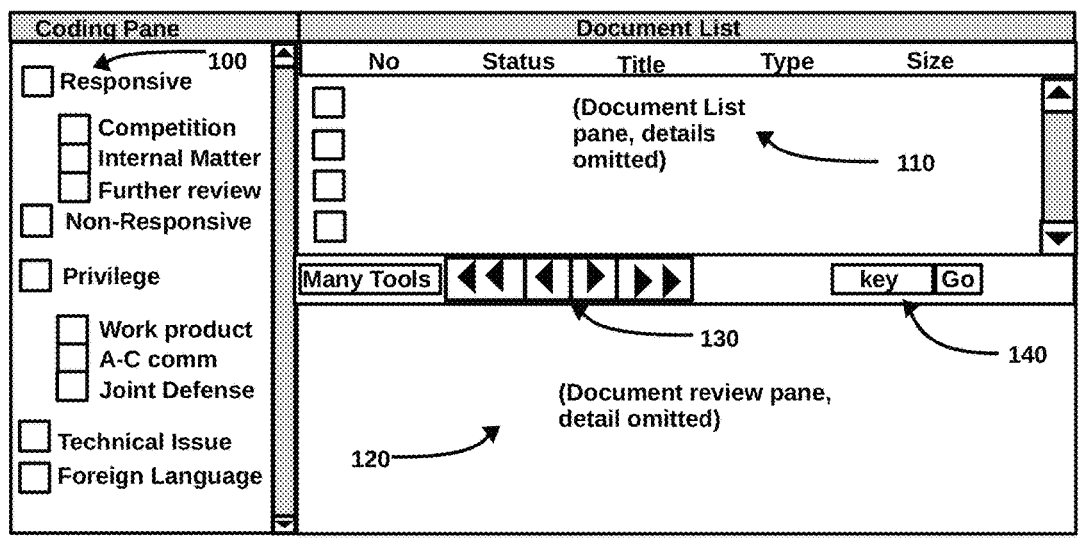
FIG. 1 shows a typical web user interface of a typical document review platform.

The present invention is a systematic method for improving review performance in a complex representation model. The concept is to unify all attorneys as a super attorney and unify all document reviewers as a super reviewer. The method helps the reviewers reconstruct the relationship of segregated documents and allow the reviewers to review documents in a virtual context. The method is able to minimize misunderstandings among lawyers, reviewers and technicians. Therefore, the method can improve document review accuracy and performance. To understand the present invention, one need to understand the prior art review model and the problems in the complex representation.

A. Relevant Corporate Document Characteristics

Two characteristics relevant to document review include the unique way of presenting verbal context and incorporation of well-known facts in documents.

First, verbal context in corporate documents are very different from the concept in linguistics science. All relevant documents in a contract dispute may cover series of subjects from initial marking effort, initial contact, preparation of bidding documents, tendering of bids, formation of contract, post-bidding activities, delivery of products, making payment, natural disaster, material cost increase, breach of contract, termination of contract, filing a lawsuit, retention of law firms, settlement discussion, drafting settlement agreement, and signing settlement agreement. The proper verbal context of any document may be found in many other precedent or related documents. The verbal context in most documents is deficient but may be found in other related or precedent documents.

Second, many transaction documents do not provide all of the important facts. The documents may freely incorporate all facts commonly known in the corporation and all facts the players know concerning the transaction. Therefore, many documents do not provide background information, verbal context, and transaction context. In the eyes of document reviewers, the documents contain unexplained terms, implied assumptions, mysterious persons, unknown product names, unknown serial number, unknown locations, unknown times, unknown purposes, unknown anything and everything.

The disruption of the verbal context caused by document assignment makes it more difficult to ascertain "transaction context." Accurate review of documents is impossible under the current review model.

B. Single Super Lawyer Representation Model

A single super lawyer representation model ("SSL") is a traditional representation model by which a single lawyer does all essential legal services. In this SSL practice model, the lawyer (1) knows all laws; (2) makes all strategic decisions and makes all necessary changes; (3) reviews all documents and thus understands every term and assumption; (4) knows all elementary facts and their significance; (5) knows all legal issues; (6) does not have any internal communication problem; and (7) has no divided royalty, no conflicts of interest, and has little concern with his own liability. Therefore, the super lawyer can deliver superb legal services at the highest productivity.

C. Multiple Players Tasks-Divided Representation Model

A multiple players tasks-divided representation model ("MPTD") is one by which one or more law firms or a group of lawyers represent the client, with necessary supports from document reviewers, consultants, and data-hosting companies. This representation model (also will be referred to as "complex representation") creates all kinds of problems.

(1) There are N lawyers. The lawyer A knows a subset of laws, lawyer B knows a subset of laws, lawyer N knows a subset of laws; lawyer A makes some strategic decisions, lawyer B makes some strategic decisions, lawyer N makes some strategic decisions; Lawyer A and B make some strategic changes, lawyer A and C makes some strategic changes . . . . Newly entered lawyer X knows neither past strategies, nor the histories of strategic changes . . . . All lawyers express a thing in different ways, and understand the same definition with different scopes.

(2) In this complex representation model, case knowledge is divided among many lawyers and many reviewers. Due to a great number of documents, document review task is delegated to a plurality of document reviewers. Reviewer A works on a set of documents, understands some terms and assumptions, knows a set of elementary facts and their significance; reviewer B works on a different set of documents, understands different terms and assumptions, knows a different set of elementary facts and their significance; and reviewer N reviews yet another set of documents, understands different terms and assumptions, and knows another set of elementary facts and their significance. If a new document reviewer enters the case in a later stage, the reviewer understands much less than those who have reviewed more documents. The technicians for processing documents may be responsible for different tasks. The case knowledge is passed onto different lawyers in different degrees.

(3) The division of tasks also means everything is done by duplicates. Every reviewer needs to understand the same company history, all transactions, all common terms, and all legal issues.

(4) This complex model creates serious communication problems. Whenever an attorney provides an instruction, the document reviewers take it with different understanding. It is impossible to eliminate different interpretations no matter how much effort the attorney makes. Whenever a document reviewer provides feedback to attorneys, the attorneys understand it in different ways, regardless of how much clarification the reviewer makes. When document reviewers discuss a matter among themselves, they interpret it in different ways and take it differently, depending upon different documents they have reviewed, different experience they have, and different approaches they use.

(5) Due to the need to divide documents among many reviewers, a set of documents concerning a single transaction, event, or fact may be assigned to several reviewers. When tens of thousands of documents are drawn from their sources, and arbitrarily assigned to fifty reviewers according to search keys, the assignment totally disrupts cross-document verbal context and transaction context. A reviewer may first review documents equivalent to "Chapter 99", then "Charter 10," and finally "Charter 1." After the reviewer misunderstands case facts on many occasions, the reviewer finally knows the whole story when the review is concluded, but may still "miss" many chapters. Document assignment disrupts the "cross-document verbal context" and makes it more difficult or impossible to ascertain "transaction context."

(6) Due to practical difficulty in using cross-document context, each document is reviewed on its face and its significance is determined on the face and attachments. Many documents omit basic assumptions and concern only one or a few aspects of a transaction, event, or fact. By using this review model, the reviewers may code a large number of potentially relevant documents as non-responsive. In a case where the task is to identify documents in support of claims or defenses, the reviewers are provided with a list of document definitions. By using this gold-standard method, the review production always contains two types of errors: coding as responsive a large number of non-responsive, immaterial, or meaningless documents simply they meet one of the definitions, and coding as non-responsive documents that simply miss one or more elements on the face.

(7) In this complex representation model, conflict-of-interest rules have facilitated the hiring and employment of inexperienced legal staff. Hiring an experienced attorney may disqualify a law firm from representing many clients as a result of imputed conflicts. In a typical case, an experienced attorney may have worked for fifty corporations and against eighty corporations. By hiring the attorney, the law firm will not be able to represent any clients in a suit against the fifty corporations, and may be unable to represent the eighty corporations that the attorney once worked against. Imagine if a law firm hires a large number of experienced attorneys, this imputation of conflicts could put the law firm out of business. To avoid losing business opportunities due to imputed conflicts, law firms hire only law new graduates as associates. Law firm will not hire experienced attorneys unless the attorneys can bring in more business rather than cause the law firm to lose business.

(8) Law firms generally use new associates to manage review projects, which are probably more difficult than the Manhattan Project, and the lack of experience and special knowledge of review projects can dramatically increase review costs and greatly reduce review quality. Ultimately, it is the clients who collectively absorb the costs caused by the conflict-of-interest rules, which were intended to protect them. The conflict of interest rules also have a profound impact on document review. Despite the shielding of staffing agencies, some law firms still broadly apply conflict-of-interest rules to exclude experienced reviewers. Some law firms require review candidates provide detailed information on every case they ever worked. This burden placed on the candidates and the conflict-screening staff alone is sufficient to discourage experienced reviewers. By using this practice, some law firms retain only document reviewers who have no technical background, no relevant legal background, and no specific case experience. The total lack of relevant experiences are the root cause for high review costs and poor review quality. Having developed a business model of using inexperienced review team, the law firms will not let document reviewers to handle important tasks even like determining the attorney identity.

(9) Intensive competition among staffing agencies further worsens the selection of reviewers. The only thing important to staff agency is to win staffing contracts. In this industry, no body makes effort to find the best fitted reviewers by evaluating legal background, technical background, and relevant case experience. No effort is made to correlate pay rates with reviewer's educational levels, experience levels, knowledge relevancy, performance levels, and task nature. Agencies use only bar license, and, in some cases, law school ranking and GPA as hiring criteria. None of them are relevant to particular cases. In selecting foreign language reviewers, no effort is made to determine reviewers' foreign language capacity. Some agencies select foreign language reviewers by ranking the "score" that candidates achieved in a fifteen-question language test. They value only reviewers who will not make any "troubles." The total mismatch between talents and needs are another reason why computer algorithms can perform "better" than licensed attorneys.

(10) This complex representation model also creates subtle distrusted relationships among all participants. The liability law allows the client to sue the law firm for malpractice, and attorneys may be dismissed or demoted for poor performance by their own firms. When a group of attorneys from one or more firms work on the same case, they are potentially rivals. When a law firm uses outside contractors as document reviewers, the law firm is very defensive. It does not allow document reviewers to make any statements that may reflect the law firm's poor judgment, poor performance, and mistakes. Project managers do not allow anyone to interfere with their jobs. Whenever something bad happens, reviewers blame the review platform, the data-hosting vendor blames document reviewers, and the law firm blames the reviewers. The attorney managing the review may be quickly dismissed for a major defeat. When new graduates manage a review project, they may implement methods and solutions that are unworkable, unproductive, or even risky. They do not like to hear suggestions from experienced reviewers, and few reviewers volunteer to offer help. Document reviewers are dismissed for any trivial reasons or for doing anything making the law firm and the managers uncomfortable. When a reviewer is dismissed after six months, it would take six months to train a replacement reviewer. The new reviewer will go through the same learning process to pick up case information, and will make the same or similar errors. When an entire review team is dismissed, the client pays an ultimate price.

(11) Clients and law firms do not see the importance of document review. Many reviews are so unimportant that they are housed in poorly lit and poorly ventilated buildings. The industry has set the current pay rate at about one tenth of the billing rates for a first-year associate. They receive little benefits. If they are offered with certain benefits such as holiday pays, insurances, and other benefits, they often cannot actually get them for various reasons. The industry seems to view document review as a dispensable task.

(12) Document reviewers do not have the super lawyer's passion to deliver best performance. Their earning does not provide an incentive for them to stay in the field. Moreover, pay rates are not correlated to reviewers' experience levels, education level, technical background, specific case experience, historical performance, and actual contributions. The industry provides no financial reward, professional reward, name recognition, and anything for making positive contributions. Therefore, new graduates take document review as transition jobs, established attorneys do documents as complementary services to their own practice, and many reviewers do document review as their side jobs. The only things they care about are pay rates, project duration, work hours, and required daily reviewed document number. Most reviewers just want to stay on the review project by coding whatever number they are asked. This lack of motivation is the main obstacle to improving review performance. If reviewers try to offer help to improve review, they will soon realize that the reward is dismissal or early termination.

(13) The business globalization has created many serious language problems that the review industry can neither understand nor handle. Few has even realized that translating documents from any non-English language into English generally cannot deliver a threshold accuracy that is required for conducting legal analysis for many cases. Law firms pay more attention to their work-product "image" than to the truth. Some law firms routinely retain reviewers and translators in favor of non-native speakers, routinely use out-of-verbal-context translation services of off-site vendors, and actively seek "elegant" and "smooth" translations. The demand for elegant English-style exhibits would force translators to rewrite stories inconsistent with their native meanings. As a result of those irrational practices, many translation pools may contain massive errors caused by missing context, unavoidable distortions, large numbers of inconsistent terms, omission of cultural meanings, and total meaning changes due to the changes in contextual assumptions. Many cases as viewed from translated exhibits may be not the same cases, as viewed from their native languages. Nothing can be done to address translators' super judge's roles.

D. Performance Measure: Sources of Errors and Inaccuracies

The invention is intended to improve document review accuracy, and it is therefore necessary to find a suitable measure for accuracy.

1. Sources of Errors and Inaccuracies.

The inventor has observed errors and inaccuracies including (1) improper scopes of document requests or definitions, (2) poor and confusing coding instructions, (3) human errors attributable to review platforms, (4) "errors" and "inconsistencies" resulted from changes, (5) clear mistakes in misunderstanding facts; (6) inability to determine relevancy from inherent properties, (7) uncertainty in determining relevancy from a mixture properties, (8) errors from memory, (9) errors from lack of uniform standards, and (10) poor or lacking communications. The biggest source of error contribution is by far the document requests and this is a matter that only the drafters can improve.

2. Review Performance Measure

Ultimate performance criteria. First, the quality of a document review is ultimately judged from its performance in achieving client's final goal. If the work product of a review gives the client the best chance to win its case without exposing additional risks, the review quality is excellent. If the work product gives the client a fair chance to win or defend its case, the review quality is fair. If the work product ruins the client chance to win or defend its case, the quality is bad, notwithstanding good consistencies and low error rates. Second, the useful review performance measure should be adjusted against the changes due to litigation needs. Finally, review performance measure should take into account of how well the review product addresses critical legal issues, protect client's business secrets, control unnecessary scandals, and reduce the risk of exposing additional liabilities. Finally, it should weigh the production costs relative to the stakes of the case. Many of those performance parameters cannot be directly measured in reality.

Error rate and coding inconsistency are often used in performance measurement. It is well known that document review is highly dynamic due to the nature of litigation. The law firm has to make changes to review strategies, document definitions, review protocol, software tools, assignment, etc. from time to time. Every change and adjustment is intended to further the client's objectives even though some changes may be bad tries. The changes inevitably increase coding "errors" and coding "inconsistencies." For such obvious reasons, coding errors and coding inconsistencies should be rejected. A better performance measure is proposed below.

Figure 2:
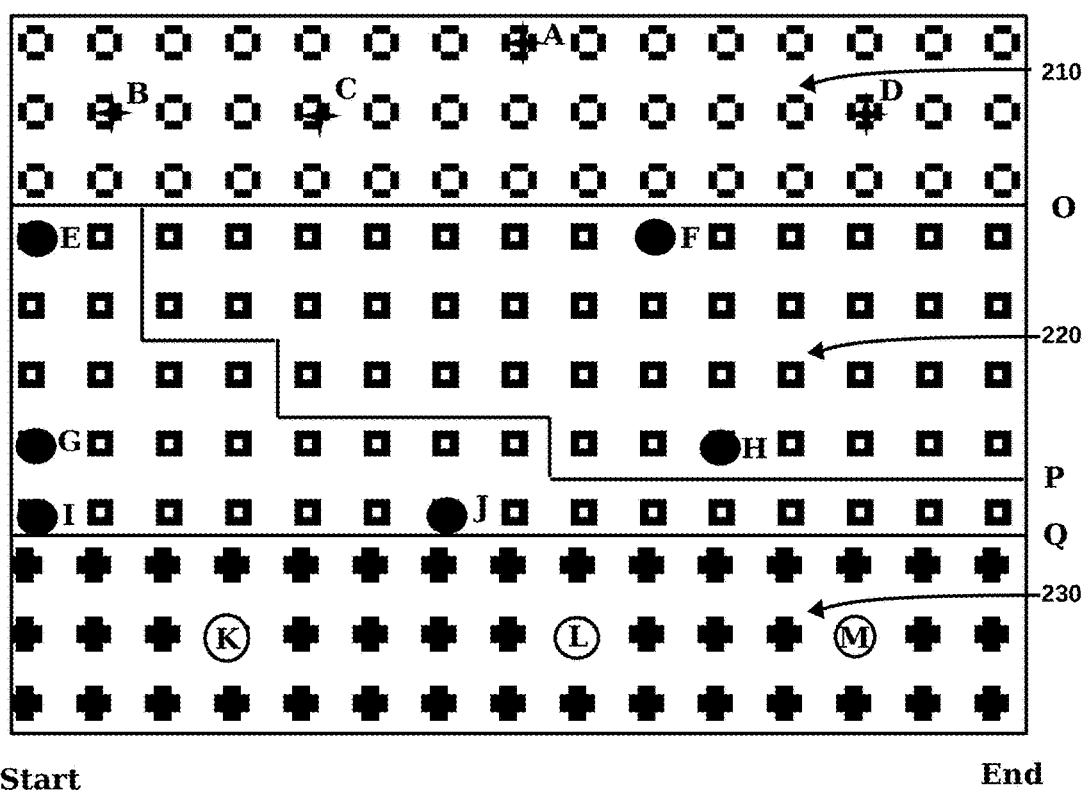
FIG. 2 shows three areas respectively for non-responsive documents, arguably responsive documents, and responsive documents.

FIG. 2 shows how documents fall within three areas for non-responsive documents 210, arguably responsive documents 220, and responsive documents 230. Responsiveness means that the document is included in this request. This figure shows the entire area is divided by line O and Q. All documents above line O are non-responsive. They cannot be read on by the request in any conceivable way. The documents below line Q are clearly responsive to the request. The definition reads on them not only literally. The area 230 does not include all documents that are reached by a mere literal reading. All documents in area 220 between lines O and P are arguably responsive. This area includes all documents that the request reads on literally, but also documents that are meaningless. Line O is a hypothetical upper bound defined by the request and Line Q is a hypothetical lower bound defined by the request. Those bounds are imaginary because neither the drafter nor the reviewers know their precise positions. Line P represents a real coding bound which has been used in the review. This bound is formed as a result of necessities, negotiation, litigation, and risk-taking decisions.

Type I error. Type I error occurs when a responsive document is coded as non-responsive document. For the privilege tag, this is an error that a privilege document is coded as non-privileged document. This is a serious error. Documents K, L, and M in area 230 are actually responsive, but are coded as non-responsive documents.

Type II error. A type II error occurs when non-responsive document is coded as responsive document. Documents A, B, C and D in the area 210 are non-responsive documents but are coded as responsive. For the privilege tag, this error is made when a non-privilege document is coded as privileged document. This is a less serious error generally, but may increase a risk of leaking business secrets.

Apparent coding inconsistencies. Coding inconsistency is a measure of the coding differences for same or similar documents. Document E and document F in the area 220 contain same or similar substance, but they are coded consistently. So are document I and document J, which are coded consistently. However, document G is coded as responsive under the initial rule, but document H, which contains the same substance, is coded as non-responsive, as a result of change in the request. Under the initial hypothetical bound, all documents within the area 220 formed by lines O and Q could be responsive. However, due to three changes to the requests or coding rules, as indicted by three vertical lines in line P, all documents in the area formed by the lines O and P are considered as non-responsive. The tag values coded in the early stage may be directly conflicting with tag values coded in a later stage. To eliminate this type of coding conflicts, the solution is to conduct a corrective review for the prior-coded documents according to the final coding rules. If client's resources do not allow for reconciling review, the work products will have great inconsistencies. Considering the sources of coding errors and inconsistency, any measures based upon pure statistical quantities such as sum of squares, variances, and deviations from hypothetical definitions are meaningless. The inconsistency should be adjusted against the actual boundary P. Only an inconsistency between two documents under the same coding rule is counted as real inconsistency. Document I and document J are within the arguably responsive area, and, if they are coded differently, they are considered a real inconsistency. Document G is coded as responsive while document H is coded as non-responsive. The coding difference between G and H are the result of different coding rules. Document E and its close right neighbor document contain similar substance. If document E and neighbor are coded differently, the difference would be a real inconsistency.

The apparent inconsistency measure has no practical utilities from the super lawyer's point of view. The single super lawyer is never concerned with apparent coding inconsistencies. The super layer can fulfill his ethical duty by producing at least one copy of the responsive document. One potential problem of the poor inconsistencies in certain cases is it may invite unnecessary challenges or gives the adversary weapons to complain. In such a challenge, the super lawyer most probably wins. A super lawyer will never make a blunder. In highly contentious cases, the goal is producing only legally required documents but keeping non-responsive documents. Balancing the legal obligations to the opposing party and client's interest in protecting business secrets and controlling exposure risks, the super lawyer will have no difficulty to prevail on any complaint based upon coding inconsistencies. Besides, the super lawyer can cite endless reasons such as improper requests, excessive production burden, negotiations and clarifications, high review speed, unavoidable human errors, different analysis philosophies, and different judgment calls. Even if everything fails, the court may still find that the error is harmless.

Adjusted coding inconsistencies. To evaluate true inconsistencies, one possible method is to determine sum of squares or variances based upon properly designated score for each conflicting coding for each time period while the coding rules are not changed, and then compute a properly-weighed quantity for all documents for all tags. In this way, the inconsistency measure is adjusted against the changes in coding rules and requests. When this adjustment is made, the coding performance of review is not as bad as they appear. From the above analysis, the apparent inconsistencies should be rejected and adjusted coding inconsistencies should be used as measure of performance. The adjusted coding inconsistencies measure may encourage law firms to be more aggressive in handling documents.

Any inconsistencies measure, apparent or adjusted, may be rejected for the total lack of objective standard. In the present, the "error" rates and inconsistencies are based upon subjective manager's review or a second review. The managers and second reviewers may embrace a discovery approach, which is contrary to that of the super lawyer. According to one school of thought, it is the easiest and safest to produce documents by using literal reading method. This eliminates the need to make a hard determination of relevancy, and reduces the chance to defend a motion. According to the other school of thought, the party should produce only legally required minimum number of documents, but keep non-responsive documents that can increase the risks of losing trade secrets, customer list, pipeline products, business plans, and client's future liabilities. It is impossible to actually see the risks by examining individual documents. Experts can figure out business plans and highly sensitive trade secrets by studying documents. Moreover, none of available protective measures such as court protective orders, confidential stamp marks, and non-disclosure agreement has the same level of protection as withholding them. The inconsistencies measure should be rejected.

The adjusted inconsistencies measure may provide a rough estimate for individual reviewer's performance, but this measure alone is never sufficient. It does not give any credit to the reviewers who identify and properly code highly critical documents. The client may win or lose on a small number of documents. In many cases, the coding of rest 95% documents may be a matter of process but the outcome may hinge on a small set of documents. Also, this measure is unable to take into account the individual contributions to the team work in a collaborative discovery environment.

Any emphasis of inconsistencies and the number of documents may have more negative impact than positive impacts on the client cause on any contested cases. One should note the fundamental differences between widget manufacture and litigation production. In manufacturing, the total revenue is always based upon production volume of produced wedges. An imposed high production volume almost always leads to a better result. In litigation, the total production costs depend upon work volume, but the outcome of the case does not. In many noted leading cases, their outcomes hinge on a proper handling of a small set of key documents in support of or refuting critical facts. The client may save litigation costs at the expense of a total defeat and exposed additional and future liabilities. This distinctive nature of litigation requires that document reviewers try their best to increase the chance to win. Any attempt to discount efforts for the sake of meeting document quota and achieving better performance rating may jeopardize the prospect for victory. For the same reason, reviewers' passion for client is an absolute requirement for achieving a good end.

3. Computer Algorithms

A computer algorithm can beat human performance for obvious reasons. Due to how computer algorithm works, computer algorithms make both type I and type II errors. The computer determines responsiveness and privilege by finding existence of certain key words and the pattern of certain words and phrases. Computers may able to code similar documents according to coded similar documents. The result of computer-coded documents would entirely depend upon selected key words.

Since the accuracy of coding by a computer algorithm does not depend upon its execution speed, it can always win in a high speed. In coding documents at the speed of one document per hour per, a reviewer can easily beat the computer in accuracy. If the reviewer increases his speed, the error rate will increase. At some point, the error rate will be equal to the computer's error rate. If the reviewer further increases coding speed, the error rate will exceed computer's error rate. When a human reviewer increases coding speed to a certain point, the reviewer has no time to read and conduct analysis, the reviewer has to code documents by guess ("guess point"). By total guess, the reviewer might code 50% of documents as responsive and other 50% as non-responsive. Of course, the reviewer can guess by using whatever ratio the reviewer might feel proper. If the document pool has only 10% responsive documents, and the reviewer flips a coin to code them, half of them are coded as responsive and other half as non-responsive. In terms of the total frequency, in the responsive documents, the reviewers will code 5% correctly and other 5% wrongly. In the non-responsive documents (90%), the reviewer codes 45% as responsive and 45% of non-responsive. The error rate for the entire pool is 50%. In the responsive documents, only 10% documents are coded correctly, and the remaining 90% are coded incorrectly. In the documents coded as non-responsive, 90% them are coded correctly but 10% are coded incorrect. When review speed is increased, the impact is primarily on the documents coded as responsive.

If the document pool has 50% responsive documents and 50% of non-responsive documents, and the reviewer codes them by flipping-coin guess, in the documents coded as responsive, the error rate is 50%. In the documents coded as non-responsive, the error rate would also be 50%. The high non-responsive ratio in the original document pool can exaggerate the error rate when the reviewer is forced to code documents at high speed. One can easily see that if a document pool has only 1% responsive documents, coding by guess will create an extremely high error rate in the responsive documents.

The ability to properly address critical issues should be considered in performance analysis. In a typical case, each side proves a limited number of facts and refutes the opposing side's facts. In a typical motion hearing, a party may use a few pages to several hundreds pages of exhibits. The outcome often depends upon if the party can find sufficient documents in support of their argument. Each side has its week points in its claims or defenses. Thus, the identifications and handling of this small set of documents, particularly the weakest points, would be more important than how the rest of a million documents are coded. A party may lose its case because the party is unable to find one or two documents in support of a critical fact. The following examples show how the case depends upon a small number of documents in the result.

When the government has serious anti-competitive concern for a proposed merger, the evidence to show the existence of intensive competition may help the client win the approval. Identification of documents showing existence of mighty competitors, large number of competing products, numerous substitute products, and emerging technology to replace the current technology for making relevant products is more important than coding consistency for the rest of documents.

In any case where punitive damages are allowed and demanded, the ability to win punitive damages depends upon if the party can show that the opposing party acts in malice. Malice may be found by looking at one single document or a combination of two or more documents. Malice might be implied from statements or conducts described in documents. Due to potential award amount, the ability to identify and handle of those documents is far more important than coding consistency.

In a patent infringement case, the plaintiff must show that defendant's products infringe a valid United State patent, whereas the defendant may show that the patent in suit is invalid because it was obvious in light of prior art, and the plaintiff committed inequitable conduct during patent prosecution and misused the patent after its grant. The plaintiff must find the documents showing the infringement products, while the defendant must identify all prior art references for invalidating the patent.

In an internal review for identifying bribery and corporate looting activities, the objective is to find all facts revolving bribery. All players know that bribery and looting is crime, and they would not directly describe their acts in documents. However, they leave some trace such as potential contacts and middlemen, locations, involved business transactions, and potential money sources. The task is to identify those small sets of documents in a million documents. To review documents by normal rule with a quota will make the review a total waste of resources.

It has been shown in other patent disclosure that current algorithms are unable to (1) understand background technologies and technical matters, (2) associate various parts of language context to make an intelligent judgment, (3) associate different parts of materials in the same document, (4) properly treat assumptions, obvious language errors, obvious omissions, and improper abbreviations, (5) appreciate informal expressions, connotation, implication, sarcasm, and hidden messages, (6) detect inherent properties of matters, things, and events, (7) understand human emotion, malice, and intention, (8) make connection between two or more things by times, persons or events, and (9) recognize handwritten notes and contents on most drawings. Even intelligent humans may disagree on how to interpret substances in troublesome documents.

The use of computer algorithms to find relevant documents should be carefully scrutinized. Its ability to find responsive documents depends upon the selection of key matrix, document requests, algorithm designs, language, documents file types, and even writing styles. It may work well in one case but may completely fail in another case. If search keys are formulated from a brief review of sample documents and brief interviews with client's employees, a search has real chance to leave out important documents. It will have two types of errors. If a unique key is not used, all documents that contain only this relevant key will be dismissed and thus making type I error. Computer algorithms may code non-responsive documents as responsive, thereby making type II errors. Poor selection of search keys may lead to excessive false positive result. For those reasons, the method of present invention does not directly use computer algorithm to make a final judgment.

Coding inconsistencies in the documents coded by computer algorithms cannot include the inconsistencies caused by the changes to the requests and coding rules. In other words, the consistency data for computer-coded documents are different from that of the documents reviewed by human reviewers. One is apple and the other is orange. When a computer is used to code a set of documents, it can code documents quickly. Thus, all inconsistencies are true consistencies that the algorithm creates. As demonstrated above, the biggest sources of inconsistencies are caused by improper document requests and necessary changes to requests and coding rules. It can be reasonably expected that aggressive law firms may produce documents with higher coding inconsistencies, while the law firms, which do not bother to negotiate with the requests drafters, may create documents coding with better consistency. For this reason, an absolute inconsistency measured by any statistical quality such as sums of squares and variances should be rejected.

Computer algorithms have played a role in decreasing review quality for several reasons. First, the high coding speed has driven some law firms and clients to seek high review speeds. When the reviewers are to race with computers, the review performance will decrease. A quota such as 100-200 documents per hour has further increased errors rate and inconsistency. Second, computer algorithms are used to reduce the size of review pool, prioritize documents, bulk-code documents, and code duplicate documents by file similarity. When those methods are improperly used, they may create document pools that are difficult to review. The verbal context and business transaction context may be disrupted, critical fact-descriptive documents may be eliminated or placed in the batches of the least relevancy, critical documents may be removed as non-responsive, and image files may be processed as illegible documents. As a result, those treatments directly interfere with human review. The industry develops an unwritten rule that a document should be coded as non-responsive if the reviewer cannot see any reason to be responsive. Under such circumstances, the performance of human review will soon be proved to be worst than the products of computer algorithms.

The competition between computer algorithms and human reviewers further degrades discovery quality through vicious cycles. To meet quota, the reviewers can just spend a few seconds to read a document. The review at a higher speed necessarily results in more errors and more inconsistencies. When the performance of human review is found to be worse than that of computer algorithms', there is more incentive to use computer algorithms to remove "irrelevant documents," thereby creating a review pool totally out of language and transaction contexts. This arbitrarily drawn review pool further reduces the human review quality. When the industry finds even more errors and inconsistencies in the human review products, there is even more justification for using computer algorithms to improve "consistency" and reduce costs. This race-for-bottom review model may be perfect for a small number of cases where is no substantial liabilities and nor risks of exposure, but is really bad for highly contentious cases involving massive civil liability, punitive liability, criminal liability and potential risks of exposure. True coding accuracy can only be achieved by human reviewers unless computer algorithms have the same human intelligence.

E. Critical Fact-Descriptive Documents and Their Distributions

The method of the present invention is based upon a fundamental presupposition that the substance in any corporate documents is unknown to both drafters and document reviewers in advance. No one can tell what is in the documents of any company. One cannot tell anything as to specific file types, document sizes, distribution patterns, and substances. This presupposition leads to two inferences. Document request with a proper scope cannot be propounded because the drafters don't know what their requests intended to reach. During the review process, the reviewers do not know exactly what the requests are intended to read on. This presupposition determines that the scope of the requests and their applications to documents cannot be determined in advance. They must be refined, improved, and perfected during the review process. The large size of document pool and a large number of coding tags further complicate this trial-and-error process. For the same reason, a relevance search algorithm cannot be specifically designed for a particular case because the developers cannot know what they want in advance.

Among all documents, there are two kinds of documents: documents that contain insufficient information for coding, and documents containing elementary facts, which may help reviewers make coding decisions. For example, email sent from a client to a person concerning a legal issue, the existence of attorney-client relation between the sender and the recipient determines how the document is coded for privilege. This elementary fact may be fully disclosed in one single document or revealed in several documents. The fact itself is generally not important and often non-responsive.

This document is referred as critical fact-descriptive document ("CFD") because the described fact is critical to the reviewer's coding decision for the tag that is related to the fact. The described facts are often elementary relative to coding, but the fact itself may be highly complex. A chip may be found to be equivalent to a patented device after many years of prior litigation. For coding purpose, this fact is still regarded as an elementary fact. Those documents, whose coding is affected, are referred to as "affected documents."

The facts in critical fact-descriptive documents include attorney identity, law firm's role, consultant's role, partners role, person's identity, employee's affiliation, transaction nature, product nature, identity of relevant product, model numbers, serial codes, product common names, product inherent properties, product features, unidentified shipments, measurement data, transaction names, code names, patent numbers, prior art references, publications and articles, acronyms and terms, informational phrases, undisclosed financial reports, business plans, poorly identified contracts, legal instruments, legal matters, cause of actions, case numbers, undisclosed subject name, document identity, property ownership, publication source, and virtually anything. Any of the above facts may become a critical fact if it is missing in other documents and affects the coding of at least one affected document.

The number of critical fact-descriptive documents and the number of affected documents in any document pool are very large for the following reasons:

(1) Each of business transactions takes a long time to finish and extensive discussion about the transaction may take place. The discussion may be directed to any aspects of the transaction and may contain many unclear terms. Each of documents alone does not provide verbal context and transaction context for a reviewer to understand;

(2) Many complex legal issues are mentioned or discussed in different documents with an assumption that intended readers know them;

(3) Documents are distributed to many employees and many business groups, and are saved on servers, personal computers, and notebooks, and all kinds of media;

(4) Substantially duplicate documents cannot be removed and cannot be bulk-coded. A large number of chain email messages of various lengths may discuss the same substance; and (5) Duplicate documents cannot be removed when the knowledge of certain corporate executives is an issue or documents are not exactly identical.

Critical fact-descriptive documents may be any documents that carry at least one elementary fact. A retainer agreement or billing statement of an attorney may establish the attorney's role in a transaction involving many parities; a document may describe a product revealing its infringing nature; dividend distribution statement can establish the statuses of shareholders; and a document discussing product type may imply if a product is a relevant product. A single document may be both a critical fact-descriptive document for some affected documents, but is also an affected document of another critical fact-descriptive document.

Critical fact-descriptive documents cannot be identified in advance and their appearance in any review order is unpredictable. In some cases, an elementary fact can be established by reading one single document. In other cases, a reviewer can gradually figure out an elementary fact from reading several documents in different relative positions. For example, in a complex negotiation transaction, many attorneys may discuss over a transaction without any background information. They may send, receive, and forward documents, review draft agreements, and make comments on drafts. Most of the times, they do not mention or imply whom they represent for. Occasionally, a lawyer may make a comment about its client's employees, client's business, client property, or client's preference in a way of indicating his affiliation with the client. The reviewer may be able to figure out from very careful reading who the lawyer may represent provided that the reviewer knows certain background of the transaction.

Critical facts in critical fact-descriptive documents can be deceptive and innocent enough to be treated as garbage. The carrying documents may be non-responsive and could be excluded by relevant search keys. It is often concerned with something, which is not part of litigation focus, and it entirely depends upon the issue in litigation. It is "critical" in the sense that it is necessary to make correct coding decisions for other documents. In a jointly looting company case, it may a golf photo showing a business partner and a third party person when they own another business. The coding decision for a single tag may depend on two or more elementary facts. For a document sent to an attorney and another person, the privilege claim will depend on the attorney's role and the identity of the second recipient. The email is privileged only if the attorney represents the client and the second recipient is client's employee but not a third party. The same principle can be extended to all kinds of other cases. Many fact inquiries are required to make a correct call for a tag.

Figure 3:
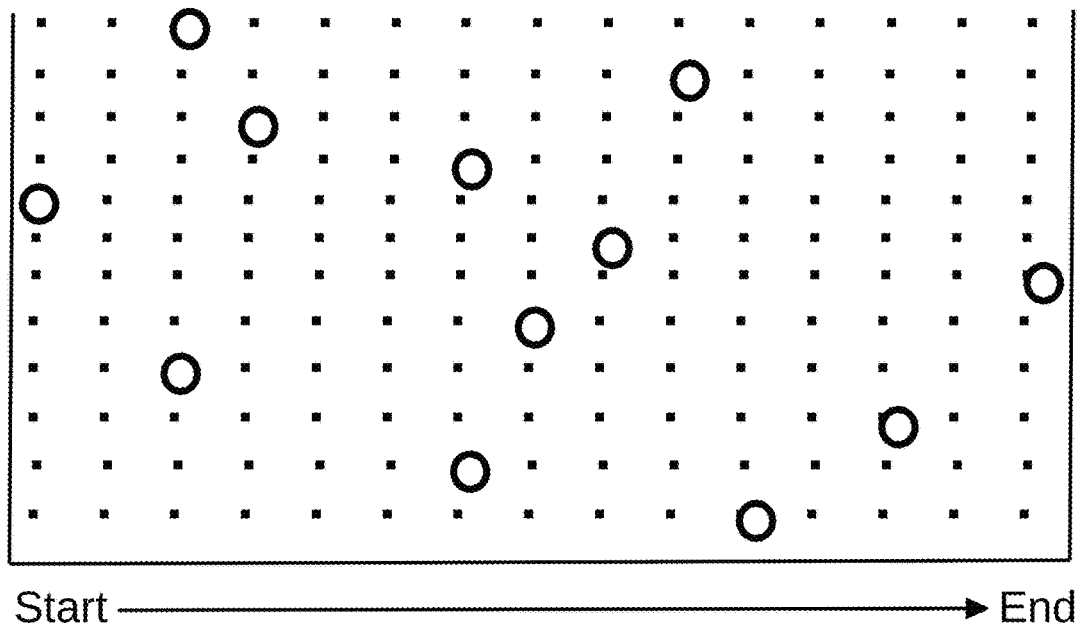
FIG. 3 shows the distribution of one critical fact-descriptive document (denoted by a large circle) in a series of 14 affected documents (denoted by each small square dot). The distribution pattern is obtained by randomly generating the sequence twelve times.

FIG. 3 shows the distribution of one critical fact-descriptive document in M=14 affected documents. In this figure, it is assumed that only one document discusses an elementary fact that affects the coding of M documents, and this document is not linked to other things such as search key, creation time, control number, and assignment methods, this document may appear the first, the last, or anywhere in some frequency in the review sequence. Its appearance position in a relative order follows a uniform distribution with its media frequency in the center (50%). Documents comprise many series of such documents. For each series of documents, there is one critical fact-descriptive document and there are M affected documents. If there are a large number of series of documents, the reviewer would encounter the critical fact-descriptive document in the middle on average.

Figure 4:
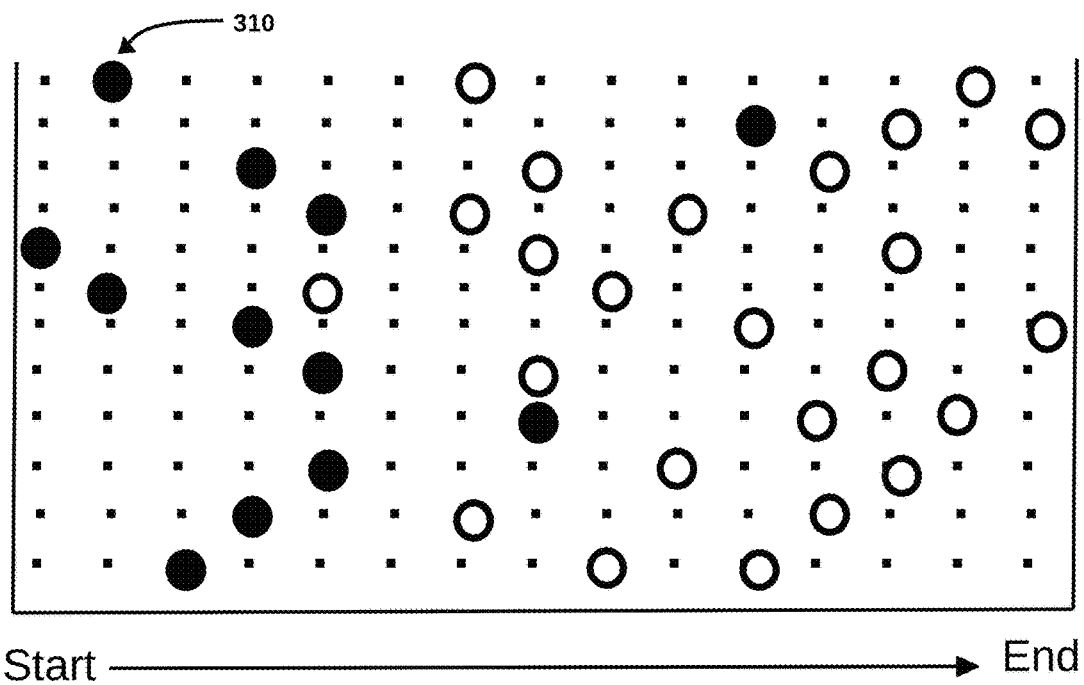
FIG. 4 shows the distribution of the first critical fact-descriptive document in a series of 12 affected documents.

FIG. 4 shows the distribution of N=3 fact-descriptive documents in M=12 affected documents. The M documents are randomly distributed in a document sequence. If only one person reviews the documents, the reviewer can correctly code documents after the reviewer has read the first critical fact-descriptive document (marked in solid black color). By generating a large number of document sequences and observing the positions of the first critical fact-descriptive document in each of the document review sequences, one can see the distribution of the first critical fact-descriptive documents. Even though all critical fact-descriptive documents are distributed in each sequence, the first critical fact-descriptive document will have a serious bias toward an early position. Depending upon the values of N and M, its average position may be between the first position and the middle position. This distribution pattern can be observed in practice, proved mathematically, and confirmed by random drawing experiments. Accurate proof is not necessary for this invention because the trend is correct. A document pool may contain a large number of series of documents. Each series of documents consist of N critical fact-descriptive documents and M affected documents. If one generates a distribution for each series of documents and calculates the average position of the first fact-descriptive document, one would get the pattern shown in FIG. 5.

Figure 5:
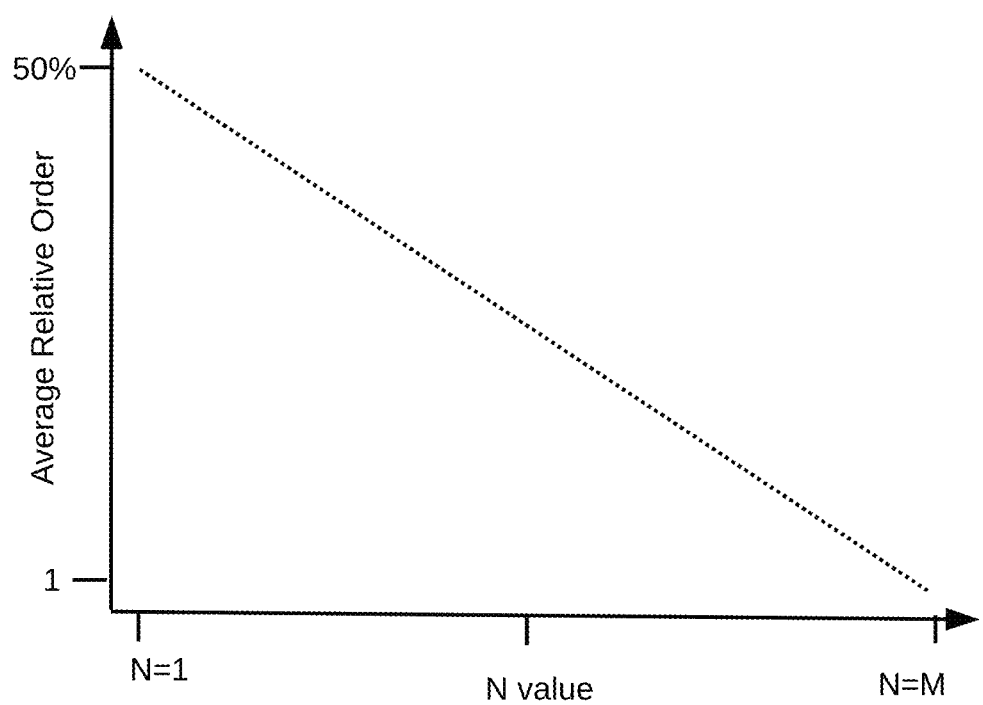
FIG. 5 shows the average appearance position in a relative order of N critical fact-descriptive documents in M affected documents.

FIG. 5 shows the average first critical fact-descriptive document for N critical fact-descriptive documents in M affected documents. This curve can be found by taking its limits. When N is zero, the reviewer will never get such a document. When N=1, it has a uniform distribution, and thus the average relative position of the critical fact-descriptive document is in the middle (50%). By approaching N to M, all documents are critical fact-descriptive documents, the average position of the first fact-descriptive is 1. The appearance position of the first fact-descriptive document is mostly probably in the range from 1/M to 50%. From the trend from taking the two limits, one can predict that, the higher frequency of critical fact-descriptive documents, the earlier relative position of the first critical fact-descriptive document. The exact average position of the first critical fact-descriptive document depends upon the values of M and N. The shapes of actual line or cures shape in FIG. 5 may depend upon M value.

In this disclosure, the focus is on the relative order or document sequence of a set of documents comprising one or more critical fact-descriptive documents and M affected documents. Many other documents may be anywhere in the document delivery order (the absolute order from the server), but are ignored as if they did not exist. A sequence of documents may be in one reviewer's review queue, and may be assigned to several reviewers. For example, a document sequence, as viewed from the server delivery time, may comprise two affected documents in a first reviewer queue, twenty affected documents in a second reviewer queue, one critical fact-descriptive document in a third reviewer queue, and fifty affected documents in a fourth reviewer queue. One can construct a relative order or document sequence for the 83 documents by their actual delivery time ignoring all intervening documents. The intervening documents are assumed to be randomly distributed among all those interested documents without disrupting their relevant positions. While intervening documents may be ignored for this series of documents, the intervening documents and other documents may belong to another series of documents.

The earliest capture of the critical fact-descriptive documents will affect review accuracy and review costs. On a review project with only one reviewer, the reviewer will review all documents. For a particular tag, the reviewer has to make the best guess before the reviewer reads the first critical fact-descriptive document concerning the substance affecting the tag. After the reviewer reads the first fact-descriptive document, the reviewer can code remaining documents correctly. The overall error rate for this series of documents depends upon when this first document appears. If the reviewer encounters the first fact-descriptive document in 10% percentile, the reviewer will code 10% of the documents by best guess, and code the remaining 90% documents correctly. If the reviewer runs into the fact-descriptive document at the 40% percentile, the reviewer codes the 40% of documents by best guess, but will code the rest 60% of documents on this issue correctly. If this document appears in the last position, the reviewer may code all documents except the last one by best guess. As shown, the first critical fact-descriptive document appears at a relatively early position, the reviewer may have to make guess for a small portion of documents. A single reviewer, as in the super lawyer model, has an advantage. The reviewer can absorb all critical facts and use them in coding documents conveniently. The problem that single reviewer faces is her or his memory problems. The reviewer may forget critical facts that the reviewer has learned two months ago or may have to struggle to recall them by searching personal notes. If the whole series of documents are broken into sections and assign sections to a group of reviewers, some reviewers will be in much worse positions to review their documents.

F. Discovery-Focus Hypothesis

One hypothesis is that discovery focus is invariably in a subset of elements (S1, S2, S3 . . . Si) in the a whole set of elements (E1, E2, E3, . . . Ej), where i<j. "Element" is an abstract name for transaction, event, location, person, entity, fact, product, term, assumption, expression, concept, intangible thing, email, letter, fax, and anything that would become the focus of discovery. For the purpose of discussion, all elements defined by a whole set is also referred to as a series of elements. It is always true even though it cannot be proved by rigid model. The set sizes may reflect inherent corporation ability. For example, in a patent litigation case, a defending company may have several infringing products among hundreds of total products; in antitrust cases, a merger applicant may have only dozens of "problem" products among thousands products; in a bribery investigation case, the company may have several trouble branches among its hundreds of branches; in an employment law case, the investigation may be focused on some of the employees; in an export violation case, the focus may be on some of the agents, some products, and some geographic regions; in all privilege review cases, only a small number of attorneys out of a large number of attorneys represent the client.

Therefore, the focus of interest can be viewed as an abstract mathematical problem. The focus is always on a subset of elements in a larger whole set of elements. The elements not included in the subset may be referred to as an exclusionary subset. The subset may have one to hundreds of elements, while the whole set may have tens to thousands of elements. In a majority of cases, the focus is on the subset but not on the exclusionary subset. In some cases, the reviewer may be required to pay attention to the whole set or the exclusionary elements to rule out something.

The large set of elements in corporate documents include list of customers, list of agents, list of employees, list of products, list of payments, list invoices, list of issues, list of cases, list of accidents, list of rewards, list of branch offices, list of reimbursements, list of transactions, list of closed sales, list of shipments, list of materials, and list of anything and everything. While corporations may be as large as a global firm and as small as a small business, most prevalent lists they produce contain magic numbers. The magic numbers are somehow determined by human capacity. Even for the largest companies, the tasks are assigned to individual employees with magic numbers: For example, A is in charge of 10 branches, B handles 25 products, C supervises 30 employees, D manages 50 contract workers . . . . Whenever employees are assigned with such tasks, they produce documents reflecting the magic numbers. They create such documents daily, weekly, monthly, and annually. There is little need to tabulate all 50,000 employees and all 100,000 products in one document except in central database. The magic numbers are found in virtually any case.

From the above analysis, one could see a real burden to remember things in magic numbers. In reality, there is no way for anyone to know in advance the number of the series of elements, the size of each subset of each series, and the whole set size of each series. In most discovery projects, the client cannot tell how many products are relevant products, how many people might have engaged in bribery, how many products may infringe patents and so on. That is what to be found in document review. Document reviewers identify elements one by one. From this abstract model, one immediately sees how time-consuming discovery can be. Even worse, several series of elements may appear in one single document. For example, when a product list also contains different customers, it has two series of elements.

One common task in discovery is to identify a subset elements out of a large set. For example, it might be identifying hundreds of attorneys out of several thousands of player names, tens of infringing products out of hundreds of products, tens of employees out of hundreds of employees, and tens of offices out of hundreds of offices. The large sets and small sets can be maintained in one, two or more huge binders. Assuming that all lists have been fully prepared, each document reviewer has to check each element on the document against the correspondent list, the reviewer may need to conduct cross check in five, tens, even hundreds times, depending upon the number of elements in the document. This is like to find a needle in a sea. Even if the reviewer can remember the small set of elements completely, the reviewer still need to look over the list on the document and conduct cross-check mentally.

One more factor makes the task even more difficult is that the reviewers identify focus-of-interest elements one by one before the reviewers have the lists. At the initial review, they have empty lists. They have to identify element series one by one, and build elements series with different subset sizes so that they can be used for comparison.

This hypothesis indicates the need for developing tools for identify a subset of elements in a large set of elements.
G. Sharing Reviewers Knowledge on a Need Basis The ability to review context-deficient documents will depend on the reviewer's knowledge space. The reviewer's knowledge space may vary considerably. If the reviewer has acquired all knowledge of the technical background, the reviewer would have no need to learn relevant technical terms. If the reviewer has reviewed all documents for a given transaction, the reviewer has no need to learn the critical facts concerning the transaction and may automatically read in the knowledge without noticing it. A sender name, John Doe, in email may cause the reviewer to code it as privileged document because the reviewer knows John Doe's counsel role. If the reviewer has reviewed corporate documents for many years and have known everything about the company, including past names, project code names, all litigation events, and past and current key employees. This reviewer will be in a much better position to decipher the meanings of context-deficient documents. However, there is no way for a document reviewer to stand into the shoes of those who were involved in the transaction. The document may incorporate external facts by timing, undisclosed logic, or undisclosed connections. Sometimes, if the document does not provide any indication on the incorporated external fact, the document reviewer does not have any indication to see the fact, which was very obvious to the insiders.

Each of the reviewers can learn only small part of the case in the complex model. Document reviewers acquire different case knowledge through reviewing different documents. Sometimes, a subset of elements may be distributed among many documents, and, occasionally, some or substantially all of them may appear in one document. The reviewers review only assigned documents rather than all documents, and thus learn different subsets. For a given series of elements, each of the M reviewers has the chance to learn a unique set of elements in the project life. Each of them learns more elements for the subset until the reviewer has encountered all of them. However, for several practical reasons, some or all reviewers may never learn all elements for each series of elements. One of the possible reasons is that some reviewers will not have the chance to read all documents covering all elements. In addition, if a case has too many series of elements and each series contains a large number of elements, it is impossible for the reviewers to remember them. Therefore, each reviewer may know different terms, case facts, and legal issues.

One quick solution would allow reviewers to share their knowledge. However, this idea has been long dismissed in application because the size of knowledge is too big to share. It would require endless discussion, meeting, training and binders. Therefore, a viable solution is allowing the reviewers to share their knowledge on a needed basis.
H. Strategies for Improving Review Performance Most importantly, efforts should be made to preserve document verbal context and transaction context as much as possible even though it is not always possible. A great deal of corporate email may contain only one to a few sentences. From the four corners of documents, many documents are incompetent for review. The reviewers can read all words "the bid," "XYZ," "the agreement," "the disaster," "material" "the suit," . . . but cannot understand what they exactly mean in relation to the document requests. The portion of incomprehensible substances in corporate documents can be anywhere from less then 1% to more than 95% in terms of word counts. Sometimes, the reviewer's understanding of the terms may affect coding decisions in different ways. If documents are presented in a right order with proper context, the reviewer can progressively acquire the knowledge required to understand them. Those same terms cited above may cause no problems if the reviewer has become familiar with the whole business transaction. This measure, however, cannot solve many problems caused by incorporating external facts and implied assumptions and cannot solve the problem from dividing works among different reviewers.

The second strategy is to break up the error propagation mechanism. If the reviewer does not know a critical fact, the reviewer will make a wrong coding decision for one, two, and many documents containing this fact. This error propagation mechanism is greatly enhanced in a term work arrangement under the complex litigation model. The fact that one reviewer makes same or similar mistake in many related documents is often observed.

Considering document assignments among all reviewers and the distribution of critical fact-descriptive documents, the strategy is to share critical facts among all reviewers. The sharing of critical facts can break up the error-propagating mechanism in the team-working environment. If UX-1654 is coded as infringing product while it is actually not, hundreds or even thousands of documents containing this model number may be coded incorrectly. Not only does this reviewer code the documents incorrectly, all other reviewers, who do not know this fact, may code their documents incorrectly.

Another strategy is to reconstruct "transaction" context that is disrupted by team-working arrangement. The allocation of a series of documents among several reviewers makes the situation worse. If the document pool contains only one fact-descriptive document and only one reviewer gets it, the reviewer can correctly code the rest of the documents after reading it. The rest of reviewers will not see this document and have to code their documents by best guess. If this critical fact is available to the rest of the reviewers, they can avoid making the same mistake.

When a series of documents containing N critical fact-descriptive documents are assigned to several reviewers by number ranges, some reviewers may get one at a certain relative position, some reviewers may get two or more at different relative positions, and other reviewers may get none. Those reviewers who get at least one will improve their ability to code after reading it, but those who do not get any will make the best guess throughout their review ranges. Even though, the first fact-descriptive document may appear in the first position in the server delivery time, the break-up of this series of documents among many review ranges make the review more difficulty. Since the whole series of documents is assigned to several reviewers, each reviewer reads documents out of verbal context and transaction context. The reviewers lack background knowledge and cannot understand terms, person identities, product model numbers and informal expressions. Therefore, the solution is to share elementary facts and coding rules in real time.

I. Server-Implemented Collaborative Discovery Environment

In the disclosure, "user" may mean a document reviewer, a project manager, or litigation attorney at a client computer. "Elementary fact" may mean a fact, thing, term, or anything that can affect the coding of a document, and may mean a data record concerning an elementary fact.

1. The Need for Sharing Work Pieces at the Earliest Time

In such a team work environment, when a reviewer encounters a critical fact-descriptive document, the fact is collected for share with all other reviewers in real time so that the entire team can benefit. By this arrangement, all reviewers will be able to make a right decision as soon as any of the reviewers encounters the first critical fact-descriptive document.

The sharing of such critical facts may be justified for additional reasons. In some cases, a very important fact may be discussed only in one document. If this fact is not shared among all reviewers, the entire team may be in dark. Some critical facts may be collected at considerable costs to the client. Many times, critical elementary facts may be found from reviewing many documents or conducting considerable on-line searches. The facts that required open ended searches and on-line searches include (1) client's histories such as its acquisition histories, past name changes, past services, products, etc; (2) a party's relationship with client (this is particularly important in determining a privilege claim in joint defensive agreement), (3) a third party companies' affiliation which may affect preservation of confidential claim and privilege claim, (4) a third party lawyer's capacity which may affect privilege claim; (5) stock ownership when it affects the legal issue under discovery, (6) governmental official's identities in FCPA, (7) competing entities and competing products in merger clearances; (8) prior art in patent cases, and (9) past litigation history when it affects current discovery issues. The potential types and number of issues may be unlimited.

Accurate review needs the support of basic research tools such as Google Search or Bing Search. The need for conducting open-ended research can be demonstrated in an example accounted in a privilege review. In a case where the client attorney sent draft legal instruments to employees of his client with a copy to a government attorney, the client attorney has shown clear intention to waive privilege claim (unless a supervisory privilege claim is appropriate). Because the government attorney's identity is unclear, the document may be coded as privileged tentatively. However, if this document is actually withheld and a log is provided to the opposing party, it would raise a red flag. Withholding this and similar documents in a large numbers may invite a motion for sanctions on top of the time to re-review those and related documents. A large number of documents may be incorrectly coded simply because the reviewers did not know the identity of one recipient. Open-end search tools may be in separate computers for security reasons. Since every client conducts business with hundreds to thousands of other companies, lack of such a search tools will provide incentive for making very bad assumptions, which may totally discredit the quality of the review.

The benefit from sharing critical facts may be demonstrated. If the reviewer finds the document at Position P=20% for M=1000 affected documents, all reviewers can correctly code the rest 80% of documents. Assuming the elementary fact affects one tag, the sharing arrangement will help the reviewers code the rest 800 documents correctly. Although the first 200 may be coded incorrectly, the need to conduct reconcile review may be very small, considering the fact that the last 800 documents may provide sufficient information to make early errors immaterial. In other words, the errors are corrected in a sufficiently early stage that the errors are immaterial. The opposing party cannot and most probably will not bring a motion. This analysis also shows that inconsistencies and even direct conflicts in coding may not hurt client's case. If the errors are found in the last few documents or after the review is concluded, the client may have to review the entire series of documents at much high costs.

The time that the reviewers use in coding documents will be reduced, and the overall one-path review accuracy and consistency will be dramatically improved. Thus, the number of documents required of fixes will be reduced. By sharing elementary facts, the reviewers who never get any critical fact-descriptive documents will benefit the most. Depending upon when a reviewer first encounters the documents discussing the elementary fact, the reviewer may be able to code some documents correctly. Many reviewers may be in a position to "share" the elementary facts even before they start reviewing their documents. However, this sharing arrangement does not affect the coding of the first 200 documents in the case. That part of documents might contain many improperly coded documents.

If the overall appearance order of all fact-descriptive documents for all sequences of documents is 20%, a successful real-time sharing method can reduce corrective review for the 80% of documents. If rework is not necessary, a real time sharing arrangement may reduce errors in the 80% of documents. Assuming that the review was conducted by flipping a coin, the sharing arrangement can reduce overall errors and inconsistency rates by 40%. The improvement in review accuracy of the responsive document pool is much more. The real time sharing would also reduce the time for reviewers to conduct duplicate research. If, for example, a reviewer knows that a particular model number is a non-responsive product, the reviewer quickly makes its coding decision. This knowledge allows the reviewer to code this tag instantly. However, if the reviewer does not know this model number, the reviewer has to try to find the information from the document and then still has to make the best guess. Due to gross insufficiency of context information, the reviewer may still make a wrong decision after a careful reading of the document. The benefits from the sharing arrangement are not limited to coding this document because many errors and inconsistencies may appear in other similar documents.

Several elementary facts may affect one single tag. If a document has three series of elementary facts, the reviewer does cross check for all three series of elementary facts. When a coding decision depends upon the correct determination of several series of elementary facts, "penalty" is harsh for any omission. After the reviewer has correctly identified attorney names from a large number of recipients, the reviewer fails to recognize a copied recipient who is a third party. The coding will be wrong, notwithstanding, the great effort the reviewer has made concerning the identity of attorneys. A document may be responsive to many issue tags, making the coding even more complex.

Implementing real time sharing of coding rules and elementary facts can also reduce review time for reading difficult matter. When documents contain complex technologies and difficult issues, the reviewers have to read them. However, if an elementary fact is fully understood and a coding rule concerning this fact is provided, the reviewers need less time to code the documents the coding decision of which may depend upon this fact. If a coding rule is to exclude all employee performance reports, there is no need to analyze sales data in such reports. It is also true that some elementary facts described in documents may be clueless. Some documents may discuss an elementary fact in detail, but do not reveal how it is related to document requests. The reviewers may spend a great deal of time to figure out this relationship. If a reviewer has done research on an elementary fact and makes a finding, the finding can help the rest of the reviewers code similar documents. The sharing of the summaries of issues, discovered facts, player identities, and incomprehensible terms is the best way to save time. If the documents contain hundreds of transaction code names, some of the transactions are responsive, while others have no bearing to the requests, the sharing of the elementary facts (e.g., the transaction nature) can help the reviewers save time.

Figure 6:
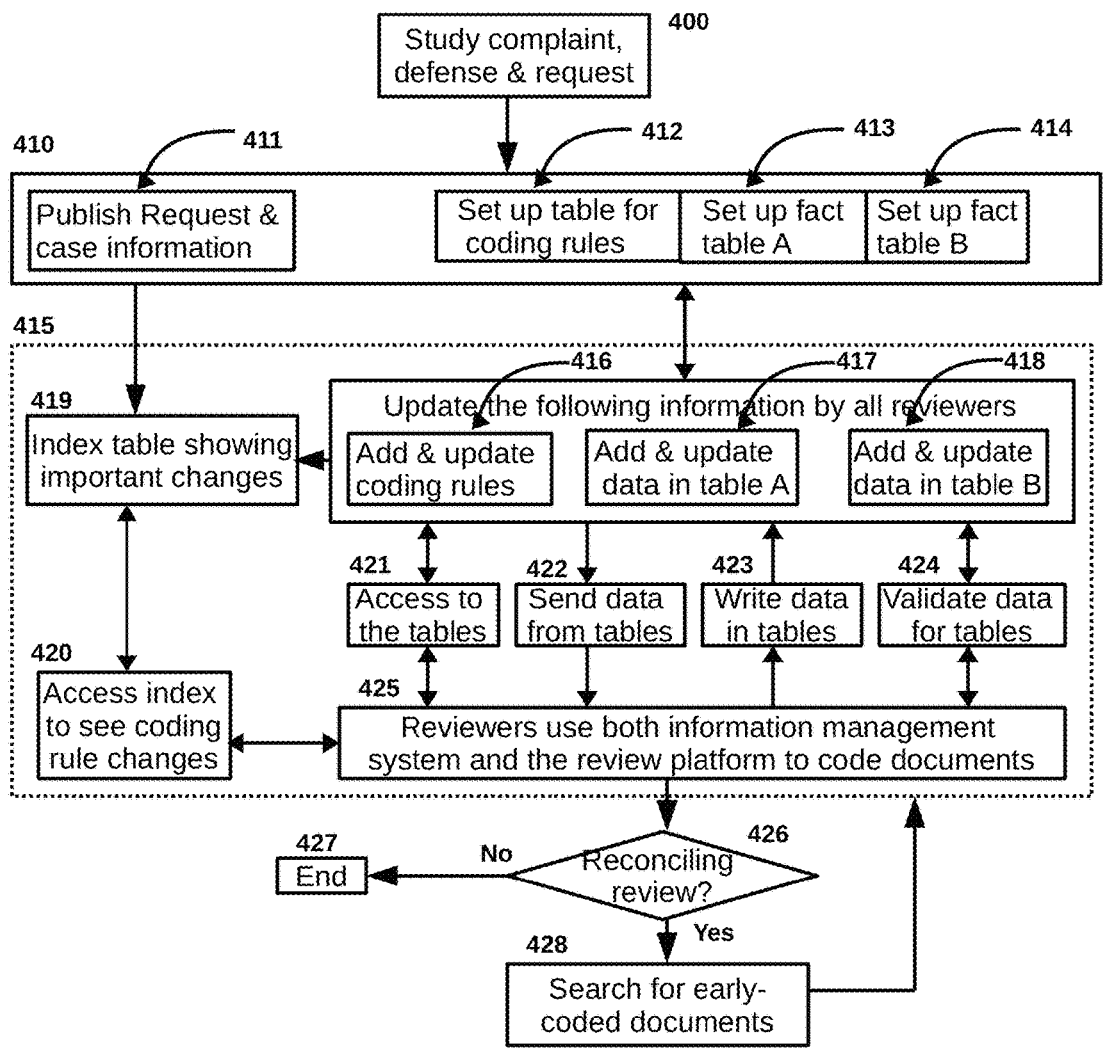
FIG. 6 shows the accurate coding process by using a document review platform and a discovery information management system (also "review-assisting system").

FIG. 6 shows the accurate coding method in an embodiment of the present invention. From the document request, the litigation attorney first studies the request in light of defenses and complaint at Block 400. The system is set up specifically for the case at Block 410. The set-up steps include uploading and publishing the request and case background information on the server at Block 411, setting up a coding rule table at Block 412, setting up an elementary fact table A at Block 413, and setting up other elementary table B at Blocks 414. The actions at the review process is shown in Block 415, where the coding rule table is updated at Block 416, the data records for elementary facts are added to table A at Block 417 and to table B at Block 418. The document reviewers at Block 425 can access data in any of the tables at Block 421, retrieve data from any of the tables at Block 422, write data into any of the tables at Block 423, and validate data for any of the tables at Block 424. The system optionally sets up an index table at Block 411, which can show (1) all the changes in elementary facts (i.e., "data records") and coding rules, (2) all the changes in the fact tables only, (3) all the changes in the coding rule table only, or (4) the latest changes. Each of the reviewers may periodically access the index table to view all the changes, selected certain kinds of changes or latest changes in coding rules and elementary facts at Block 420. After the first review is completed, the management needs to determine whether a reconciling review is conducted at Block 426. If there is a need to conduct a reconciling review at Block 426, a proper set of documents are identified and retrieved at Block 428 and a reconciling review is conducted according to Block 415.

Real time sharing of basic information requires many unique features. To achieve the intended purpose, the sharing arrangement meets the following conditions to have practical utility:

(1) The sharing method is able to handle any of the large number of coding rules and elementary facts such as attorney names, product classification, product nature, common acronyms, and document types. It is able to accommodate all kinds of potential data.

(2) The method should have the ability to work for different matters. If a system is useful only for one type of case, it is too expensive to develop.

(3) The method should have a simple user interface for retrieving information, adding information, and searching information. Ideally, it should provide features for one-key search, interactive search, one-key retrieval, and one-form data entry.

(4) The system should have proper means for validating coding rules and elementary facts to insure that the coding rules and elementary facts can control the whole team.

(5) Optionally, the method should have the ability to avoid entering duplicate entry for same coding rules and same elementary facts.

(6) Optionally, all elementary facts should be well structured so that they can be used in a way all reviewers can understand.

(7) Optionally, all discovery information produced in this process can be conveniently backed upon in the course of discovery.

Accurate coding method requires the preservation of verbal contexts as much as possible. If documents have been extracted by search using keys and key matrix and documents are extracted according to search hits, it would be more difficult to achieve coding accuracy. Exclusion of critical fact-descriptive documents or other critical documents from the review pool will make the review more difficult. At least improper search algorithms or improper search key matrix may remove the documents, which are critical to the proper review of documents. Whenever a search algorithm removes background knowledge and places each of the documents out of verbal context and transaction context, the reviewers have to code documents by best guess.

Improper document extraction methods may turn a large number of relevant and highly sensitive documents into "non-responsive" when they are reviewed out of verbal and transaction context. The method of present invention may be unable to remedy the effects from the disrupted review contexts. If document assignments totally destroy the verbal and transaction contexts, the reviewers may find that a large number of sentences are incomprehensible, and thus have to make best guess. This will also decrease review productivity.

2. Using Discovery Information Management System

The sharing of case information may be achieved by using a discovery information management system ("review-assisting system"). This system has been fully disclosed in other patent application (Ser. No. 12/420,817). A review-assisting user interface includes a data retrieval tool for showing data records from the database tables, a search tool for searching data records in the database tables, and a data entry tool for entering data records to any database tables. It includes optional tools for conducting global search, interactive search, editing whole table, looking up data (data presented in certain ways), validating data records, selecting different views, and navigating numbered pages. The review-assisting user interface under the manager account has the tools for setting up project and setting up database tables. This system allows project managers to change the table structures of the database tables instantly, and provides two unique data validation (this term is not used to mean all known data validation concepts) schemes.

The tables to be created for a second request review may include coding rules, player names, acronym and terms, relevant products, optional transactions, and optional index table. The tables to be created for a patent infringement case may include coding rules, player names, acronym and terms, products, sales transactions, and optional index table. The tables to be created for a commercial bribery review may include coding rules, player names, gifts and moneys, compliance actions, and optional index table. The tables to be created for a shareholder class action against their board members may include coding rules, player names, board meeting and actions, damages, and optional index table. The tables to be created for a product liability action may include coding rules, player names, communications and knowledge, damages, and optional index table. Those examples show the most likely table structures. Each of the database tables (except the terms table) has at least one field (e.g., coding effect) which affects the coding decision.

However, unique litigation issues, peculiar case nature, and distinctive document compositions may require different tables of different table structures. If a company has only three products, there is no need to set up a dedicated table for products. If a corporation has several hundred of code manes (i.e., fictitious names) for past legal matters and some code names are important to the issue at litigation, then a dedicated code name table may be set up. The tables of suitable table structures are designed. A person skilled in litigation would know how to best design tables for each particular case. The review-assisting system allows litigation attorneys to add tables, delete tables, and modify tables to accommodate unexpected changes and new data elements found in the documents during review. Elementary facts are entered into respective dedicated tables or a shared master table. For example, attorney names, party names, and other key person names are entered in the names table.

For an attorney who reads the request and knows the case, selection and designing of tables are obvious. Project instructions and requests can be published in the instruction tab. An image file of showing correct tag selection configurations (how tags are selected under various circumstances) may be published in the Instruction tab and may be lodged as an attachment under the Instruction page. By using graphic illustration, the potential misunderstanding of tagging selection rules can be minimized. The project manager can change the image of showing tag-selection configurations by updating the attachment.

The coding rules that affect individual documents are stored in the coding table. One example table structure in a web view for coding rules is shown in Table 1. The coding rules are written for specific types of documents. Each rule is sufficiently fine and detailed that it cannot be interpreted in different ways. Coding rules should meet the following guidelines.

(1) The coding rule should be fine and detailed enough to specifically refer to document type. An example of document may be identified by bates or control number.

(2) The main entry for each rule should be the common name and document title if they are reasonably short. If common name and title are too long, the most important key words for the document may be used and those words should appear in the document so that all documents containing this key can be found by search. For example, "sales data" may be used to refer all kinds of documents containing sales data. The long title may be written in the comment.

(3) If a long document contains a large amount of irrelevant materials, the entry in the main entry may be one or more key words for the relevant substance. For the sales data in a K-10 report, the entry might be like "sales data, k-10." In this case, both words may be a proper search key for finding this and all similar documents.

(4) Action types include "original," "amended," "settled", etc. Additional designations may be added for specific purposes required in different cases. The action word may affect how this entry is used.

(5) The comment should contain information for accurately identifying the related document, the reason for using the rule, its operation scope, and other critical information. It is highly desirable to cite a real document by bates number or control number. If the name is not proper, the reviewers can find the coding rule by searching the comment so that the rule may be modified or an amended rule may be added to the coding table.

Coding rules are the instructions on how to code for specific documents or elementary facts. For example, the coding rule table may contain the following coding rules.

TABLE 1

Table for Coding Rules for a Second Request Review

| Subject | Coding effect | Scope effect | Date* | Comments |
|---|---|---|---|---|
| Sales data | NR | O | Jan. 01, 2009 | Sale Performance in performance reports. |
| Annual Sales | R | O | Jan. 02, 2009 | Those data are primarily for relevant products BAT-2121. |
| Annual Sales | NR | A | Jan. 05, 2009 | All annual sales data are NR. |
| Annual Sales | R | S | Jan. 10, 2009 | All annual sales data concerning [. . .] are R. |
| Income and Profit | NR | O | Jan. 01, 2009 | Company-wise income and profit report. |
| Income and Profit | R | O | Jan. 01, 2009 | Income and profit report for X division. |
| Income and Profit | NR | A | Jan. 10, 2009 | Income and profit report for X division. |
| Performance Report | NR | S | Jan. 10, 2009 | The report generally contains sales data and refers to certain products, (S) per party agreement. |
| Commission Calculation document | NR | O | Jan. 01, 2009 | See example BAT-232323. |

TABLE 1-continued

Table for Coding Rules for a Second Request Review

| Subject | Coding effect | Scope effect | Date* | Comments |
|---|---|---|---|---|
| Daily Sales Report | R | O | Jan. 02, 2009 | IF it mentions relevant products. |
| Daily Sales Report | NR | O | Jan. 02, 2009 | IF it is for non-relevant products in general. |
| Income & profit | NR | S | Jan. 26, 2009 | All income & profits are NR, effective immediately. |
| Sales reports, spreadsheet | NR | S | Jan. 01, 2009 | Example in Bat-0011111, NR by settled agreement. |
| Web contact log | NR | O | Jan. 01, 2009 | Example in Bat-002222. |
| Trade News | NR | O | Jan. 01, 2009 | Trade News about this industry. |
| Trade News | R | A | Jan. 01, 2009 | News published by XYZ concerning telecommunication products, market shares of XYZ, and relative competitiveness of XYZ. |
| PRO-211, PRO-212, power tools | NR | O | Jan. 01, 2009 | PRO-211, PRO-212, power tools are removed from the relevant products. |
| PRO-600, power tools | R | S | May 01, 2009 | PRO-600 are added as relevant products, per agreement. |

*The server data should contain accurate times in seconds.

This table shows the coding rules for many specific types of documents and changes to the coding rules. First, the coding rules directly affect the coding decisions of difficult documents. Documents such as profit reports, sales documents, commission calculation reports, and performance reports exist in large numbers. Other documents such as commission calculation reports may specifically mention relevant products, but may have little use in antitrust analysis. The coding rules should help reviewers reduce a substantial portion of coding inconsistencies. Second, this table, due to the way of operation, provides a clear-cut time line for each of the changes. The change dates should include actual time in seconds. When a change in a coding rule is made, the change takes place real time. It is easy to identify the documents coded before the change and the documents coded after the change. If there is a need to revisit the previously coded documents, a document processor can use the information to identify those documents. The law firm can use this table to study change histories. This table accurately explains coding inconsistencies and reasons for all changes. This table also indicates that relevant products defined in the initial request have been amended in a second phrase of review. The request may drop out some relevant products, but add new relevant products. This table indicates that some errors are actually the result of negotiated settlement and risk-taking decisions. Third, this coding table is very helpful in a future review. This table may contain hundreds or even thousands of entries, depending on the nature of the case and the size of documents. This coding table preserves all critical decisions, negotiated changes to coding rules, amendments to coding rules, and other work products. It is the work product that the entire review team might have worked for several months. By reviewing this table, the future litigation staff is able to understand great disparities in coding, coding logic, and risk taking-decisions. The detailed coding rules can help future litigation attorneys formulate a new plan for future discovery. If the case is litigated and remanded, and the client needs to find certain documents, the law firm can figure out how to conduct additional review.

Coding rules and certain elementary facts affect the entire review term. Thus, the coding rules and elementary facts are authoritative. The discovery information management system provides two kinds of data verification methods in real time. Any data entries may be validated by managers or by reviewers vote. Generally, coding rules directly controls coding decisions while elementary facts are provided to assist the reviewers. Coding rules may reflect strategic decisions, negotiated compromise, motion rulings, and other changes. Those changes do not have to be correct legally, technically, or logically. A litigant may take chance for doing so. The client and law firm can always choose to litigate it to avoid production of unnecessary documents. The parties can also change normal discovery rules on what should be produced or what should not by agreement. The right to add or change coding rules may be rested in project managers and litigation attorneys. An additional step for the validation of the coding rules may be used to ensure that they are proper.

Subject to exceptions in specific cases, elementary facts are just facts that any reviewers collect from documents, verbal context, or by combining the substances in different documents. There are a great deal of elementary facts which can help reviewers code documents in one way or the other, but they generally do not specifically instruct reviewers to make a definitive coding decision. Those tasks of gathering elementary facts are ordinarily performed by document reviewers and thus may be entrusted to them. Therefore, elementary facts may be entered by reviewers and validated by reviewers using the voting method.

In a case that is less contentious, the law firm may delegate data validation task to experienced reviewers or a plurality of reviewers. The reviewers may be instructed to selectively create and validate coding rules. If a coding rule reflects litigation decisions and has significant effects on the whole review team, such a coding rule should be reserved to litigation attorneys. If a coding rule has only limited effect and does not require weighing risks and benefits, the right to validate it may be rested in experienced reviewers. This arrangement can be used to reduce the burden on litigation attorneys. This class of less important coding rules may be about attorney representation capacity, affiliation of persons with entities, the identities of governmental officials, the roles of third parties, and identities of relevant products. If a coding rule is concerned with a purely technical matter or basic fact, the right to enter the coding rule may be delegated to reviewers and such a rule may be validated by a fixed number of reviewers. This class of coding rules may be based upon meanings of technical jargon, the meanings of strange notions and expressions, recurring strange spellings, historically misused terms, and the meanings of words and phrases. Normally, two or three votes should be good enough to confirm such coding rules.

The review-assisting system is able to reduce the overhead cost in searching for coding rules, elementary facts, and other helpful information. Such a system delivers result in one key search. If a reviewer is unable to make a decision on sales data, the user enters just one words "sales," the reviewer should see all relevant rules on sales data. It might have five to ten types of sales data. The user can quickly identify relevant coding rules and code the document quickly. If a reviewer consistently experiences difficulty in coding document on trade news, the reviewer can find and compares all coding rules on "trade news." Thus, this reviewer gains benefits from the work done by other reviewers.

Interactive search function may increase productivity. When a reviewer types in the interactive search box for the coding rule table, the typing causes the server to search relevant data source fields, retrieve data, send the retrieved data, and display the retrieved data in the selection box for the reviewer to open a record. The field may use the field itself to provide data source. Assuming that the input box for the event field has been set up with the key field (also the event field) as a data source, when the reviewer types in the event field, the server searches and retrieves data pieces, sends data pieces to the client computer, and displays them in a pop-up selection box. If the reviewer moves the cursor to a data piece in the selection box and releases it, the data piece is dropped into the input box. If the data source contains a large number of records, the reviewer can progressively narrow down data choices for the input box. The search algorithm should ignore articles in the fields. If a reviewer types "s", the server retrieves "the sales table", "a sales report," "a staff report" and "a staff meeting." If the reviewer types "st," the server retrieves "a staff report" and "a staff meeting." Interactive search method is a matured art, which can be implemented by using different technologies such as Ajax and remote scripts. They can be modified to meet those specific requirements.

Global search efficiency can be further improved. It would be desirable to implement interactive global search feature on this system. This can be easily achieved by modifying the back-end search program: when a last keystroke (e.g., "D") triggers a search, the client sends the accumulated keys (e.g., "TED") to the server, which searches for the accumulated keys in all fields of a shared table or all individual tables, and returns any found records. While all of the records have different formats, but they always have two common fields: a main field and a comment. The comment field contains most important information for review purpose. The rest of the fields may be packed together by using any suitable delimiters or separators as in the normal global search result.

By using the feature, the reviewer can interactively retrieve potential data records from the entire assisting database. When the reviewer finds a potential one, the reviewer moves mouse over the entry and releases it, this causes the server to send the selected record and to display the full record below the interactive search box. This feature allows the reviewer to try different keys while seeing the interim records. This function requires high computing power and ample network connection bandwidth. For the best result, the system may be hosted in a local network with high network speed. The review-assisting system does not host a large amount of data and there is little need for constant monitoring of the network. If such a system is hosted on the Internet, interactive search may be less effective.

In document review, whenever a reviewer finds one element, the reviewer enters the element. The reviewer decides where to enter a record in the coding table and other individual tables. Each element is entered as a full data record. The database tables are structured with many other purposes in mind. The records are entered consistently. For the product table, it may contain columns for product names, product numbers, product short names, comments, and optional data such as geographic regions. A name table may contain first name, last name, title, dates ranges, comment, and address. Not all columns can be used as search keys. The first column is used as default search keys although it is purely a convention. If a field contains several words delimited by a comma or semicolon, they are treated as independent search keys. A data record is first saved and marked as a tentative record, and is validated directly by a project manager or by a vote of several reviewers. Before such an elementary fact or tentative coding rule is validated, it may be marked with a unique marking such as a pair of red brackets (or any other suitable markings) while keeping the highlight color in a web view.

The key rule is that reviewers should not enter a coding rule or elementary fact that has been entered. This can be showed in the following examples.

EXAMPLE 1

Identification of Lawyers

A reviewer ran into a suspicious attorney, but could not determine whom the lawyer worked for. A search in the names table returned no record. Thus, the reviewer knew the identity of the person had not been resolved as of that point. Later, the reviewer saw a retaining agreement, a billing statement, or a statement mentioning "I will send my draft to client X for further comment." At this point, the reviewer knew who the lawyer worked for and this was a critical fact in determining privilege. The reviewer tried to enter this attorney name in the names table with the document ID. Since the fact alone does not require the reviewer to make a definite coding decision, it should be entered in the names table. This newly entered record is a tentative record, but the correct citation of the document ID or control numbers would allow other reviewers to validate this elementary fact.

EXAMPLE 2

Identification of Infringing Products

In a patent infringement action, one of the tasks is to identify alleged "infringing" products. A party might have hundreds of products and each of them may have a unique brand name, product model code, serial number, common name, and informal name. A document may only refer to a product by one of the terms. A reviewer encountered a model number. A search in the system using this model number returned nothing so the reviewer had to code some documents by best guess. The reviewer later encountered a document, which discusses this product and its relationship with the patent-in-suit. At this point, the reviewer knew it is an alleged "infringing product." The reviewer thus decided to enter this elementary fact. At this point, the reviewer found another reviewer had just entered a tentative record concerning the nature of the product. Therefore, the reviewer had no need to enter a duplicate record. However, the reviewer cast a vote for that tentative record.

EXAMPLE 3

Bribery Investigation

A reviewer ran into a highly suspicious person who was identified by a strange email address. The email was not found in the names table. Other emails revealed small bits of information: one email revealed that the person had certain medical problems; one email indicated that the person had vacation to play golf, and one email revealed that the person recently lost a lot money and needed "financial help." The reviewers entered pieces of information about this person by using the same email address. One reviewer later ran into a document that described several board members. One of them owned great equity interest in the company and his company lost substantial stock value. Another document showed that this board member had won golf title in various golf events. Whether an investigator could find the identity of this suspicious person would depend upon if the review team could identify all those leads. If they collected all useful leads, an investigator might be able to find the person who had a medical problem, was a noted golf player, and had financial problem. By reviewing four corners of documents literally, and dismissing all documents on face, the review may achieve nothing.

EXAMPLE 4

Identify of Critical Terms

Certain terms are so unique and distinctive that their appearance in documents can be distinctive evidence in support of a coding decision. One request in antitrust clearance is the research and development effort in relevant products. In a particular case, relevant products are concerned with certain wireless technology. Among R&D documents, the topics are often directed to code division multiple access (CDMA), time division multiple access (TDMA), and frequency-division multiple access (FDMA). If the reviewer understood the terms and how they were related to the relevant products, the reviewer only needed to ensure that the documents concerned the substance of the technologies. If this fact affected the coding decision of a limited number of documents, it could be entered in the terms table. If the term could affect the coding decisions of considerable number of documents, it should be entered as a coding rule in the coding table.

EXAMPLE 5

Identification of Code Names

Companies often use code names to refer to sensitive company matters. Code names have been used to denote research and development projects, pipeline products, asset purchase transactions, mergers and acquisitions, personnel actions, government inquiry, civil actions, criminal investigations, administrative actions, and audit programs. When a code name is used in documents, the reviewer needs to know the nature of the transaction denoted by the code name. Code names may be entered in the acronym and term table or the coding rule table, depending on how they affect coding. For a large corporation, code names may be entered in a dedicated table. Each code name may be associated with a few sub-level code names. Some sub-level code names may be entered as separate records if they appear in documents without the main code names. If a unique code name requires reviewers to make a definite coding decision, it should be entered in the coding table.

EXAMPLE 6

Identification of Incomprehensible Terms

Many times, documents may be written in informal, distinctive, improper, or even wrong expressions. In the production world, the need for high efficiency trumps the desire to produce elegant and smooth documents. This is very obvious in sales fields. Such poor expressions may be found in a series of similar documents. In documents created by none-English native language, the names may be spelled contrary to the acceptable convention. A term expressed in a native culture may have completely a different meaning from its verbatim translation. When such a name appears in documents, it should be given its cultural meaning. Terms carrying cultural meanings may be used as human names, business practices, and product names. This class of terms may be entered in the terms table so that the entire review team will know their special meanings.

Some of those examples show the need to seek materials outsides the documents for interpretive use. The four-corner construction rule never means to provide the convenience of ignoring words and phrases that the reviewer cannot understand. Otherwise, the review cannot achieve the ultimate goal of finding truth. If truth can be sacrificed for speeds and costs, then cases can be decided by flipping a coin.

3. Use of Integrated Review-Assisting Component

Figure 7:
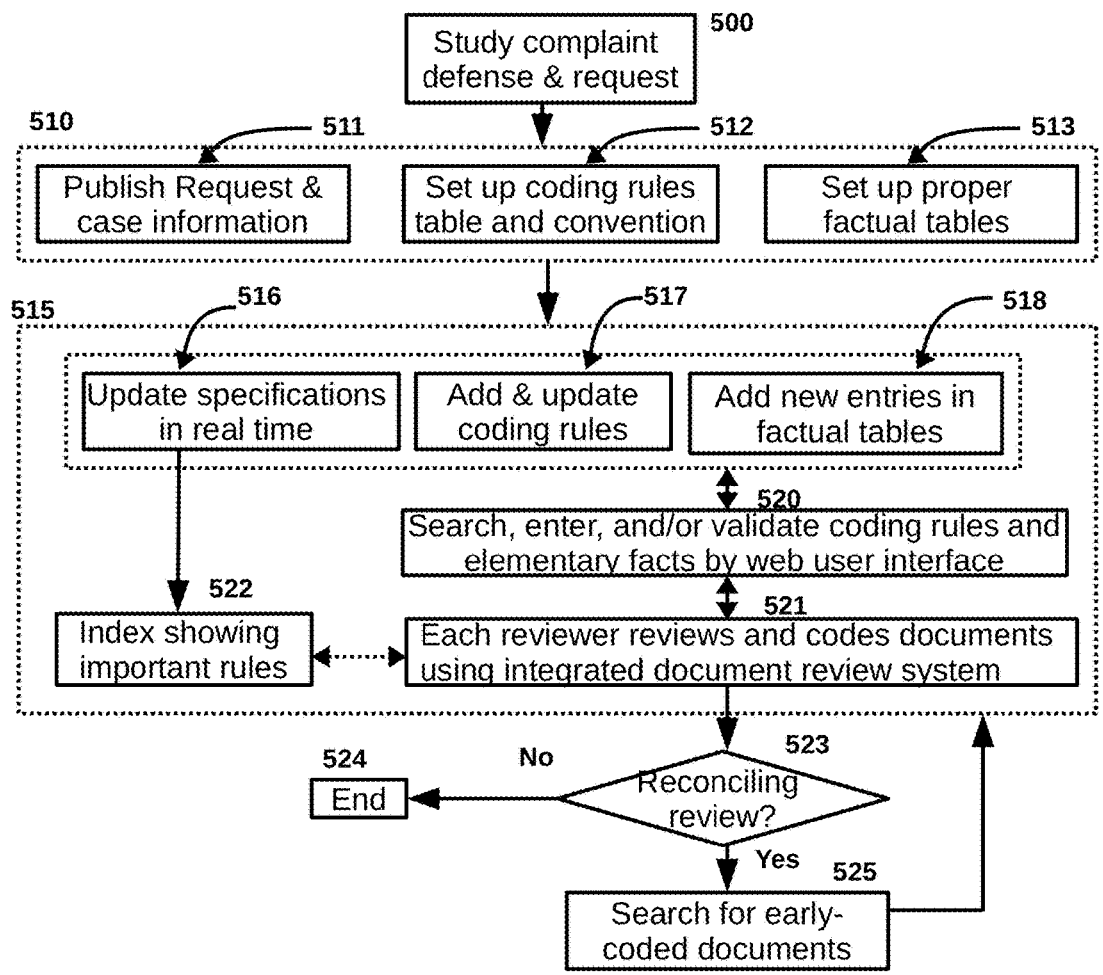
FIG. 7 shows the accurate coding process by using a document review platform integrated with review-assisting features.

An alternative method is to integrate an information-sharing feature into any existing document review platform. Integration may make the system simpler. All concepts discussed are equally applicable unless it is incompatible or modified below. The concept is that all coding rules and elementary data are stored in one table that is implemented with interactive search feature, global search feature, and data entry feature. FIG. 7 shows detailed steps for this second embodiment. From the document request, the litigation attorneys first study the request in light of defenses and complaint at Block 500. The management sets up the system for the specific case at Block 510. The set-up steps include publishing the request and case background information at Block 511, setting up a coding rule table and coding conventions at Block 512, and setting up other fact tables for storing elementary facts at Block 513. Those tables may be virtual or logical tables if data are stored in one database table. Data may be stored in one, two or more database tables. The basic actions in document review are shown at Block 515, where the manager updates the document requests or specifications at Block 516 and updates detailed coding rules from time to time at Block 517, while each of the reviewers add elementary facts in the fact tables at Block 518. All of the important changes are optionally published in the index table at Block 522. During the review process, each of the reviewers uses a review-assisting user interface 520 to access requests at Block 516, the coding rule table at Block 517, and factual table at Block 518 while reviewing documents. Each of the reviewers may also periodically access the index table to see all changes, selected changes or latest changes in coding rules and elementary facts at Block 522. After the first review is completed, the manager determines whether a reconciling review is conducted at Block 523. If reconciling review is to be done at Block 523, a proper set of documents are found and retrieved at Block 525 and a reconciling review will be conducted.

To set up a coding table and factual tables, the project manager needs to think what kinds of coding rules and elementary facts should appear. The tables would depend upon the case and the document request. For example, a master table in a second request may be as follows:

TABLE 2

Table for Showing Coding Rules and Elementary Facts

| Subject | Virtual Table | Scope Effect | Coding Effect/sub type | Date | Comments |
|---|---|---|---|---|---|
| Sales data | Coding | O | R | Jan. 01, 2009 | Sale Performance in a performance report. |
| Apple, John | Names | O | Attorney | Jan. 01, 2009 | Black and White LLP for the client. |
| T.J. | Names | O | Partner | Jan. 01, 2009 | Director of Marketing, of the client (to be updated). |
| tbx@law.com | Names | O | Client | Jan. 01, 2009 | In the negotiation of Green transaction for the client. |
| White, John | Names | O | Other | Jan. 01, 2009 | Government official in the stock action. |
| Lee, Trouble | Names | O | Other | Jan. 05, 2009 | Employee of Competitor, XYZ corporation. |
| Annual Sales | Coding | S | NR | Jan. 05, 2009 | All annual sale data are NR. |
| Annual Sales | Coding | S | R | Jan. 10, 2009 | All annual sale data for Division X are responsive. |
| Income and Profit | Coding | O | R | Jan. 02, 2009 | Company-wise income and profit report. |
| Income and Profit | Coding | O | R | Jan. 02, 2009 | Income and profit report for X division. |
| Income and Profit | Coding | A | NR | Jan. 10, 2009 | Income and profit report for X division. |
| Performance Report | Coding | O | NR | Jan. 02, 2009 | The report generally contains sale data and refers to certain products. |
| Commission report | Coding | O | NR | Jan. 01, 2009 | See example BAT-232323. |
| Sale Report, daily | Coding | O | R | Jan. 02, 2009 | IF it discusses relevant products. |
| Sale Report, daily | Coding | O | NR | Jan. 02, 2009 | IF it is for non-relevant products in general. |
| Income & profit | Coding | A | NR | Feb. 01, 2009 | All income & profits reports are coded as NR, effective immediately. |
| Sales data, spreadsheet | Coding | O | NR | Jan. 01, 2009 | See document at Bat-0011111. |
| Web contact log | Coding | O | NR | Jan. 01, 2009 | See document at Bat-002222. |
| Trade News | Coding | O | NR | Jan. 01, 2009 | Trade News about this industry. |
| Trade News | Coding | O | R | Jan. 01, 2009 | News published by XYZ concerning the telecommunication products, market shares in XYZ, and relative competitiveness. |
| CDMA | Terms | O | N/A | Jan. 01, 2009 | Code division multiple access is the underlying technology related to the relevant products. R&D efforts for CDMA are responsive. |
| FDMA | Terms | O | N/A | Jan. 01, 2009 | "Frequency division multiple access", R&D on this topic is not responsive. |
| Virus, complaint | Coding | O | R-3 | Jan. 01, 2009 | The vulnerability to virus infection affects competitiveness of relevant product. |

The first column, also referred to as the main field, contains the identities of coding rules or elementary facts. The second column is about table type (virtual or logic table), which is equivalent to a main classification. Possible values for this column depend upon the case and request. For most cases, the values include coding, names, and terms. If the information is organized in several individual tables as in the discovery information management system, then this main type is unnecessary. The third column defines the scope effect of the data record and its values determine whether the data record is original, amended, or settled. Those values may be denoted by "O," "A," and "S." Obviously, "settled" is generally applicable to the coding rules only and it is not be used in elementary facts. The fourth column contains date for coding rules to take effect. The values for coding rules are "R" and "NR," respectively, for responsive and non-responsive. In this case, they control the coding decisions for the type of documents identified. If it is required that documents are coded specifically for all request numbers, the coding value "R" may be affixed with a request number. For example, R-1,2,8 means that the document controlled by this coding rule is coded as responsive to requests 1, 2 and 8. The values for elementary facts in the coding effect column depend upon table value, and affect coding decisions by operation of facts. Sub-type contains a value that most likely will affect the coding decisions of other documents. For example, sub-types including attorney, client, partner, and third party in the names table will affect privilege coding and responsiveness coding under various circumstances. In the product table in a product liability case, sub-type value may include suspect, normal, toxin, flagged, and all, depending on case nature and discovery objective. There is no need to enter index directly in this table. An index table in a web view is automatically formed from extracting coding rules and elementary facts from the database table.

This integrated table or logic tables should be designed to have universal applications. The manager can set up different virtual tables (also "table types" or "main types"). Different cases might require different table types, and different tables require different coding effects or sub-types. Table values such as "coding" may be used as a filter to retrieve all coding rules for export. So, the reviewer can retrieve any of the specific set of terms defined by a table name or the coding rules. The "terms" (when it is used to mean a term table) may be used to retrieve all entries of the terms. By using the convention, even a same table may be used to store different data. For example, products and transactions may be combined in one virtual table. The data from this table can be exported like a dedicated table. Data from a dedicated table can be imported into this table.

This table is just a combination of many independent tables used in the review-assisting system discussed for the first embodiment. A person skilled in litigation and computer art can modify this table for different cases. By using one single table, global interactive search, global search, and data entry method can be implemented more efficiently. It reduces the overhead to constantly open and close several database tables. It, however, reduces the flexibility to set up sophisticated table structures. However, most of the interpreting details can be put into comments. The ability to import data from and into the table will also be more difficult between two systems using different database tables. Utility tools can be developed to import existing names table, terms table, acronym table, product table, transaction table, etc. into this table. In retrieving data, the reviewers have fewer options to specify the ways of retrieving data. An effective global search method allows the reviewers to find any of the data records. Advanced search and sorting methods may be implemented for special uses.

The review-assisting user interface for this table has three integrated functions. First, interactive search function allows each of the reviewers to quickly determine if a particular coding rule, name, or term exists in the table. The user interface may be placed over document coding pane, the document list pane, the document view pane, or a separate pane. One example location is shown in Block 140 in FIG. 1 or 153 in FIG. 26. An interactive search and feeding input box may also be directly placed in a convenient location for direct use. One example is shown in 619 in FIGS. 11-12.

If the document review system is integrated with a review-assisting system, a menu item such as "Full DSI" 150 (in FIG. 26) is for opening the full-featured user interface, which is shown in FIG. 8. The full-featured review-assisting system, as disclosed in the Discovery Information Management System, can be integrated. This opened page has a top menu 550 for setting up database tables, a global search box 551, a full table-selecting bar 552, a view-selecting bar 553, a local table search box 554, a data validation status information tool 555, buttons 557 for opening data entry pages and data editing pages, and a page-navigating tool 558. On this page, the reviewer can also open any of those pages shown in FIGS. 13-16, 19-25. The only functions that have not been shown on the review-assisting user interface is the search tool using multiple personal or private key arrays that are for private use. This search tool can be placed next to the menu "Pad" or is placed at a point closer to the document view pane. The details for the full-featured review-assisting system have been fully disclosed.

Figure 9:
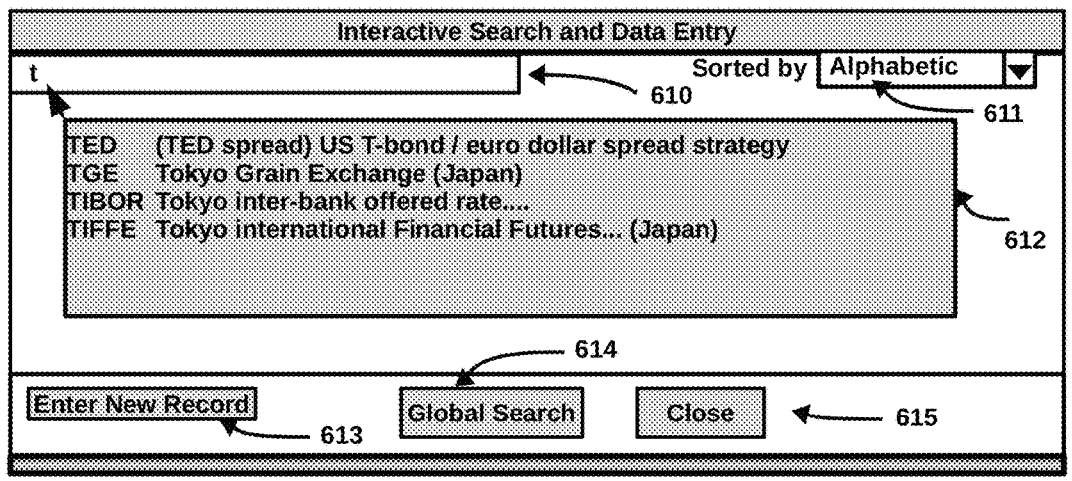
FIG. 9 shows a web user interface for conducting interactive searches with a button for opening a global search page.

FIG. 9 shows an example of an interactive search page (which is in addition to a standard search page). It has an interactive search box 610, a sorting selecting box 611, a selection box 612, a global search submission button 614, and a switch button 613 for switching to data entry page. In conducting interactive search, the system searches the main field although the search program can be modified to search several or all fields. If the interactive search feature is set up for searching all fields, the search program sends only partial records to be displayed in the selection box 612. It is desirable to show the portion of the text containing the typed letters so that the reviewer can determine which data record is selected for display. For example, if the reviewer types "CDMA" in the interactive search box 610, a record is returned because its comment field contains the typed key. This record may be displayed in the selection box 612 as "R&D, effort: Coding; O; R; this class of documents are directed to only the CDMA technologies . . . . " If the scope of interactive search is limited to the main field, the sorting control 611 can be implemented. For the best result, both search and display methods may be implemented by default, but the project manager can configure the default settings. For investigation cases, the project manager may select or set global interactive search scope to include all fields. For other cases, the interactive search scope may be set to the main field only.

In designing the review-assisting user interface, the key consideration is that each of the actions, interactive search, data retrieval, and data entry can be performed as efficiently as possible. It should not consume too much desktop space, but achieve the highest efficiency. The operations should not interrupt review workflow. If the reviewer finds one or more data records, the reviewer has the option to select one record to be displayed, as shown in FIG. 9. At this point, the server gets the record, updates the page, and displays the selected record below the interactive search box 610.

Figure 10:
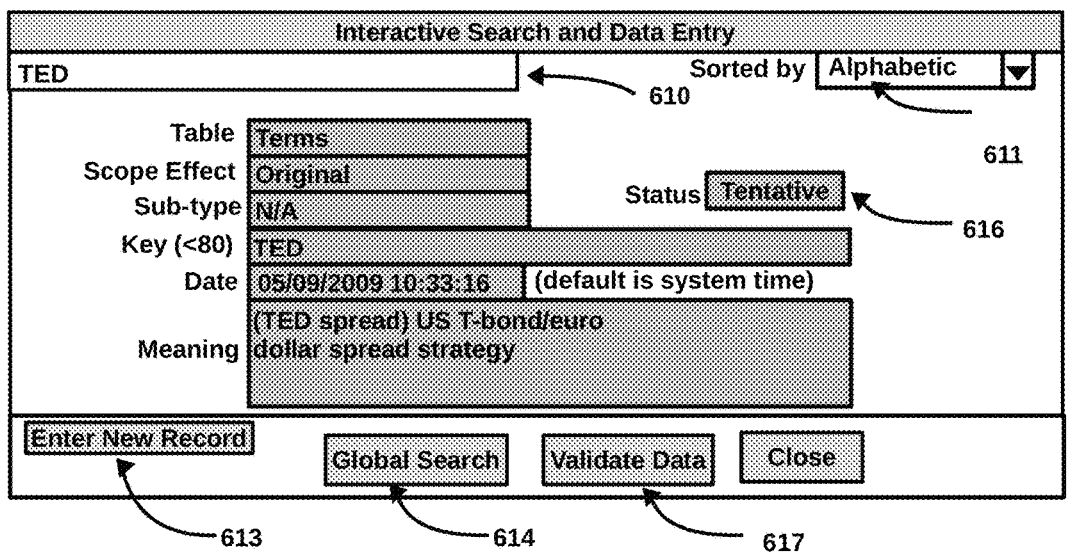
FIG. 10 shows a search result from an interactive search after the user selects an entry in a selection box.
Figures 13, 14:
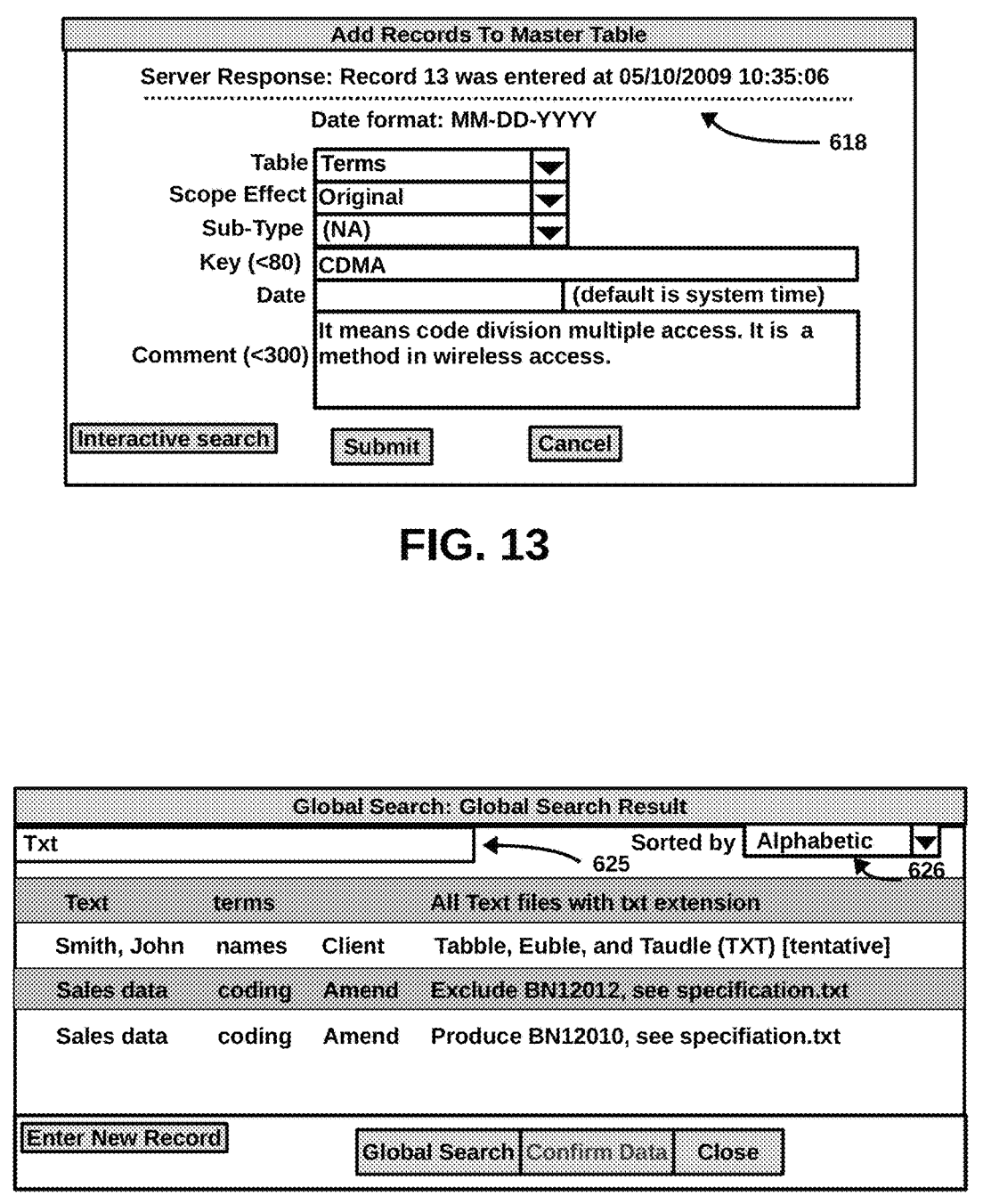

FIG. 10 shows the record, which has been found from searching the key "TED." When a record is found and displayed, this page shows its data validation status 616. In addition, this page also shows a "Validate Data" button 617. At this point, the reviewer has three options. The first option is just to review the record and dismiss it. The second option is to read the record and validate it by clicking the "Validate Data" button 617. If the reviewer is non-privileged reviewer, the validation method is a voting method. A clicking of the button with a pop-up confirmation is counted as one vote for validating the record. If this vote is the last vote required to validate the record, the server will automatically change the validity status of the record (data statuses are indicated by different colors and notations) upon the casting of the vote. The principles and methods for data validation are fully disclosed in several United States Patent Applications for Discovery Information Management System. If the reviewer is a privileged reviewer, the reviewer just validates it by clicking it. The third option is to do more searches. If the record does not help, the reviewer can do another interactive search in the same search box or use the key left in the search box 610 from the last interactive search to conduct a comprehensive global search by clicking the global search button 614. This button is for submitting the form to a different search program, which conducts a more comprehensive search. It may search this table, discussion table, personal server pad table, and instructions and guidelines, to find all records containing the key. Upon receiving the search request, the server gets the value of the key, checks its data formality, uses it to conduct a search, and returns all found data records. The result is shown in FIG. 14.

If a reviewer runs into a critical fact-descriptive document and acquires useful information, which may assist other reviewers in coding similar documents, the reviewer may enter a coding rule or an elementary fact in the table. The reviewer types in the interactive search box one or more keys to make sure that the same coding rule or elementary fact has not entered in the table (FIG. 9). If the reviewer finds nothing, the reviewer clicks "Enter New Record" button 613 to open a data entry page shown in FIG. 11. This page contains a switch button 619 for switching back to the interactive search page. To enter a new coding rule, the reviewer first selects "coding" as table type, selects "Amend" for the effect field, select "R" for the coding effect/sub-type field, and then enters data for the main field (i.e., the key), the date field, and the comment field. The reviewer may enter specific date as the effective date, or use the current system time as the effective date. When the reviewer submits the filled page, the reviewer will see the same page showing a server action message 618 with the form cleared for next data entry. The server message is always for a prior submitted record, while the displayed data record in FIGS. 11, 12, 13 is for next submission. This server message shows a record number and entry time for the last entry so that the reviewer immediately knows whether the last record has been entered successfully. If the reviewer enters a name (See FIG. 12), the reviewer selects "names" for the table, selects "original" for the effective field, selects "employee" for the coding effect or sub-type, then enters name, date and comment in respective fields, and submits the form to the server. To enter a term or acronym, the reviewer selects the terms as the table, selects "original" for the scope effect field, enters effective date if necessary, types the term and a comment in the respective fields, and submits the filled form to the server.

By extending the basic logic, data may be entered in any of the individual tables or the virtual tables. In each of the cases, the server processes the form, gets the data, checks date format, connects to the database, and writes the data in a right database table.

In those examples, the data entry form has six fields, but may contain fewer or more. The reviewer selects the table type in the first field. It has a drop-down box for the reviewer to select a table type. For a given table type, the reviewer can select coding effect or sub-type for the selected table. For a name, the sub-type may include attorney, employee, partner, and other parties, which can affect coding decisions in privilege and many types of relevancy reviews. Each table type is associated with only certain types of data. For example, "coding" may be used to retrieve all coding rules, "names" may be used to find all player names; and "terms" (or acronym) may be used to find all terms and acronyms. Coding rules are also used for the purposes of identifying right documents for a reconciling review.

The coding effect field in the database table optionally may be designed to use composite data regulating coding decisions. For example, the entry might be "C-R-O," "C-R-O," "C-N-A," and "C-R-A," where the first letter means coding rule, the second letter means coding decision (N=non-responsive and R=responsive), and third letter means effects: "original," "amended," and "settled." The use of composite data can reduce field number and save storage space. Status fields cannot be manipulated by reviewers, and may be implemented as independent fields. Regardless of how those statuses are implemented in the table, they should be displayed in the most convenient view for the reviewers. For terms table, sub-type is not required in normal situations.

If a record for a coding rule or an elementary fact exists, but the reviewer wants to amend the rule or the fact, the reviewer can just interactively retrieve the record, open it, edit it, and submit the edited form to the server. On this page (FIG. 11), the user may select "original," "amended," and "settled" as the value of scope effect. The server may automatically treat the changed rule as an amended rule, and the system automatically assigns "amend" if the reviewer has not chosen one. It should be noted that available options for scope effect and sub-type depend upon the table type. If names is selected, the scope effect would be "original" and sub-type would be "client," "attorney," "partner," "other party," and optional "opposing party." The reviewer may use the global search if the reviewer wants to conduct more thorough searches.

The table has a data validation status field. To save display area, the validation statuses may be hidden on the web table and are shown in different colors of the main entries. In addition, their statuses may appear by notations or distinctive background colors. Thus, the reviewers would know if a record has been validated and whether the reviewer can validate a particular record. The status data may be shown as a separate column in the table 3 (below).

The sharing of critical information in real time is not enough because the method only reduces certain kinds of errors and inconsistency. The system should provide real time review instructions and updated coding instructions. Use of illustrative coding map can effectively reduce the risk of porting different coding logic by reviwers into the current particular project. The map should be drawn in a way to reduce undesirable effects of the importing reviewers' experience and knowledge into the current project. This graph should contain default rules for each type of documents and options to alter the default rules as shown below.

TABLE 3

Instructions Showing Default Rules, Options and Exceptions to Default Rules for Privilege Review

| Document/ Content | Default Rules | Option Out | Exceptions to Default Rules |
|---|---|---|---|
| Draft contract | [ ] P | [X] NP | [ ] P only if it has definitive evidence of lawyer's involvement in email, mata data, and text. |
| Press Release | [X] NP | [ ] P | [X] P only if it is concerned with the XWZ transactions. |
| Privileged email sent to partners | [X] break up privilege | [ ] Does not break privilege | [X] the email does not break privilege if it is sent to [. . .]. |
| Email sent to attorneys and many employees | [X] NP | [ ] Tentative P | [X] P only if the author asks for legal advice expressly. |
| Email reveals no more what is required to lodge it | [X] NP | [ ] Tentative P | [X] P only if the message is concerning [. . .] or sending to or from [. . .]. |
| Email sent to lawyer with FYI | [X] NP | [ ] Tentative P | [X] P only if the subject is obvious that the sender made an implied request for legal advice. |
| Email relayed to lawyer | [X] NP | [ ] Tentative P | [X] P only if the subject is obvious that the sender made an implied request for legal advice. |

The actual map used on the review site should contain a concise but comprehensive default coding rules. Each type of documents may be treated differently at different review sites due to differences in the nature of case and litigation strategies. The litigation attorneys cannot assume that reviewers can follow a lengthy discussion or oral instructions. It would be futile no matter how much explanation is provided. The problem is not because reviewers are too stupid to understand. Normal rules are the rules that most law firms follow under normal circumstances. The use of default rules, reversal default rules, or exceptions can be justified by certain facts, which are not on documents. The following are two examples:

EXAMPLE 7

Draft Contracts

A key factor, which is not disclosed in the draft contract, is corporate drafting practice. In some companies, every contract is drafted by its legal department, and its legal department is involved in every step from sending a model draft, negotiating over terms, reviewing terms, editing drafts, and signing off. In this case, the client can defend a privilege claim by showing its general practice or by specific draft instances even though it may be costly to challenge and defend a privilege claim. In other companies, every draft contract is drafted by a group of well-trained employees. While those people might sometimes seek legal advice, they do everything in drafting contracts. In this case, the default rule should be non-privileged. In many cases, there might be exceptions. For example, all settlement agreements are drafted by outside attorneys. In this case, the presumption is that draft settlement agreements are privileged.

EXAMPLE 8

Email Sent to Lawyers and Employees

In determining privilege of email sent to attorneys and employees, one needs to determine if the message is intended for seeking legal advice. When an employee sends a message to five people, it may be for information only. However, it is also possible that the email is sent to solicit a comment. In many cases, one, or several recipients do make comments as to what to do. In some cases, attorneys do respond with legal advice. The communication pattern seems to show that at least for some sensitive matters, the sender seeks advice from both business people and lawyers. In one case, email sent to an attorney and four employees may be coded as not privileged. In another case, email sent to an attorney and fifty employees may be coded as privileged. The communication patterns, the nature of the information, and the rankings and roles of the employees play differential roles in the determination of privilege. Those two examples tell why two law firms use exactly different default rules for coding certain documents.

4. Method for Minimizing Differences in Judgment

The biggest difficulty in discovery is of course that attorneys and reviewers interpret the same document differently. It is generally agreed that certain level of consistencies is desirable. To reduce the judgmental differences, three causes are explored below. Many other causes are intertwined with the three causes but will not be discussed.

The first cause is related to lack of language context. It is well known that context permeates the language. All words and terms in document definitions are context-sensitive and thus subject to different interpretations. "Dummy privilege review" is not a well-defined definition and can mean different things to different reviewers. Even those most common descriptive words such as "hot", "significant", "clearly", "relevant", and "responsive" means different degrees to different reviewers. They are subject to subjective interpretations. This class of words and phrases can be found in document definitions in abundance. This problem is enough to cause the review product to be worse than that of computer algorithm. This is also the reason why experience, knowledge and skills can become "liabilities" when the reviewers use them to reach an interpretive result contrary to the expectation of the manager. It also explains why a group of reviewers show great differences in their understandings because they have different context knowledge.

The second cause is practical inability to consider all variables, and there is no way to properly weigh all variables. This is the most obvious reason why three appeal court judges cannot reach a unanimous opinion. Each judge selects and analyzes the variables based upon subjective preference. Each judge can decide a case first and then identifies those variables in support of his or her outcome while ignoring those variables contrary to her or his opinion. In a typical litigation case, the number of variables that affect any litigation decisions can be overwhelming but are often non-obvious to the reviewers. Example 8, above, shows why two law firms used two different coding methods. The large number of hidden variables is the reason why the problem can be addressed only when it appears. No solution can be found from gigantic review binders.

The third cause is the existence of a broad spectrum of varying corporate documents for any type of documents. This document characteristic turns many otherwise-definite words and phrases to indefinite words and phrases. For example, words such as "article," "legal instrument," "financial data," "draft contract," "public statement" and "board minutes" are very clear to any non-document reviewers. Everyone would say he or she understands. However, if they are presented with a broad spectrum of such documents, they may have to question whether they really "understand" them: the documents.

Corporate documents may concern anything between its non-existence and its existence or anything from an initiation stage, development stage, to its final existence stage. In one example, a document definition contains "invoices," which is a word everyone understands. In most corporation documents, hundreds documents may be related to invoices. Those documents include billing statements, draft invoices, receipts, handwritten notes on payment, payment vouches, commercial invoices, proforma invoices, banking documents showing payment, amendments to price, security transaction documents, descriptions of a transaction, documents showing payments without title invoice, packing slips, tentative orders, confirmed orders, and email confirmation of an order. When the document pool contains hundreds types of documents that are between invoices and non-invoices, or contain the substance of invoices, it is difficult to draw the line as a matter of practice. It makes no sense to produce a document titled as "invoice" but reject one containing same information except it has a different title. Further difficulty may arise when the reviewer tries to ascertain the intended purpose of a particular document definition and the massive number of responsive documents.

In another example, a request definition may include "financial data" without further definition. All native speakers understand it. If a corporation creates hundreds of varieties of documents containing or reflecting financial data, it would be hard to define its scope. Financial data may appear in sales summaries for days, weeks, months, quarters, years, and multiple year period, budget forecasts for different groups, products, and divisions, and financial forecasts for different products, different periods, different groups, and different purposes. Certain financial data may also appear in routine employees performance reports, bonus computation forms, company restructure document, and even personal resumes. It may be in all kinds of annual reports, circulars, budget plans, press release, etc. The fine varieties may be in the order of thousands, and they might reach about 70% of corporate documents. Accordingly, different reviewers may take this definition differently. It is not sure what the request drafters really want.

There is same problem with "Research and Development Documents." The documents from a technical company may include all kinds of highly technical documents. Each document contains only a tiny slice of a technical report, quality control analysis, or research and development report. Most email may discuss only one or few tiny aspects of customer support incidences, quality control tests, or research experiments. The documents may come in thousands of types. It is impossible to determine whether a document is related to customer support services, warranty services, routine technical maintenance, or true research and development.

Training is not effective solution to this problem because the scope of things to be trained is overwhelming. The most effective solution is implementation of an effective methodology. Review instructions should be written in a way to minimize different judgments influenced by personal knowledge, prior experience, and different levels of case knowledge. A good review instruction should be designed in light of the review industry general practices with well-defined context to minimize differences in understanding.

A brief written or oral instructions without indicating unique facts and clear intention to depart from common practices is ineffective to overcome reviewers coding habits. The best solution is to set review standards. Standard coding instructions should be presented in a compact version with reference numbers. Detailed explanations are provided in the review standard manual with reference numbers. Reviewers can check details from the standard review manual. After standards are set and reviewers understand the standards, they can code documents in improved accuracy. When litigation attorneys do not want to follow common practice, and apply a different rule or exceptions, it should be presented in a sharp contrast with common practices or well-known default rules. To further reduce coding errors, the coding rules for common documents and specific substances should be standardized, and all coding rules are written with clear context information such as cited document ID.

5. Use of an Index Table for Tracking Coding Rules and Elementary Facts

Further improvement can be achieved by using an index table as shown in FIG. 15. It has a filter 630 to select main types such as coding rules, names, terms and transactions. The index table is one web table showing all changes or recent changes in coding rules and elementary facts. This table should allow the reviewers select specific records by using the filters 630. Optionally, it can have one option to show all records in the table. The reviewers can find the latest changes by opening and see the index table by default. They should see the latest changes each day before the start of coding documents. In addition, the reviewers may see data records by using different sorting methods such as normal entry dates and times, reversal entry dates and times, alphabetic order, and reversal alphabetic order.

6. Conducting a Reconciling Review

After a first round of review is concluded, the coding database inevitably contains errors and inconsistencies. Errors may be the result of human mistakes or changed coding rules during review. Inconsistencies reflect the differences in coding decisions for same or similar documents. If resource permits, a reconciling review may be conducted to further reduce errors and inconsistencies. In the traditional review model, a second review and a quality control review are normally conducted to improve consistencies. Under this review method, only certain documents are selected for a reconciling review.

The document pool for a reconciling review can be created by searching all documents using a key word in changed coding rule and proper variants, and identifying the documents that are coded before the date of change. If "sales data" are key words in documents and the coding rule was changed at time=t, the documents coded before time=t are coded differently from the similar documents coded after time=t. The system searches and retrieves those documents containing "sales data" and other potential variants keys and that were coded before time=t. If the coding rule for a particular substance has been changed twice, at time=t1 and time=t2, the system searches and finds all documents containing the key and other suitable variants and selects those before time=t2. If "sales data" in the main entry of coding rules are properly search keys, they can be used directly. If the rule is named by a descriptive word, proper search keys are used to retrieve potential documents. Generally, it is not proper to use one tag value to retrieve documents because many documents might be coded as non-responsive. If many coding rules are changed during the review, the system finds all those documents, which might be affected by all changes in the coding rules. A reconciling review should focus on the following documents.

(1) Coding inconsistency before a coding rule is placed. Before a coding rule is provided, reviewers might use their best judgments in coding documents, and documents containing same or similar substance may be coded differently.

(2) Coding inconsistencies as a result of changes in coding rules. Certain documents were coded according to an early coding rule. Later, the coding rule was amended, and all documents that contained the same substance were coded differently. If coding decisions do not depend upon other substances, their tag values are conflicting. The tag values for the previously coded documents should be changed accordingly.

Reconciling review may be subject to any discovery agreements. During discovery, the litigation attorneys may negotiate with the requester to properly determine the request scope. The requester may consent to a narrow reading of a particular request or exclude specific substances. The requester may consent to the changes to the scope prospectively or on the conditions of producing previously coded documents as of the date. If a change is unconditional, the change in the coding rule can be treated in the normal way. If a change is made on the condition that it only affects review prospectively, all previously coded documents are produced.

J. Configurable Highlight Methods with Infotips

In a prior art review platform, all search terms are highlighted to attract the attention of the reviewers. The purpose of highlight was to attract reviewer's attention but not intended to give the reviewer any information. The reviewers are expected to remember them or conduct cross-check for terms they do not know. Many of the terms are highlighted for no particular reasons. Highlighted terms can be anything such as any common words and phrases, numbers, phone number, email address, personal names, location, and time. When a great number of terms are highlighted, and many of them have little meanings, highlights may become less useful.

In prior art, the search terms are formulated and used to get relevant documents in the highest probability. One type of terms has well-known meanings, and their presence may increase the probability that the document is responsive or privileged. Those terms are generic ("generic terms") because they do not have special meanings. Examples of generic terms are "fax", "legal", "letters," "privileged," "advice," "drug," and "office." A second type of terms has special meanings ("special terms"). Examples of special terms are "23145", "jackman@fraud.com," "PNO11233," "Jock Stone," and "multiplexity." A small number of terms may be somewhere between them, but they can be classified as either. The two groups of examples reveal an obvious distinction.

When search keys comprise a large number of generic terms, this feature actually hinders the reviewers' attention. To use the terms to reach the broadest search scope is one thing, but to highlight them for reviewers' attention is totally a different thing. When a document contains many special terms, the last thing the reviewers need is to highlight hundreds of generic terms. Some terms such as "office" may have little value in review analysis unless this word means something special in a particular case. Moreover, when the total search terms are in the order of hundreds to thousands, it is impractical to expect the reviewers to remember them. In practice, few reviewers can understand the meanings of the terms and few actually even try to remember them. Therefore, review accuracy cannot be achieved. Thus, an improved highlight method is to separate the search terms into two classes and highlight only special terms.

This would require that all search terms be classified as two or three groups according to their meanings, and earmarked with a type flag. This may need to change existing algorithms. One way is to use two-pass search in creating a document pool for review. For each document, the server searches generic terms in the document. If the server finds a hit in a document, the server includes the document in the review pool, but does not highlight the term in the text. The server conducts a search with another key until the server goes through all generic keys. The server then searches the document with all special terms and does exactly the same except that the server highlights all found words in the text in this round of search.

One further improvement is to embed an infotip for each of the special terms. When a large number highlights for generic terms are eliminated, it is realistic to add infotip for each of the special terms. Optionally, the terms to be embedded with infotip may be limited to those listed in the coding table, the elementary facts, or those listed database tables. The potential candidates are product names, product numbers from a product table, transaction names from a transaction table, personal names from a names table, event names from the event table, and acronyms names from a term table. The server may use the primary field (the key field) and other suitable terms in the tables as search keys. The highlight on the words found by using the keys in the term table may be optional. This term table contains terms which have meanings that are unknown to many reviewers but they are not really special in the sense they do not have unique meaning. Their meanings are known or knowable to the public. However, how to treat this class of terms is purely a judgment call. It may increase review efficiency in certain cases but may degrade review efficiency in other cases where this table contains a large number and reviewers know most of them.

When the document is delivered electronically, each document is represented by codes. In processing the document or at the time of delivering the document, color tags are added to the code of the document under review, color tags can be added by using any of known methods in single or multiple trips. To improve efficiency, highlight and infotip may be added in one single trip. The server goes through the text word by word, and, for each word, the server compares the word with each of the keys in turn. Each key has a correspondent type value, a comment value and optionally other suitable data. Array variables for storing key, type, comment, and other fields may share a common index. If there is no match, the server moves onto next word in the document text. It repeats this process until it finds a match. Whenever a match is found, the server determines highlight color consistent with the type of the matched key, and adds necessary codes for highlighting the found word in the text of the document. The program may use the definition in the second field or the comment field to create an embedded infotip. This method of creating infotip is well known in the art. When the document is rendered and if the reviewer moves mouse over the word, the browser will generate a small display area showing the definition for the term. For example, the infotip for P232XYZ may be "This is client's product using a TZ8840 chip."

The need for showing infotip for generic and special keys depends upon nature of cases and discovery objectives. The search keys for building a document pool may be changed from time to time, and so do the terms stored in the coding table or individual tables. The special terms for defining the document pool may be same or different from the special terms stored in the coding table or individual tables. If special terms are shared, one or more tables may be set up as the type that does not need infotip so as to avoid unnecessary infotip. The terms in the coding rules are not used as search keys for defining the document pool because they generally do not appear in the document. Display infotip for some generic terms should be an option if it is useful in some cases.

K. Highlighting Terms Using Shared Dynamic Key Arrays

The search keys for highlighting purposes should be different from the search keys for building a document review pool. The search keys for building the document pool are formulated to get as many responsible documents possible, whereas the search keys for highlighting purpose is solely for achieving review speed and accuracy. Besides, this need for highlights depends up the reviewer's case knowledge.

It has been pointed out that each case raises unique legal issues and presents unique facts, thus requiring unique data tables and data structures. There is a different way to build search keys for highlighting purpose. The task of building personal highlight keys is burdensome. When a team of reviewers is reviewing the documents from the same source, the documents have some commonality. On a given day, reviewers A, B, and C may resolve a set of special terms in coding some documents, those terms may be found in the documents for reviewers D, E, and F. Many terms may appear in all documents in different review ranges. For this reason, search keys for highlighting purposes should be for the whole review team.

One method of the present invention is to highlight special terms and optional generic terms. This method is intended to achieve better highlights. The method includes that (1) project manager or server administrator creates a shared table or several database tables or equivalent file for storing the terms together with related information; (2) the system provides a tool for all reviewers to build shared search keys during review; (3) system provides tools for all reviewers to verify search keys[1]; (4) the system uses suitable search keys to highlight texts; and (5) system provides tools for each reviewer to selectively highlight the terms with different types and numbers and change display attributes. A reviewer does not have to see all unwanted and useless highlights, but only sees desirable highlights. Optionally, the system provides tools for ensuring that terms are appropriate. This highlight method may be used in addition to the initial highlights used to build document the review pool.

[1] It once was referred to as "data validation", but is different from all convention data validation methods. It is for verifying whether a critical fact or issue can be found from a document. It is a protocol for resolving potential different judgments. Factual or coding issue is disposed by a supervisory ruling or a consent of a threshold of reviewers.

The terms for highlights are the same keys from the elementary facts and the coding rules. The use of those two classes of keys can further improve efficiency. All cautions such as the need for controlling the risk of adding wrong elementary facts and methods for validating them are automatically taken care. The keys are entered into a well-structured shared database table or individual database tables. The structural limitations are implemented on the data entry form.

If the element is saved in a shared table, it is preferable to use two classification types such as a main type ("virtual table") and a sub-type, which affects coding decisions by operation of facts. The value of the main type includes names, product, branch, coding, etc., depending on setup settings.

L. Search Documents Using Multiple Personal Key Arrays

The present invention provides a powerful search method, which can be used to search documents by using search key arrays that any reviewer can build personally. This search method is designed for personal or private use. Since it is not shared, the user can freely formulate the key arrays. In a situation when a reviewer runs into a series of documents where a critical issue may be always associated with one or more unique words and those words are not useful to other reviewers. In another situation, the legal issue may be so unique that it is discussed by using one or few distinctive terms. Formulating search key arrays, selection of search order, review focus, and review habits are highly personal. It is possible that a same process used successfully by some reviewers may be totally unworkable to other reviewers. This has a lot to do with the reviewer's knowledge of search algorithms, ability to understand the net effect of different logic operations, different keys combination, and different review orders. When the document has tens to hundreds pages, it can dramatically improve review speed and coding accuracy. It would be impracticable and cost-prohibitory to review such a document manually.

FIG. 16 shows that the search page allowing a reviewer to selectively search the document by using a plurality of personal search key arrays. It has a "Current Search" button 641, and the button 640 is for closing this search page. The reviewer provides a search key array anytime right before conducting a current search. It also has a plurality of setup buttons 642 which allow the reviewer to set up four sets of search key arrays (A, B, C, D), and set up the storage destination for each set of search key arrays, and select a search platform. For example, the reviewer can enter search key array A (A1, A2 . . . , An), search key array B (B1, B2 . . . , Bn), search key array C (C1, C2 . . . , Cn), and search key array D (D1, D2 . . . , Dn). To set up each of search key arrays, the reviewer clicks the correspondent setup button 642 to open the page shown in FIG. 17. The reviewer provides a search name, a delimited key array, selects key storage destination, and selects a search machine. When the search key array is saved on the server, it is persistent until it is deleted. When a single key is used, the search function helps the reviewer to navigate through each of the highlights. When a key array is used as search keys, the search function may show up all found words at once. It may also be modified to add a Next button that allows the reviewer to navigate along all found words (e.g. A1->A3->A3->A1->A2 in the document).

Figures 19, 20:
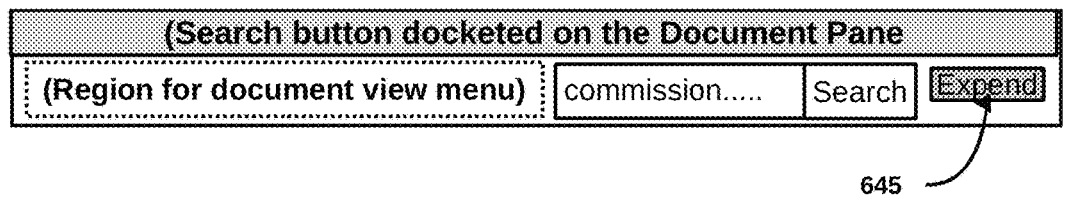
FIG. 19 shows a current search box placed on a document view pane where the "Expand" button is for opening a full search page, which is swappable with a compact search page.
FIG. 20 shows a document with highlights and an intelligent reference table, where the reference table shows information about the highlighted special terms in the document.
Figure 26:
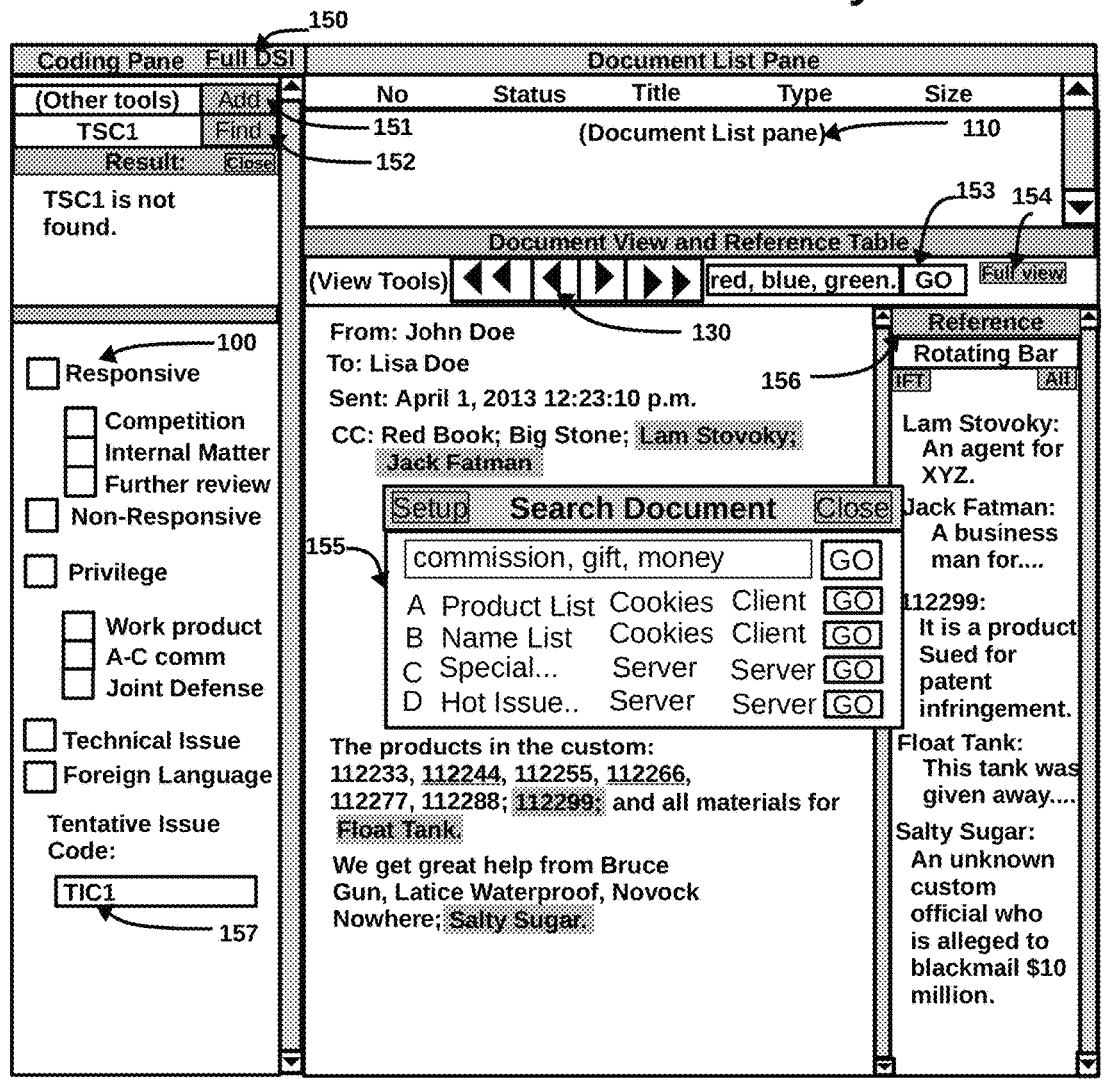
FIG. 26 shows an integrated user interface for an accurate document review system that contains (1) a search box for instantly checking elementary facts or coding rules in a shared database table or individual databases, (2) the button for opening the page for adding data records to a shared database table or individual databases, (3) the button for opening the full-featured user interface of the review-assisting component, (4) a configurable search tool for conducting searches using plural personal or private key arrays, (5) swappable reference tables, and (6) a tentative issue tag with an input box for accepting a tentative issue code for the document.

FIG. 18 shows a compact search page allowing the reviewer to search the document using any of the search key arrays. It is swappable with the full setup page shown in FIG. 17. FIG. 19 shows a collapsed page: FIG. 26 shows that the current search box 153 is placed on the top border of the document view pane. A "full view" button is placed there for opening a compact search page 155, from which one the reviewer can open the full setup page shown in FIG. 16 and then page shown in FIG. 17.

The search function is implemented in two modes: conducting search on the document on the client computer and call the server to search the document. When the first option is used, the client computer retrieves the selected search keys from cookie, uses the search key arrays to search through the displayed document or the whole document (if document is displayed in sections), the program needs to have the capacity to follow up, marks up each of the found keys, with an option to display a dialog to indicate the end of search. In this case, the search may keep the original default highlights that the server added at initial loading. However, the found keys from this search are marked in a color different from the color for the original highlight. For example, the words intended for getting responsive documents may be highlighted in yellow, but the words found by this client search may be marked in blue.

When the reviewer selects the server as the machine for conducting a search and presses the Search button as shown in FIG. 16, the server gets the search instruction for conducting the search using the designated search keys, getting the document, conducting a search in the document text, reconstructing the document with hits highlighted, and re-sending the document for rendering. This search may be used in place of the initial search and highlighting in the initial loading of the document or as an additional tool to the initial search.

If the key array is saved on the client computer (see Group B in FIG. 16), (1) the reviewer submits the filled search, (2) the browser retrieves the selected search keys from the browser's cookie, (3) the client computer sends the search request together with the key array to the server, (4) the server gets the key array from the submitted form; (5) the server retrieves the same document, (6) the server searches the document text using the submitted key array, marks up all found words according to designed color schemes, and builds a new document, (7) sends the newly built document to the client computer, and (8) renders the document in the same way as it would. It may overwrite any default highlights. To preserve all initial-loading highlights, the system needs to conduct the default search right before the step 6. Of course, the default search and this search may be combined as one single step.

If the keys are saved on the server (See group C in FIG. 16), (1) the reviewer submits the filled search form, (2) the server gets the search request, (3) the server retrieves designated search key array from the database table on the server, (4) the server retrieves the same document, (5) the server searches the document text using the search keys, marks up all found words according to a designated color scheme, and constructs a new document, (6) the server sends the newly constructed document to the client computer, and (7) the client computer displays the document. To preserve loading highlights, the system may need to conduct the default search right before step 5. Of course, the default search and this search may be combined as one single step.

By implementing two types of swappable search modes, the reviewer can achieve the highest efficiency. If the server is busy, the reviewer can use the client computer to conduct searches. Its utility is demonstrated in the following prospective examples.

EXAMPLE 9

Search Three Types of Documents in Rotation

A particular reviewer runs into three classes of documents in high frequencies: class A documents, class B documents, class C documents. The reviewer sets up three sets of search keys arrays 1, 2 and 3. During document review, if the reviewer runs into class A document, the reviewer does a search using search key array 1. If the reviewer runs across a class B document, the reviewer does a search using search key array 2. If the reviewer runs across a class C document, the reviewer does a search using search key array 3. If the search on the client computer is unworkable or unsatisfactory, the reviewer may change search machine. If the reviewer runs across a document that does not belong to any of the three classes, the reviewer uses the current search. By using this search method, the reviewer can eliminate the time for repeatedly entering searching keys and time for doing single-key searches hundreds of times.

EXAMPLE 10

Investigation Into Corporate Looting

The focus of an internal review is targeted to commissions for several employees, several agents, and several product numbers. From the review, it is found that commission may be expressed in money, reward, and incentive. The keys for group 1 are (commission, money, reward, and incentive); the keys for group 2 are (stone, black, green, and woods); and the keys for group 3 are (Bluehead, Redhead, and Greenhead, PN1234, PN4487, PN9976, PN5599). For documents such as Excel spreadsheet and compilations which may contain commission in the middle, the reviewer does a search using the group 1 keys; for any documents which contain a large number of agents or long list of product numbers, the reviewer can do a search using the group 2 keys, and for any documents that contain employees, the reviewer does a search using group 2 keys. For documents containing unpredictable materials, do all three searches by using all three groups of keys.

M. Generating Swappable Reference Tables

Figure 21:
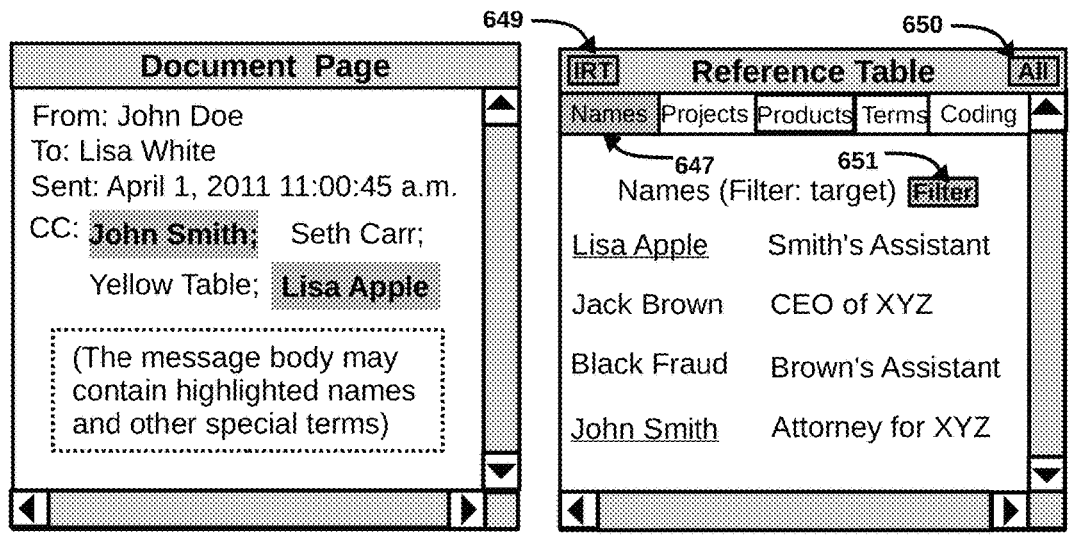
FIG. 21 shows email message in the document pane and a reference table showing information about some of the highlighted names.
Figure 22:
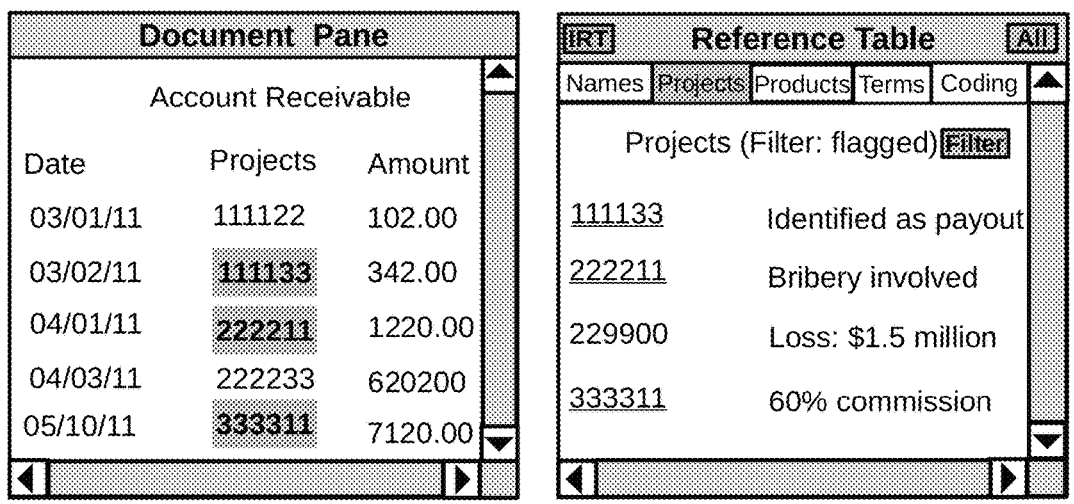
FIG. 22 shows an account receivable in the document pane and a reference table showing information about some of the highlighted projects.

The present invention also includes a method of generating a reference table showing relevant definitions next to the document under review, as shown in FIGS. 21-22. Reference table means a web page or pane that includes a menu bar ("rotating bar") 647 for switching between different reference tables in consistent with virtual tables, elementary fact tables or any other predetermined keys-dividing schemes.

1. The Need for Using Reference Tables

There are at least four needs for using reference tables.

By using reference tables, the reviewer can reduce the time for conducting endless cross checks. The reference tables are placed side-by-side to the document under review, it can help the reviewer increase review speed and reduce the risk of making factual mistakes caused by a memory error. For a document containing a large number of highlighted terms, swappable reference tables can make the review task less painful.

By using reference tables, the reviewer can get all work products of other reviewers in real time. This eliminates all unnecessary duplicate research efforts. Many times, an elementary fact or legal issue may be resolved after an extensive research or analysis by another reviewer.

Reference tables can dramatically improve the learning speeds of new reviewers. New reviewers may know nothing about highlighted terms and their significance. Highlight terms are so overwhelmed in the number that new reviewers may simply ignore them all. Many of highlighted terms are related to or reflect facts or issues in the coding table or individual database tables. New reviewers may need to know hundreds of attorney names out of thousands of name lists, several dozen target products out of hundreds of products, and several dozens service contracts out of thousands of contracts. By looking at the relevant definitions and displayed definitions in reference tables, they can quickly learn the target subsets and excluded subset for each category of elementary facts or issues.

Reference tables can help the reviewer find helpful information instantly. Assuming that a reviewer encounters four types of documents: A, B, C and D. For type A documents, the reviewer needs to know a subset of O facts; for type B documents, the reviewer needs to know a subset of P facts; for type C documents, the reviewer needs to know a subset of Q facts; and for type D documents, the reviewer needs to know a subset of R facts. Each of the reference table may contain one subset of facts. By reviewing reference tables by using a rotating bar, the reviewer can conveniently see all of the facts.

If a document contains a list of meeting attendees, and the reviewer wants to know if any of the names are among the a group of target employees, the reviewer clicks on the name table in the rotating bar which has been set up to retrieved target employees. Now, the reviewer can compare people names in the document with the names in the reference table. The reviewer may pay attention to some highlighted names and detailed information about those names in the reference table (the reference table may show all detailed information about each names). Next document may contain totally different facts, and the reviewer can use a different reference table.

2. Create Reference Tables

The reference table feature may be implemented as an integrated tool of an existing document review system or as a function of a separate review-assisting system.

(a). Create Database Tables and Table Structures for Storing Source Data for Reference Tables The reference tables have universal applicability. The source data may be the search keys for constructing a review pool or for creating highlights, the data records in a shared table or data records in elementary facts tables.

Source data may be processed products of those three sources of data and other supplemental data sources. The source data may be stored in a separate database table or equivalent file, a shared table in an integrated system, or individual database tables. To separate special terms from generic terms, special terms may be kept in a separate block in a file or saved in a database table marked with "special" type. The reference table may use source data from the shared table or individual database tables. If the source data are stored in a shared table, the shared table should support the requirements of reference tables. The shared table should have a main type and a sub-type, with an option of using additional sub type.

If a separate review-assisting system is used, source data are entered in the configurable database tables. In this case, all related functions in the review-assisting system are available. If reference tables are implemented on the document review system, a master table or several individual tables may be used.

(b). Set Up Relevant Terms in Different Scopes

The number and types of reference tables may be organized according to the individual database tables used in the discovery information management system. They are designed to show information for the most relevant terms rather than any terms.

The reference table should allow the reviewer to selectively display the terms in the varying scopes: (1) certain special terms in the current document, (2) all special terms in the current document, (3) all highlighted special and generic terms in the current document, (4) certain special terms in the source data, (5) all special terms in the source data, (6) all special terms plus some generic terms in the source data, (7) some special terms and some generic terms in the source data, (8) all terms in the source data, and (9) any other combination. The scopes for 1-3 can be achieved by using a similar method for generating intelligent reference tables; all terms from the database in a reference table can be accessed by using the button 650 in FIG. 21; and other varying scopes can be achieved by using "Set up tables" 550 (FIG. 8) and the setup functions in FIGS. 23-25.

The scope and number of reference tables are set up under the page for "Setup Tables." If N series of terms or elements may appear in different documents, the manager sets up N reference tables which will be the default settings for all reviewers. One good way to organize the terms is consistent with the table structures. This classification may favor efficiency. This favorable efficiency appears to be related to corporate capacity limit and human task assignments. If a shared database table is used, the reference tables are set up in two levels of settings. First, the type and number of tables are setup by a project manager or a server administrator. The reviewer can set up the filter for each of the reference tables by using the setup. If the reviewer encounters a document that requires a new reference table, the reviewer asks the manager to add a new database table or a virtual table. This can be done in the same way for the coding rule table and elementary facts tables.

FIG. 23 shows the simplest setup page for an integrated system using a shared table. It has a page title, a left column and a right column. The left column contains all of the main type values or the virtual table such as names, terms, products, branches, and coding rules. Each of the right drop-down boxes contains all possible sub-type choices. The sub-types for a product table in a patent case, for example, include "common," "contested," "flagged," and "all." "All" is available for each of the tables. For each virtual table, the reviewer can change the default filter to his own value. According to the reviewer's setting, the reference table for the names table shows only client attorneys; the reference table for terms shows only special terms; the reference table for products shows "flagged" products; the reference table for branches (offices) shows everything in the table; and the reference table for coding rules shows only coding rules that have been amended. The reviewer can use "all" to show everything in each virtual table. The setting data are saved in database or equivalent file under the reviewer's account.

More powerful setup function may be provided. When the reviewer selects one virtual table, the system opens a second setup page similar to that shown in FIG. 25. Each virtual table can be treated as a real table, and the system shows all columns for each virtual table. The sub-type is treated as one column just like any of the rest of other columns. This design is more powerful because the reviewer can fine-tune the filters. All special requirements concerning date, integer and float should be met. The reviewer can set up ranges for date, integer and float columns. For text fields, the reviewer can set up all common logic operations.

FIG. 24 shows the setup page using several individual database tables. It is similar to the setup table in FIG. 23 except that it also provides a column for setting up a sorting order 656 and page display size 658. The sorting field may be any one the field in the shared table or individual tables. For example, the fields in the product table may include product name, product ID, type, sales region, and comment. It has a central column that allows the reviewer to enter values for a filter. The reference table displays terms according to the sorting key. It also allows the reviewer to set the page size.

FIG. 25 shows a more powerful setup page, which is opened from the setup page invoked from the "setup tables" in FIG. 8 or from a proper setup page for the integrated system. Since the setup page is generated for the data in configurable database tables, it may have different fields including text, integer, varchar, char, date, and blog. In the section for setting up filers and values 660, the default rule to any (to get the whole table). For a date field 663, the right column will have two input boxes for start date and end date. For any number, or float and double field (661), the setup form also has two input boxes for a start value and an end value. The handling program is designed to accept one single value if one of the two input boxes has no value. For text fields 660 and 664, the input box has a common logic operation keys such as "contain," "equal to," "not contain," "not equal to", etc. Since the database table contains only permissible field types, the system is able to create a setup page with all those input boxes. In addition, it has the drop-down box 665 for defining a sort order, an input box 666 for setting a page size, and a selection menu for selecting rotating bar styles with options being compact, first-four letters, and full name. The sorting order of terms will be based upon the sorting key in an alphabetic or reverse alphabetic order. The setting data are saved as the reviewer's personal data that controls only personal reference tables of the reviewer. Sophisticated setup is not necessary if the table contains a small number of data records.

EXAMPLE 11

Use Names Table as a Reference Table

As shown in FIG. 21, in generating detailed information about persons, the server gets the source data from the names table. Each of the records in the names table contains, among others, personal affiliation information. The server retrieves the data records according to the filter that the reviewer has set. The filers may include "attorney," "keyplayer," "opposing," "third-party," "target" etc. Due to the selected value of the filter, the server displays the definitions or comments only for those names that belong to the selected type. The reviewer may see all names by using "all" for the filter 651.

EXAMPLE 12

Use the Terms Table as a Reference Table

The records in the term table (a specific table containing all kinds of terms) may have several types such as "generic" and "special." A default filer "special" may be set by the system but the reviewer can change it. When the server generates a reference table, the server retrieves only special terms. Any virtual table may be set up with the filer "All." In this case, the reference table could include all terms in the terms table. To build a reference table by generic terms can be achieved by using the "setup tables" page. Generic terms can present in the terms table with a special type "generic."

EXAMPLE 13

Get Source Data From a Shared Table for a Reference Table

If the review-assisting feature uses a shared database table, the server gets proper terms based upon filters: table type, sub-type, and optional sub-sub-type. In generating a reference table containing employee names, the reviewer selects the "names" as virtual table and "employees" as a sub-type.

After the reference table feature is set up, addition of new records will not affect the behaviors of the reference tables. If a newly added record is of the selected sub-type, it will show up in a reference table. If a newly added record is not of the selected sub-type, it will not show up. If a new sub-type is added, the data records of the new type would automatically appear if the sub-type is set to "all." Some types of data records may have great reference values while others may have no reference value. The manager can determine whether the data records of any new type should appear in a reference table.

Although the reference tables should show only special terms in most cases, it has the ability to show all terms, which may be useful. One menu in the rotating bar may be for generating a reference table for all terms available in the source data.

(c). Creating and Using an Intelligent Reference Table

A reference table may be shown at the time of loading a document according to a setup setting. This reference table is referred to as a start reference table. It is desirable to show the terms that are most relevant to the document under review.

When the reference table feature is integrated with the review system, the start reference table contains only the special terms highlighted in the document, but not other terms. This is referred to as intelligent reference table, as shown in FIG. 20. Generally, each highlighted special term should have a data record in the shared table or in one of the individual database tables. If a useful special search term is not in the shared or individual database table, a data record of this term should be added to the shared table or an individual table. If the search keys for creating highlights in the document are also from the shared table or individual database tables, then each highlighted term also has a correspondent data record.

In generating a start reference table, the server first identifies in the search keys the special terms that exist in the current document, and then finds those data records in the shared table or all individual tables. If search keys for highlighting the document are from different sources, the method for creating intelligent table includes the steps of (1) retrieving the search keys, (2) using the search keys to conduct a search in the document, (3) if the server finds a key in the document text, marks the search key as a "hit key", (4) finding data records for each of the hit keys, and (5) constructing a reference table using only data records for the hit keys. If the document has M special terms, the server finds M data records and shows M information entries. However, special terms may include certain useful generic terms.

EXAMPLE 14

Display an Intelligent Reference Table

As shown in FIG. 20, an order list contains, among others, customer names, products, order numbers and prices. The system uses all search keys to find and highlight four special terms "Blue Tank", "Stone Chair" "Spin Rice" and "1602.51." The server then uses the hit keys to find the data records in the product table. It finds three records with definitions there. It also finds a comment for 1602.51 in the shared or individual tables. If the reviewer wants to know other terms, the reviewer can use the rotating bar 647 to open other reference tables, and reopen the start intelligent reference table.

If the reference table is implemented in a separate system, the system running reference tables does not know what special terms appear in the document. So, the reference table can show default special terms or display any of the several reference tables arbitrarily in the initial loading. The system for generating reference tables may select the terms on the basis of historical highlight frequencies in building the document pool or reviewer initiated searches. The server counters the highlight frequencies of terms and save them in a database table by using an accumulator for each of the terms. The reference table shows those special terms that have the highest past highlight frequencies. After a start reference table is displayed, the reviewer can change the reference table by clicking the rotating bar and changing filters.

The second method is that the document review server sends the message to the review-assisting system for generating the reference table so that the system knows the hit terms together with the user Id. The review-assisting system then generates an intelligent reference table and sends it to the client computer. This system should work if both systems are deployed on a private network. With minor changes and adjustments, collaboration between the document review system and a review-assisting system can be realized.

(d). Create a Menu Bar ("Rotating Bar") for Opening Different Reference Tables

Considering the data attributes discussed under the focus-of-interest hypothesis, a useful reference table should show the most useful terms and their definitions in light of the document under review. The rotating bar is useful in two ways.

First, if all reference tables have been set up, the reviewer can open each reference table. By rotating reference tables, the reviewer opens a reference table A for a first document (FIG. 21), a reference table B for a second document (FIG. 22), and a reference table C for a third document. If a document contains no special terms, the reviewer does not need a reference table, he just skips it.

Second, a single complex document may contain several series of elements such as attorney names, problem projects, and hot legal issues etc. In this case, the reviewer can just open three reference tables in turn: the names reference table, the projects reference table, and the hot-issue reference table (similar to FIGS. 20-22).

3. Placement of the Reference Table and Invoking Buttons

The reference table should best meet the following requirements: (1) The reference table is easy to access or lose its utility if the reviewer needs to go through many buttons; (2) The rotating bar allows the reviewer to switch different reference tables by just one click in ordinary uses; (3) The reference table should be placed in a location without interrupting review workflow; and (4) The reference table should use display screen area efficiently. All none-functional web elements should be avoided. The reviewer should be allowed to access the setup tool conveniently.

FIG. 1 shows that a document review system always has a document folder pane, a document list pane 110, a document pane 120, and a coding pane, 100 and document advance tool 130. Some systems have other additional utility panes, and others may have separate document panes. When reference table is run by a separate system, the invoking button for calling reference tables is placed in the view selecting bar 558 even though it can be placed anywhere. In a separate discovery information management system, the invoking button may be place on the view selecting bar 553 in FIG. 8. In this case, the reference table would have the normal size, but the reviewer can scale the web page size and can place it next to the document pane.

FIG. 26 shows how the reference table feature and other features are integrated with a document review platform. The rotating bar 647 in FIGS. 20-21 for changing reference tables may be placed at the top of the reference table. The setup page for reference tables may be accessed from the "Full DSI" 150 in FIG. 26 indirectly. The reference setup pages (FIGS. 23-25) may be invoked from a link placed in the setup page opened from clicking "Setup Tables" in FIG. 8. The setup function is available under the manager's account. The button for invoking and rotating reference tables may be placed in the view-selecting bar (FIG. 8).

The whole reference table 156 in FIG. 26 may be placed on the left or right side of the document view pane. The size should be scalable. To reduce screen usage area, the reference table can be implemented as a page over another pane with a switch button so that the reviewer can switch between the two pages as long as the other pane is not used frequently. It may be implemented as a swappable pane for the coding pane, but this arrangement may interfere with review flow. It may be implemented as a swappable pane over the document list pane if document advance button is not blocked.

4. New or Updated Data Records Automatically Show Up in Reference Tables

Data entry forms allow the reviewers to enter data easily and efficiently. The forms provide structural limitations so that data are properly entered. When many database tables are used, the system provides tools allowing the reviewers to select any individual table. It is highly desirable that the system is implemented with a unique tool that the reviewers can use to seek a supervisory ruling or a vote of other reviewers.

5. Some Application Examples of Using Reference Tables

EXAMPLE 15

Review of Routine Spreadsheets

Custodian Routine maintains order summaries on daily, weekly, monthly, and annually. Excel spreadsheets contain customer names, product names, transaction names and comment. Depending upon review focus, the reviewer opens the reference table for customers (in hundreds), the reference table for products (in hundreds), and the reference table for transaction numbers (in hundreds). By using different filters in setup or making filer adjustment, the reviewer may want to show the reference tables for a few targeted customers, a few targeted products, and a few targeted transactions. This tool can help the reviewer dramatically increase review speed and accuracy.

EXAMPLE 16

Review of Litigation Docket

A massive litigation docket contains cases, parties name, attorneys, descriptions, budgets, etc. The investigation focus is to find all past cases related to a matter under current investigation. It is known that a dozen attorneys were exclusively associated with this type of cases while the rest of the attorneys are not. The reviewer opens a reference table showing this small set of attorney names and reviews all attorney names in the docket against this small list. The reviewer needs to look into the details only for the entries associated with the small number of attorneys. This helps the reviewer reduce the effort of cross-checking each of the attorney names against each of the names in a master paper table or Excel file.

EXAMPLE 17

Review of a Product Review Article

Company product review article contains discussions for most of its products. The investigation objective is to find a small subset of products from its products. The product review article does not necessarily include all background information. The reviewer can open a reference table for all product names for understanding their background and open a reference table for the small subset. The reviewer can avoid time-consuming crosscheck for each of the products.

EXAMPLE 18

Investigation Into Corporate Looting

Internal review is conducted to discovery employees responsible for corporate looting. Complaint is directed to ten key employees. The reviewer is instructed to pay a special attention to those employees in all documents concerning commission, gifts, discounts, payment, money and check, vacations and official travels. A reference table containing those employees may be opened for cross-reference. Also, when an employee is unclear due to name initials, spelling errors, improper spellings, or nickname, etc., the reviewer may need to check it in the whole employee list.

EXAMPLE 19

Use of a Reference Table for Finding Products

If the reviewer sees a product list on the document, the reviewer can select product table as a reference table and with a right filter such as infringing products. If the reviewer knows all products, there is no need to use the reference table. If the reviewer does not know highlighted product names or numbers, the reviewer can find from parallel table about the details about the highlighted products. If a product is not in the reference table, the reviewer may invoke the data entry form to add it into the table.

EXAMPLE 20

Use of a Reference Table for Finding Customers

If the document is customer lists, the reviewer can select a names table and select "customer" as sub-type. So, the reviewer can quickly get the most closely related reference table. If an important human name is not in the reference table, the reviewer may invoke the data entry form to add the name.

EXAMPLE 21

Use of Several Reference Tables for a Complex Document

If the document is complex and may contain anything, the reviewer might see many highlighted special terms. If the reviewer is unable to understand one or more products, the reviewer can open the product table with a right sub-type. So, the reviewer runs into human names, opens the names reference table with a proper filter. The reviewer may keep doing this until the document is reviewed. If an important term is not in the reference table, the reviewer may open the data entry form to add a record.

N. Use Tentative Issue Code for Tracking Uncertain and Risky Documents

In litigation, the need for marking various types of documents often arises for the reasons stated above. Since types, compositions and substance of documents are unknown before they are reviewed, it is impossible to foretell what might be important and are watched for. Only the whole reviewer teams who have conducted the review know all kinds of legal issues. While many of them would do their tasks differently, none of them have the luxury to redo it. From a large number of past reviews, one could have some hints as to how to improve future reviews. At least one thing that every discovery project should consider is to use a tentative issue code for marking certain important documents. For experienced reviewers who have read the documents, the additional time to add a code in only about 10 seconds, and the total number of the documents may be several to several hundred. The totally costs even at $150 billing rate would be from a few dollars to few hundreds dollars.

This implementation helps the client (1) save a massive re-review for a suspected legal issue, (2) identify potential risks of exposure, (3) prevent scandals and preserve client's public imagine, and (4) prevent avoidable new investigation or private cause action. Legal process is often the most common cause to bring down companies. A piece of innocent-looking paper may be the death warranty of a corporate existence. Many companies do their business on many continents in multiple fields and under many sets of law, and it is impossible for any one person to know that might be devils in a mountain of documents. There is no way to define all legal issues, and no single lawyer can address this problem.

Coincidentally, the background of all reviewers may be just diverse enough to cover the gigantic area of law the gigantic company business facets. The basic rule is that if the client is big enough to need a thousand of reviewers to build a review team, the review team may very probably have enough collective expertise to cover every area of law relevant to the company except the foreign matter. A review team may include past in-house counsel, past DOJ attorneys, retired criminal attorneys, retired patent attorneys, retired labor-law-attorney, past associates, past law partners, foreign labor attorneys, foreign attorneys etc. Some of them might have practiced law for more than 50 years; and such a single experienced lawyer may be able to identify more critical legal issues. From combining the experience and knowledge of a thousand review attorneys, a single giant super lawyer emerges. The only thing is to provide a tool and a ruling for them to work together.

To deal with uncertain and risky issues in documents, the super attorney would note various documents that might have potential impacts on client. Taking care of litigation risks is an inherent function of the lawyer. It is realistic when only one lawyer handles the case and when the client has only a small number of documents. In the complex production model, one difficulty is how to assign tentative issue codes for different issues. Designation of an issue code by management is unrealistic because the need arises whenever a reviewer encounters a document. If individual reviewers are authorized to assign issue codes, there was no method for synchronizing tentative issue codes.

A method in the present invention allows all reviewers to assign issue codes in real time (FIG. 26). When a reviewer encounters an uncertain issue in a document, the reviewer (1) checks to see if a proper issue code has been assigned in using Find 152, and uses it if the issue code has been assigned, (2) assigns a tentative issue code under the tentative issue tag 157 in compliance with any imposed name specification, (3) codes the document with the tentative code under the tentative tag, (4) publishes the tentative issue code together with the document ID and an explanation in the coding table by using the "Add" button 151 or the "Full DSI" button 150. If a second reviewer runs into this or similar document, the second reviewer should check and would find the tentative issue code that has been published in the coding table by the prior reviewer. There is no need to question the code assignment because it can be changed globally. To avoid potential misunderstanding, it is important to include the document ID so every reviewer can check the document.

This coding and publishing rule is to synchronize the decisions of all reviewers so that they act as a single super lawyer. In the end, some documents may be coded as TIC1, TIC2, TIC3, TIC4, and TIC5 in the tentative issue tag. If there is a need to get any or all of those classes of documents in the future, the project manager can pull them by searching those issue codes in the tentative issue code field in the coding database. They can be linked to the documents by using the document IDs. This protocol can increase litigation responsiveness, reduce issue code inconsistency, and increase the chance to capture risky documents.

O. Utilize Experience and Knowledge

Notwithstanding all apparent troubles and liabilities of experienced reviewers stated in the background, the law firm needs experienced reviewers to improve performance. Review quality cannot exceed what the reviewers can deliver. Identifying hot issues and skillful treatment of risky issues depend upon the reviewer's experience and skills. Many important facts and legal issues are spotted in document review. Sometimes, certain hot issues are spotted outsides the scope of intended review. Experienced reviewers will be in a much better position to identify documents in support of claim or defenses. Long experience cannot be achieved by several days of training.

The industry needs to develop a method for defining relevant experience and a method for using experience. In selecting reviewers for an accurate review, consideration should be given to (1) the reviewer's experience in reviewing similar cases, (2) the reviewer's knowledge of underlying technologies, (3) the reviewer's experience in using review platforms or similar platforms, and (4) the reviewer's substantive legal knowledge.

The real question is whether a review environment can properly use the reviewer's experience. First, a review environment may be unable to utilize review experience due to the total mismatch between their experience and the assigned documents. Second, experience can be a liability in a review environment where the review plan, instructions, coding tree, and litigation strategies are at odds with the super lawyer's practice standards and the management is unable to provide adequate reasons for the departures. In such a situation, computer algorithms, new graduates, and high school students can do better job.

The review industry needs to develop a standard review classification and assignment system for matching reviewers with documents. Each reviewer should be assigned with one or more classification codes. In processing documents, documents are assigned with one or more standard review classification codes. The assignment program tries to match the reviewers with the documents by the review classification codes. By using this system, whenever possible, ledges and journals are assigned to accountant reviewers, transaction documents are assigned to those who know secured transactions, R&D documents are assigned to technical reviewers, and documents of general nature may be assigned to all reviewers. Assignment of documents outside the reviewer's expertise should be made as a fallback measure. Difficult documents may be reviewed by two or more reviewers with different backgrounds. All reviewers should be charged with responsibilities to identify risky documents. Since this method is implemented in the assignment program, it is not shown FIG. 26.

P. Other Critical Factors that Affect Document Review Performance

The method of present invention provides the chance to achieve the highest performance possible in theory.

However, review performance is limited by the delivered performance of reviewers. Delivered performance depends upon reviewer experience, reviewer's desire to make great contributions, document context conditions, and effect of review quota. If the reviewer lacks incentive to make positive contributions, the method of the present invention is destined to fail. Total disruption of document cross-document verbal context and transaction context turns a review into the guessing game. When reviewers are demanded or expected to code certain number of documents, they lose incentive to dig into documents and to share their work products with others. Any quota requirement, whether it expressed or practiced in retention policy, will totally defeat the method of the present invention. Finally, the virtue of the collaborative discovery method for the complex representation model is based upon the assumption that all players care about the interest of their clients. Any distrust between the players will also make the method unworkable. Some of the problems can be addressed by changing liability laws, staffing practices, and the conflict-of-interest rule.

In those exemplary embodiments of the present invention, specific components, hardware parts, arrangements, and processes are used. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A method for improving document review performance of at least one user using a review system comprising at least one server and at least one client computer in a network or the internet, the method comprising:

assigning or creating at least one review account;

classifying elementary facts into at least one main type, providing at least one data table or individual data tables for storing data records of elementary facts, wherein each of the at least one data table or each of the individual data tables has a keyword field and at least one information field; and supporting an improved document review operation under each of the at least one review account, the review operation in a review account further comprises the steps of:

loading a document on a client computer as a current document for document review;

searching elementary facts in the at least one data table or any of the individual data tables, or searching elementary facts in the data able or any of the individual data tables on the server plus conducting a search in the current document by the client computer or the server;

selecting coding tags upon user action for the current document and saving the selected coding tags on the server;

adding each identified elementary fact as a data record into the at least one data table or the individual data tables by adding keywords in the keyword field and adding a definition or comment in the information field;

retrieving data records of elementary facts from the at least one data table by a main type, or from one or more of the individual data tables, wherein the retrieved data records are used as a data source for filling a reference table;

upon user action, retrieving data records from the data source as retrieved data records, or retrieving data records from the data source as retrieved data records plus conducting a search by the client computer or the server in the text of the current document using the retrieved data records as search keys to find matched terms in the document and matched data records among the retrieved data records;

displaying the current document on a client computer, optionally with highlights on the matched terms that have been found to match respectively keywords of the matched data records;

generating a reference table as part of a document pane, an independent web pane, a web form, or any suitable web element, wherein the reference table contains retrieved data records and optionally highlights of matched data records; and rendering the reference table on the client computer, whereby the reference table and the displayed current document can be viewed, wherein elementary facts entered under different review accounts are shown in the reference table in the current review account, or elementary facts entered at times of reviewing other documents are shown in the reference table at the time of reviewing the current document.

2. The method of claim 1, further comprising generating an intelligent reference table containing only matched data records, or generating a reference table showing a predetermined number of data records that have matched terms in documents in the highest historical matching frequencies.

3. The method of claim, 1 further comprising conducting a search in the current document using personal search key arrays, wherein at least one key in each of the search key arrays is obtained from the at least one data table or the individual data tables and highlighting found terms in the document.

4. The method of claim 3, further comprising creating different reference tables consistent with the main types of elementary facts or the individual data tables, wherein each of the buttons in a rotating bar is for opening a reference table containing one main type of elementary facts.

5. The method of claim 4, further comprising adding a new main type or a new data table within a review life cycle, whereby the review system has one more reference table to use.

6. The method of claim 5, further comprising generating a setup page, entering a plurality of personal search key arrays on the setup page, submitting search setting data, saving the search settings on the server for the review account, and conducting a current search using a newly entered personal search key array or conducting a search using one of the plurality of saved personal search key arrays, and highlighting found terms in the current document.

7. The method of claim 1, wherein the document table of the review system and the reference tables are hosted on two different servers, the method further comprising sending a signal between a server processing documents and the server generating a reference table, and generating a reference table showing only data records have matched terms in the current document.

8. A method for improving document review performance of a group of users on a document review system comprising at least one server and a plurality of client computers, the method comprising:

designating elementary facts, coding rules, terms, or any combinations thereof, as review-assisting information, and classifying review-assisting information by at least one main type or main types plus sub types, wherein the review-assisting information assists at least one of the group of users in making coding decisions during document review;

providing at least one data table or a plurality of individual data tables for storing review-assisting information, as data records, wherein the at least one data table or each of the individual data tables comprises a keyword field for storing keywords and at least one information field for storing a comment or definition; and supporting an improved document review operation for each of the group of users in document review, the review operation for a user further comprises the steps of:

opening a document as a current document for review;

searching for review-assisting information in the at least one data table or any of the individual data tables, or searching for review-assisting information in the data table or any of the individual data tables plus conducting a search in the current document by the client computer or the server;

selecting coding tags upon user action for the current document and saving the selected coding tags on the server;

adding each piece of identified review-assisting information by entering keywords into the keyword field and entering a comment or definition into the information field, whereby the amount of review-assisting information in the at least one data table or the individual data tables increases with the progress of document review;

obtaining from the at least one data table or the individual data tables review-assisting information, as data sources for a plurality of reference tables;

selecting data records from the data sources by main types, main type plus sub-types, coding effect or any combination thereof, or selecting data records from the data sources by main types, main type plus sub-types, coding effect or any combination thereof plus determining in the current document terms that match keywords of the selected data records;

filling selected data records in the reference tables, wherein at least one of the reference tables is configured to show review-assisting information in a display scope that is selected from the group consisting of (1) displaying data records containing selected special terms found in the current document, (2) displaying all special terms found in the current document, (3) displaying all special and generic terms found in the current document, (4) displaying selected special terms, (5) displaying all special terms, (6) display all special terms plus selected generic terms, (7) displaying selected special terms and selected generic terms, and (8) displaying all terms;

rendering the current document optionally with matched terms highlighted on a client computer;

rendering a reference table, with a rotating bar or a rotating bar plus highlights on matched data records, being placed as part of the document pane, a web pane next to the document page, an independent web page, or a web form on the client computer; and changing data records in the displayed reference table by clicking the rotating bar to cause the server to retrieve data records from the at least one data table, or one or more associated individual data tables by selected main types, main type plus sub-types, coding effect or any combination thereof.

9. The method of claim 8, further comprising generating an intelligent reference table that shows data records containing only keywords that match terms in the current document, or shows a predetermined number of data records containing keywords having highest historical matching frequencies.

10. The method of claim 8, further comprising conducting a search in the current document using a personal search key array, wherein at least one key is obtained from the at least one data table or the individual data tables, and highlighting found terms in the current document.

11. The method of claim 8, further comprising adding a new main type or a new data table within a review life cycle, whereby the review system has one more reference table to use thereafter.

12. The method of claim 8, further comprising generating a setup page for one of the group of users, entering a plurality of personal search key arrays on the setup page, submitting search setting data, saving submitted search settings on the server for the user, conducting a current search using a newly entered search key array or conducting a search using one of the plurality of saved personal search key arrays, and highlighting found terms in the current document for the user.

13. The method of claim 8, wherein the document table of the review system and the reference tables are hosted on two different servers, the method further comprising sending a signal between a server processing documents and the server for generating reference tables, wherein the signal identifies data records containing keywords that have matched terms in the current document.

14. A method for improving document review performance of a group of users on a review system comprising at least one server and a plurality of client computers in a network or the internet, the method comprising:

designating elementary facts, coding rules, terminologies, or any combinations thereof, as review-assisting information, and classifying review-assisting information by at least one main type or main types plus sub types, wherein the review-assisting information assists at least one of the group of users in making coding decisions during document review;

providing at least one data table or a plurality of data tables for storing review-assisting information, each piece of the information as a data record, wherein the at least one data table or each of the data tables comprises a keyword field for storing keywords and at least one information field for storing a comment or definition; and supporting an improved document review operation for each of the group of users, the document review operation for a user further comprises the steps of:

opening a document as a current document for review;

searching for review-assisting information in the at least one data table or any of the data tables, or searching for review-assisting information in the at least one data table or any of the data tables plus conducting a search in the current document;

selecting coding tags on coding pane upon user action for the current document and saving selected coding tags for the current document on the server;

adding each piece of identified review-assisting information as a data record into the at least one data table or the data tables by entering keywords into the keyword field and entering a comment or definition into the information field, whereby the amount of review-assisting information in the at least one data table or the data tables increases with the progress of document review;

setting up a search setting for at least one personal search key array by entering search keys, optionally selecting a storage location for each of the at least one personal search key arrays, and optionally selecting a search machine between a client computer and a server for each of the at least one personal search key array;

providing a search tool as a search box, a pop-up window, or a web pane for conducting searches using any of the personal search key arrays;

conducting a search in a current document under review by using one of the personal search key arrays on the client computer or causing the server to conduct a search using one of the personal search key arrays; and highlighting in the current document the terms that match any of the search keys of the personal search key array on the client computer or updating the current document showing highlights on found terms after the server searches the current document using the personal search key array.

15. The method of claim 14, further comprising generating an intelligent reference table that shows data records containing at least one keyword that matches at least one term in the current document, or a predetermined number of data records containing the terms having highest historical matching frequencies.

16. The method of claim 15, further comprising generating a search setup page for one of the group of users, entering search keys in the plurality of personal search key arrays, submitting the search setup page to the server, retrieving search setting data from the submitted search setup page, saving retrieved search setting data on the server for the user, conducting a search using one of the plurality of saved personal search key arrays, and highlighting found terms in the current document.

17. The method of claim 14, further comprising adding a new main type or a new data table within a review life cycle, whereby the review system has one more data source for generating a reference table thereafter.

18. The method of claim 15, further comprising setting up for each data table a filter for limiting data records, selecting a sorting field, and determining a total number of data records per page for a reference table.

19. The method of claim 14, wherein the document table of the review system and the reference tables are hosted on two different servers, the method further comprising sending a signal from the server processing documents and the server generating a reference table, wherein the signal identifies data records that contain keywords found in the current document, whereby the server for generating the reference table can mark up identified data records.

20. The method of claim 14, further comprising entering search keys in one of the personal search key arrays, conducting a current search using the entered keys on the client computer, and highlighting found terms in the current document.

21. The method of claim 15, further comprising conducting searches using user-provided search keys to search one of the data tables or the at least one data table, and conducting global searches in the at least one data table or the data tables.

* * * * *